(12) United States Patent
Tam et al.

(10) Patent No.: US 12,722,661 B2
(45) Date of Patent: Sep. 1, 2026

(54) PROACTIVE RISK MITIGATION WITH GENERALIZED VIRTUAL VEHICLES

(71) Applicant: Nissan North America, Inc., Franklin, TN (US)

(72) Inventors: Qizhan Tam, San Jose, CA (US); Christopher Ostafew, Mountain View, CA (US); Manh Huynh, Sunnyvale, CA (US); Huiching Chen, San Jose, CA (US)

(73) Assignee: Nissan North America, Inc., Franklin, TN (US)

( * ) Notice: Subject to any disclaimer, the term of this patent is extended or adjusted under 35 U.S.C. 154(b) by 100 days.

(21) Appl. No.: 18/345,501

(22) Filed: Jun. 30, 2023

(65) Prior Publication Data

US 2025/0002049 A1 Jan. 2, 2025

(51) Int. Cl.
*B60W 60/00* (2020.01)

(52) U.S. Cl.
CPC ..... *B60W 60/0027* (2020.02); *B60W 2554/20* (2020.02); *B60W 2554/4041* (2020.02)

(58) Field of Classification Search
CPC ......... B60W 60/0027; B60W 2554/20; B60W 2554/4041
USPC ........................................................... 701/23
See application file for complete search history.

(56) References Cited

U.S. PATENT DOCUMENTS 8,559,673 B2 10/2013 Fairfield et al.
8,761,991 B1 6/2014 Ferguson et al.
9,779,314 B1 10/2017 Wendel et al.
9,990,548 B2 6/2018 Wellington et al.
10,210,408 B2 2/2019 Ferguson et al.
10,269,257 B1 4/2019 Gohl et al.
10,303,178 B1 5/2019 Gutmann
(Continued)

FOREIGN PATENT DOCUMENTS

CN 113682300 A 11/2021
CN 114475645 A 5/2022
(Continued)

OTHER PUBLICATIONS

Alsterda et al., Contingency Model Predictive Control for Autmotaed Vehicles; Cornell University; arXiv:1903.08818v1 [cs.SY];Mar. 21, 2019; 6 pages.
(Continued)

*Primary Examiner* — Hunter B Lonsberry
*Assistant Examiner* — Helen Li
(74) *Attorney, Agent, or Firm* — Young Basile Hanlon & MacFarlane, P.C.

(57) ABSTRACT

Proactively mitigating risk to a vehicle traversing a vehicle transportation network includes identifying a location for a virtual vehicle. The virtual vehicle is added to a world object model maintained with respect to the vehicle. A trajectory is predicted for the virtual vehicle. The vehicle is autonomously controlled according to an adjusted trajectory that is based on the trajectory for the virtual vehicle. The adjusted trajectory includes at least one of a lateral constraint or a speed constraint. The location for the virtual vehicle is identified based on a lane in map data, a trajectory of a vehicle, and a perceptible area by sensors of the vehicle. The virtual vehicle is a hypothetical vehicle that is not observed by sensors of the vehicle.

20 Claims, 29 Drawing Sheets

(56) References Cited

U.S. PATENT DOCUMENTS 10,467,487 B1 11/2019 Wang et al.
10,525,903 B2 1/2020 Laur et al.
10,698,407 B2 6/2020 Ostafew
10,936,902 B1 3/2021 Bagwell et al.
11,227,409 B1 1/2022 Wu et al.
11,345,335 B1* 5/2022 Luders ................ G05D 1/0088
11,433,922 B1 9/2022 Van Heukelom et al.
11,720,116 B1 8/2023 Gutmann
12,017,632 B1 6/2024 Valverde et al.
12,071,127 B2 8/2024 Tam et al.
12,179,795 B2* 12/2024 Henke ................ B60W 60/0011
12,194,991 B2 1/2025 Kobashi et al.
2004/0119610 A1 6/2004 Maemura et al.
2009/0254235 A1 10/2009 Kuroda
2010/0026555 A1 2/2010 Whittaker et al.
2010/0235033 A1 9/2010 Yamamoto et al.
2013/0325344 A1 12/2013 Yester
2014/0379179 A1 12/2014 Goossen et al.
2017/0124781 A1 5/2017 Douillard et al.
2017/0329332 A1 11/2017 Pilarski et al.
2017/0336795 A1 11/2017 Wei et al.
2018/0012088 A1 1/2018 Matsuo et al.
2018/0151075 A1 5/2018 Claesson
2018/0154723 A1 6/2018 Anderson et al.
2018/0178784 A1 6/2018 Ohta
2018/0194354 A1 7/2018 Takeda
2019/0009784 A1* 1/2019 Takeda ............ B60W 30/18154
2019/0025843 A1 1/2019 Wilkinson et al.
2019/0047584 A1 2/2019 Donnelly
2019/0065871 A1 2/2019 Pogorelik
2019/0129831 A1* 5/2019 Goldberg ............ G06F 11/3698
2019/0243371 A1* 8/2019 Nister ................. B60W 30/095
2019/0332875 A1 10/2019 Vallespi-Gonzalez et al.
2019/0355257 A1 11/2019 Caldwell et al.
2019/0369616 A1 12/2019 Ostafew
2019/0383631 A1 12/2019 Bigio et al.
2019/0384302 A1 12/2019 Silva et al.
2019/0391587 A1 12/2019 Uvarov et al.
2020/0026288 A1 1/2020 Herz et al.
2020/0081450 A1 3/2020 Creusot et al.
2020/0086855 A1 3/2020 Packer et al.
2020/0133280 A1 4/2020 Seccamonte et al.
2020/0148223 A1 5/2020 Fukatani et al.
2020/0191972 A1 6/2020 Zhao et al.
2020/0211394 A1 7/2020 King et al.
2020/0216091 A1 7/2020 Vladimerou
2020/0269877 A1 8/2020 Mortazavi et al.
2020/0278681 A1 9/2020 Gier et al.
2020/0284607 A1 9/2020 Mangal et al.
2020/0292322 A1 9/2020 Ozog et al.
2020/0310467 A1 10/2020 Birkedahl et al.
2020/0341474 A1 10/2020 Zuo
2020/0364892 A1 11/2020 Ko et al.
2020/0410062 A1* 12/2020 O'Malley ........... B60W 60/001
2021/0004363 A1 1/2021 Bailly et al.
2021/0031760 A1 2/2021 Ostafew et al.
2021/0035314 A1 2/2021 Shu et al.
2021/0055741 A1 2/2021 Kawanai et al.
2021/0061269 A1* 3/2021 Petroff ........... B60W 30/18159
2021/0086795 A1 3/2021 Zhao et al.
2021/0125431 A1 4/2021 Mcgill et al.
2021/0166044 A1 6/2021 Ferguson et al.
2021/0191419 A1 6/2021 Xu et al.
2021/0211568 A1 7/2021 Zhou et al.
2021/0261152 A1 8/2021 Meijburg et al.
2021/0390349 A1 12/2021 Hotson et al.
2021/0404841 A1 12/2021 Das et al.
2022/0076037 A1 3/2022 Hochman et al.
2022/0097736 A1* 3/2022 Lin ................... B60W 60/0015
2022/0379917 A1* 12/2022 Henke ................ B60W 60/0011
2023/0012853 A1 1/2023 Tam et al.
2023/0121388 A1* 4/2023 Khan .................... B60K 35/22
340/435
2023/0124314 A1 4/2023 Foster et al.
2023/0143805 A1* 5/2023 Baba .................. B60W 30/143
701/301
2023/0145472 A1 5/2023 Ehmann
2023/0159026 A1* 5/2023 Pan ........................ G06V 20/58
701/301
2023/0159056 A1 5/2023 Cheng et al.
2023/0227031 A1* 7/2023 Kobashi .............. B60W 60/001
701/26
2024/0109533 A1 4/2024 Tam et al.
2024/0149912 A1 5/2024 Tam et al.
2024/0208531 A1 6/2024 Schier et al.
2024/0300482 A1 9/2024 Aizawa
2025/0002049 A1 1/2025 Tam et al.

FOREIGN PATENT DOCUMENTS

CN 115097857 A 9/2022
EP 3611069 A1 2/2020
EP 3650294 A1 5/2020
JP 2009-217692 A 9/2009
JP 2011-198247 A 10/2011
JP 2012-188021 A 10/2012
JP 2016146113 A 8/2016
JP 2017-114405 A 6/2017
JP 2018-049496 A 3/2018
JP 2019-040427 A 3/2019
WO 2018/225575 A1 12/2018
WO 2019/098216 A1 5/2019
WO 2022016941 A1 1/2022

OTHER PUBLICATIONS

Kim et al., An Efficient Color Space for Deep-Learning Based Traffic Light Recognition; JOurnal of Advanced Transportation; vol. 2018; Artice ID 2365414; 13 pages.

Krylov et al., Object Geolocation Using MRF Based Multi-Sensor Fusion; ADAPT Centre, School of Computer Science and Statistics, Trinity College Dublin, Dublin, Ireland; Oct. 2018; 5 pages.

Levinson et al., Robust Real-Time Tracking Combining 3D Shape, Color, and Motion; The International Journal of Robotics Research; 2015; 28 pages.

Charette et al., Traffic Light Recognition Using Image Processing Compared to Learning Processes; 2009 IEEE/RSH International Conference on Intelligent Robots and Systems; Oct. 2009; 6 pages.

Trehard et al., Tracking Both Pose and Status of a Traffic Light Via an Interacting Multiple Model Filter; Jul. 2014; 7 pages.

Thrun et al., The GraphSLAM Algorithm with Applications to Large-Scale Mapping of Urban Structures; The International Journal of Robotics Research, vol. 25, No. 5-6, May-Jun. 2006; pp. 403-429.

Fairfield et al., Traffic Light Mapping and Detection; 2011 IEEE International Conference on Robotics and Automoation; May 2011; 6 pages.

Levinson et al., Traffic Light Mapping, Localization, and State Detetion for Autonomous Vehicles; 2011 IEEE International Conference on Robotics and Automation, Shanghai, 2011, pp. 5784-5791.

Kim et al., Traffic Light Recognition Based on Binary Semantic Segmentation Network; Sensors 2019, 19, 1700; 15 pages.

Basich et al., Learning to Optimize Autonomy in Competence-Aware Systems; Proc. of the 19th International Conference on Autonomous Agents and Multiagent Systems (AAMAS 2020); May 2020; 9 pages.

Wray et al., Online Decision-Making for Scalable Autonomous Systems; Proceedings of the Twenty-Sixth International Joint Conference on Artificial Intelligence; AI and autonomy track, 2017. pp. 4768-4774.

* cited by examiner

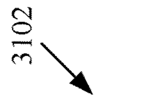
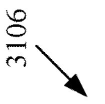
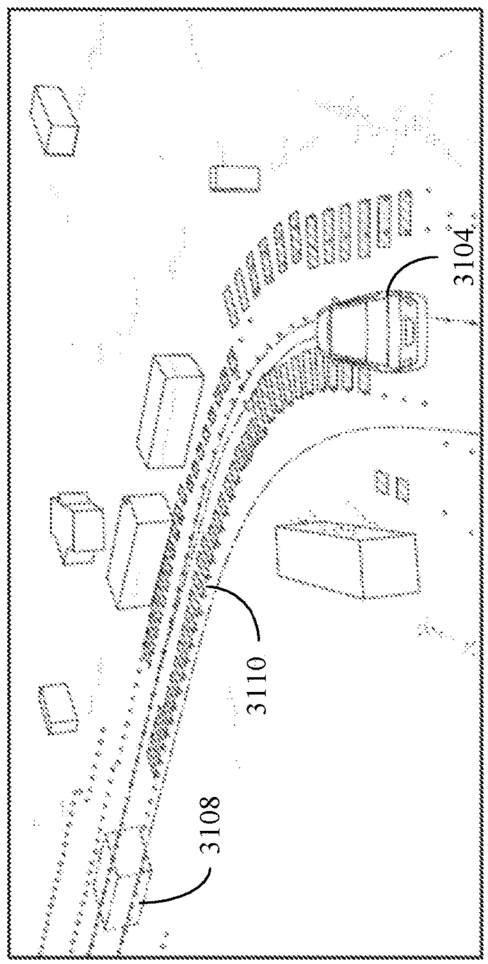
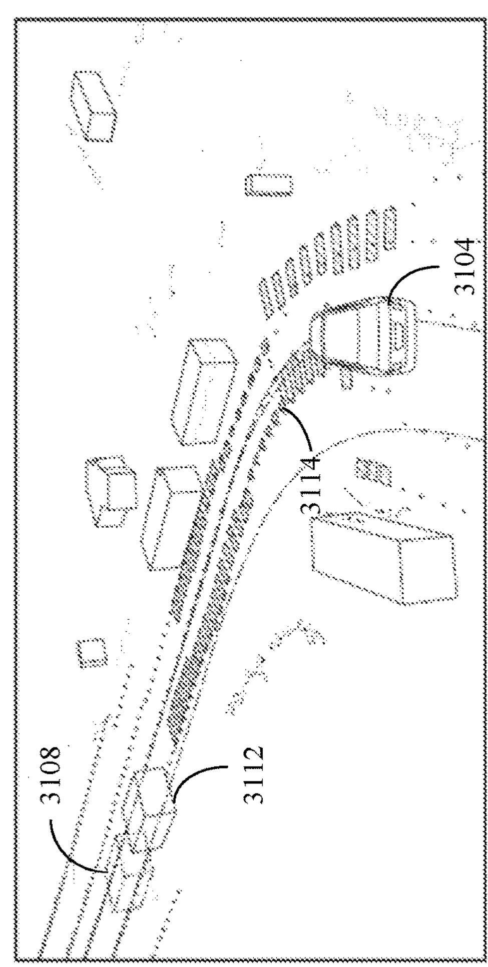
FIG. 31
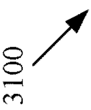

PROACTIVE RISK MITIGATION WITH GENERALIZED VIRTUAL VEHICLES

CROSS-REFERENCE TO RELATED APPLICATION(S)

This application is related to U.S. patent application Ser. No. 16/528,204, filed Jul. 31, 2019, and to U.S. patent application Ser. No. 17/377,657, filed Jul. 16, 2021, the contents of which are incorporated herein in their entireties by reference.

TECHNICAL FIELD

This application relates to risk mitigation for autonomous vehicles, including proactive risk mitigation in trajectory planning for autonomous vehicles.

BACKGROUND

Increasing autonomous vehicle usage creates the potential for more efficient movement of passengers and cargo through a transportation network. Moreover, the use of autonomous vehicles can result in improved vehicle safety and more effective communication between vehicles. However, external objects make traversing the transportation network difficult.

SUMMARY

Disclosed herein are aspects, features, elements, and implementations for proactive risk mitigation.

A first aspect is a method that includes identifying a location for a virtual vehicle; adding the virtual vehicle to a world object model maintained with respect to the vehicle; predicting a trajectory for the virtual vehicle; and autonomously controlling the vehicle according to an adjusted trajectory that is based on the trajectory for the virtual vehicle, where the adjusted trajectory includes at least one of a lateral constraint or a speed constraint. The location for the virtual vehicle is identified based on a lane in map data, a trajectory of a vehicle, and a perceptible area by sensors of the vehicle. The virtual vehicle is a hypothetical vehicle that is not observed by sensors of the vehicle.

A second aspect is an apparatus for proactively mitigating risk to a vehicle traversing a vehicle transportation network. The apparatus includes a processor that is configured to identify a location for a virtual vehicle that is unobservable by sensors of the vehicle; predict a trajectory for the virtual vehicle; and transmit signals to control the vehicle according to a proactive trajectory that is based on the trajectory for the virtual vehicle, where the proactive trajectory includes at least one of a lateral constraint or a speed constraint. The location for the virtual vehicle is identified based on a lane in map data, a trajectory of a vehicle, and a perceptible area by sensors of the vehicle.

A third aspect is a vehicle that includes a processor that is configured to proactively mitigate risk to the vehicle while traversing a vehicle transportation network by identifying a location for a virtual vehicle that is unobservable by sensors of the vehicle; predicting a trajectory for the virtual vehicle; and autonomously controlling the vehicle according to an proactive trajectory that is based on the trajectory for the virtual vehicle, where the proactive trajectory includes at least one of a lateral constraint or a speed constraint. The location is identified based on a lane in map data, a trajectory of the vehicle, and a perceptible area by sensors of the vehicle.

These and other aspects of the present disclosure are disclosed in the following detailed description of the embodiments, the appended claims, and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

FIG. 31 illustrates a scenario of using oncoming virtual vehicles.

DETAILED DESCRIPTION

Figure 1:
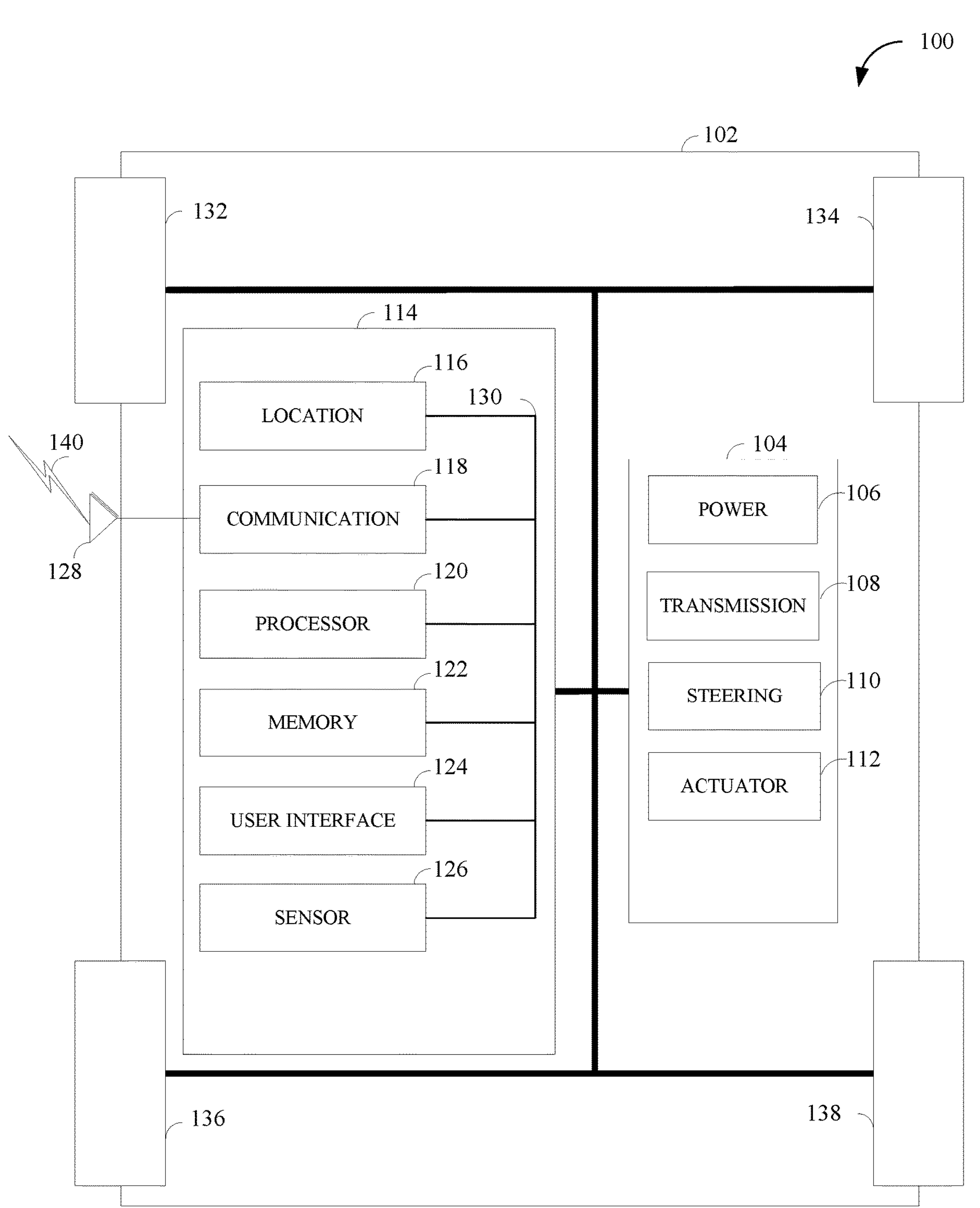
FIG. 1 is a diagram of an example of a portion of a vehicle in which the aspects, features, and elements disclosed herein may be implemented.

A vehicle may traverse a portion of a vehicle transportation network. The vehicle transportation network can include one or more unnavigable areas, such as a building; one or more partially navigable areas, such as a parking area (e.g., a parking lot, a parking space, etc.); one or more navigable areas, such as roads (which include lanes, medians, intersections, etc.); or a combination thereof.

The vehicle may include one or more sensors. Traversing the vehicle transportation network may include the sensors generating or capturing sensor data, such as data corresponding to an operational environment of the vehicle, or a portion thereof. For example, the sensor data may include information corresponding to one or more potential hazards that materialize into or are identified as (e.g., resolve to) respective external objects. Such an object may also be referred to as a hazard object herein.

A hazard object can be a static object. A static object is one that is stationary and is not expected to move in the next few seconds. Examples of static objects include a bike with no rider, a cold vehicle, an empty vehicle, a road sign, a wall, a building, a pothole, etc.

A hazard object can be a stopped object. A stopped object is one that is stationary but might move at any time. Examples of stopped objects include a vehicle that is stopped at a traffic light and a vehicle on the side of the road with an occupant (e.g., a driver). In some implementations, a stopped object may be considered a static object.

A hazard object can be a dynamic (i.e., moving) object, such as a pedestrian, a remote vehicle, a motorcycle, a bicycle, etc. The dynamic object can be oncoming (toward the vehicle) or can be moving in the same direction as the vehicle. The dynamic object can be moving longitudinally or laterally with respect to the vehicle. A stopped object can become a dynamic object, and vice versa.

There are two common courses of action responsive to detection of a potential hazard. The vehicle may ignore the potential hazard until the potential hazard is confirmed as a hazard object that may interfere with the vehicle's path of travel or is confirmed as a false positive (e.g., the potential hazard was sensor error). Alternatively, the vehicle may treat every potential hazard as a hazard object that may interfere with the vehicle's path of travel. Either course of action can be undesirable. Waiting may result in an inability to avoid the hazard object or in a maneuver to avoid the hazard object that is unnatural or uncomfortable for any passengers of the vehicle. Treating a potential hazard as a hazard object may result in the vehicle making unnecessary maneuvers (such as slowing down or moving laterally) where the potential hazard does not resolve.

Instead, and according to the teachings herein, proactive risk mitigation may be used that considers the reactive capabilities of the vehicle in planning a proactive trajectory for the vehicle that minimizes speed and/or lateral changes in movement responsive to a potential hazard while still allowing for a comfortable and safe reactive response (i.e., a reactive trajectory) in the event a hazard object interferes with the path of the vehicle.

This solution can leverage the fact that even when a driving environment is dynamic, the response by a vehicle (i.e., driven by a human, remotely operated, etc.) to a road condition can be predicted/anticipated. The behavior of a hazard object may be similarly predicted because traversing a vehicle transportation network is governed by rules of the road (e.g., a vehicle turning left yields to oncoming traffic, a vehicle drives between lane markings), by social conventions (e.g., driver(s) yield to the driver on the right at a stop sign), and physical limitations (e.g., a stationary object does not instantaneously move laterally into a vehicle's path).

This predictability may be used to predict hazard object behavior to control the response of a vehicle, such as an autonomous vehicle, a semi-autonomous vehicle, or any other vehicle including an advanced driver assist system (ADAS), while that vehicle traverses a vehicle transportation network. For example, if the vehicle is traveling in its lane on a two-lane road and an oncoming vehicle is passing a parked vehicle, it is likely that the oncoming vehicle will move closer to the lane and the vehicle such that the oncoming vehicle is a hazard object. For example, if another vehicle pulls over to the side of the road ahead of the vehicle, the driver's side door may open such that the other vehicle is a hazard object. In each case, a proactive trajectory for the vehicle may be determined that adjusts the planned path and speed proactively for collision avoidance if the hazard object materializes as predicted.

Where the hazard object is a dynamic object, however, a predicted behavior based on expected constraints may not accurately capture the full range of possible behaviors. A dynamic object may fail to yield or swerve outside of its expected path. A dynamic object may speed up or slow down, either alone or in combination with another unlikely behavior (e.g., failing to yield or swerving). In such cases, the interaction of the vehicle with the dynamic object may occur at an uncertain time and location. The proactive trajectories described herein address this unpredictability.

Further, where multiple hazards are identified, whether those hazards include a dynamic object or not, each hazard may be considered separately. However, separately considering each hazard may not result in an optimal trajectory because different hazards may represent different levels of risk to the vehicle. Considering the hazards as a whole to define a proactive trajectory is desirable, particularly where the vehicle is traveling along narrow lanes or residential streets, where the multiple hazards on both sides of the vehicle can result in a cluttered driving environment.

In addition to actual (e.g., sensed or observed) hazard objects, as described above, the disclosure herein is also related to (e.g., applies to) virtual hazards. In addition to reacting to (e.g., adjusting their driving behavior in response to) observed objects, human drivers tend to also drive slower and take other precautionary measures when driving around tight corners and/or driving in limited visibility environments (e.g., on a foggy day or a lane is not completely visible) or in anticipation of vehicles unexpectedly appearing. A human driver would anticipate the possibility that another road user (e.g., a vehicle) may emerge from just beyond their perception limits and take proactive actions in case of such occurrences. For example, a human driver may slow down or move over depending on the visibility range. To mimic human driver behaviors, therewith providing comfort to the occupants of a vehicle, the proactive risk mitigation described herein can also apply to virtual hazards (or virtual vehicles).

A virtual vehicle is an instantiated vehicle that is added to a world model. At the time that the virtual vehicle is added to the world model, the virtual vehicle does not correspond to an actual vehicle that was sensed by sensors of the vehicle. Processing of the virtual vehicle can proceed, at least to a great extent, as if it were in fact a sensed vehicle. That is, proactive risk mitigation can plan trajectories based on (e.g., in consideration of) virtual vehicles. Proactive risk mitigation with generalized virtual vehicles creates (e.g., instantiates) virtual vehicles in occluded regions of a road (e.g., a lane thereon) or at a maximum perception range. The virtual vehicles can then be used within the frameworks described herein, such as in proactive risk mitigation and trajectory planning, as hazards such that constraints can be generated. As described herein the constraints can be or include decreased speeds and/or pre-allocating space for passing. It is noted that unless otherwise explicitly stated or the context makes clear, references to a "hazard" encompasses an actual hazard and a virtual hazard.

To describe some implementations of the proactive risk mitigation according to the teachings herein in greater detail, reference is first made to the environment in which this disclosure may be implemented.

FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138 (i.e., wheels 132, 134, 136, and 138), and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals; power, such as electrical power or torque; or both information and power may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices. The processor 120 may also implement some or all of the proactive risk mitigation described herein.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 118 and a single one of the electronic communication interface 128, any number of communication units and any number of communication interfaces may be used. In some embodiments, the electronic communication unit 118 can include a dedicated short-range communications (DSRC) unit, a wireless safety unit (WSU), IEEE 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

The vehicle, such as the vehicle 100, may be an autonomous vehicle or a semi-autonomous vehicle. For example, as used herein, an autonomous vehicle as used herein should be understood to encompass a vehicle that includes an advanced driver assist system (ADAS). An ADAS can automate, adapt, and/or enhance vehicle systems for safety and better driving such as by circumventing or otherwise correcting driver errors.

Figure 2:
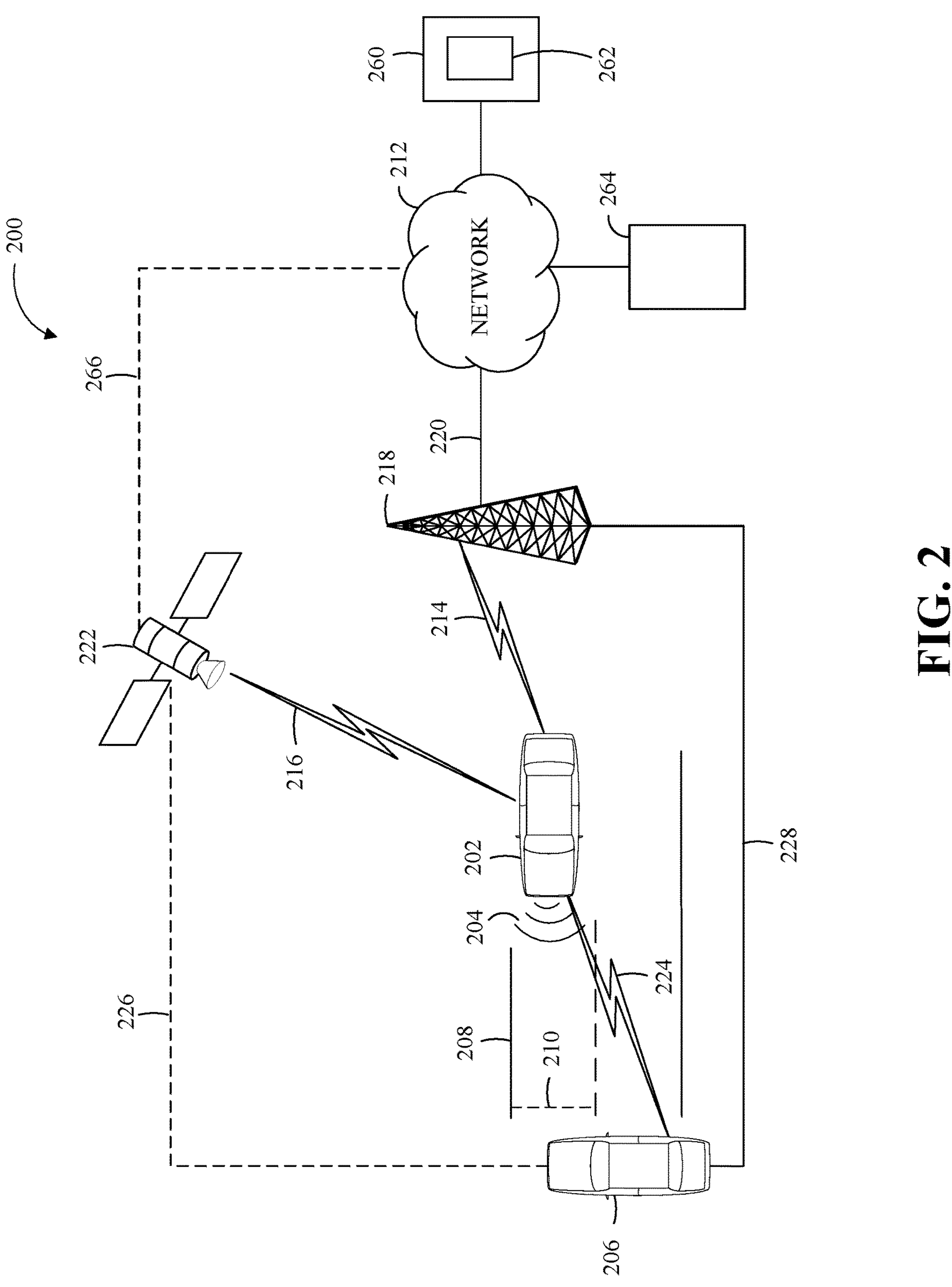
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 260. For example, the vehicle 202 or the external object 206 may receive information, such as information representing the transportation network 208, from the operations center 260 via the electronic communication network 212.

The operations center 260 includes a controller apparatus 262, which includes some or all of the features of the controller 114 shown in FIG. 1. The controller apparatus 262 can monitor and coordinate the movement of vehicles, including autonomous vehicles. The controller apparatus 262 may monitor the state or condition of vehicles, such as the vehicle 202, and external objects, such as the external object 206. The controller apparatus 262 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 262 can establish remote control over one or more vehicles, such as the vehicle 202, or external objects, such as the external object 206. In this way, the controller apparatus 262 may teleoperate the vehicles or external objects from a remote location. The controller apparatus 262 may exchange (send or receive) state data with vehicles, external objects, or a computing device, such as the vehicle 202, the external object 206, or a server computing device 264, via a wireless communication link, such as the wireless communication link 226, or a wired communication link, such as the wired communication link 228.

The server computing device 264 may include one or more server computing devices, which may exchange (send or receive) state signal data with one or more vehicles or computing devices, including the vehicle 202, the external object 206, or the operations center 260, via the electronic communication network 212.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some implementations, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 260. For example, a host, or subject, vehicle 202 may receive one or more automated inter-vehicle messages, such as a basic safety message (BSM), from the operations center 260 via a direct communication link 224 or via an electronic communication network 212. For example, the operations center 260 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 260, or with a combination thereof via wired or wireless communication links 214, 220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 260, or with a combination thereof via one or more communication links 216, 266. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 260 via the electronic communication network 212, access point 218, or satellite 222. The operations center 260 may include one or more computing devices, which are able to exchange (send or receive) data from a vehicle, such as the vehicle 202; data from external objects, including the external object 206; or data from a computing device, such as the server computing device 264.

In some embodiments, the vehicle 202 identifies a portion or condition of the transportation network 208. For example, the vehicle 202 may include one or more on-vehicle sensors 204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 260. However, any number of vehicles, networks, or computing devices may be used. In some embodiments, the vehicle transportation and communication system 200 includes devices, units, or elements not shown in FIG. 2.

Although the vehicle 202 is shown communicating with the operations center 260 via the electronic communication network 212, the vehicle 202 (and the external object 206) may communicate with the operations center 260 via any number of direct or indirect communication links. For example, the vehicle 202 or the external object 206 may communicate with the operations center 260 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 260. The data may be, for example, sensor data from the infrastructure element.

Figure 3:
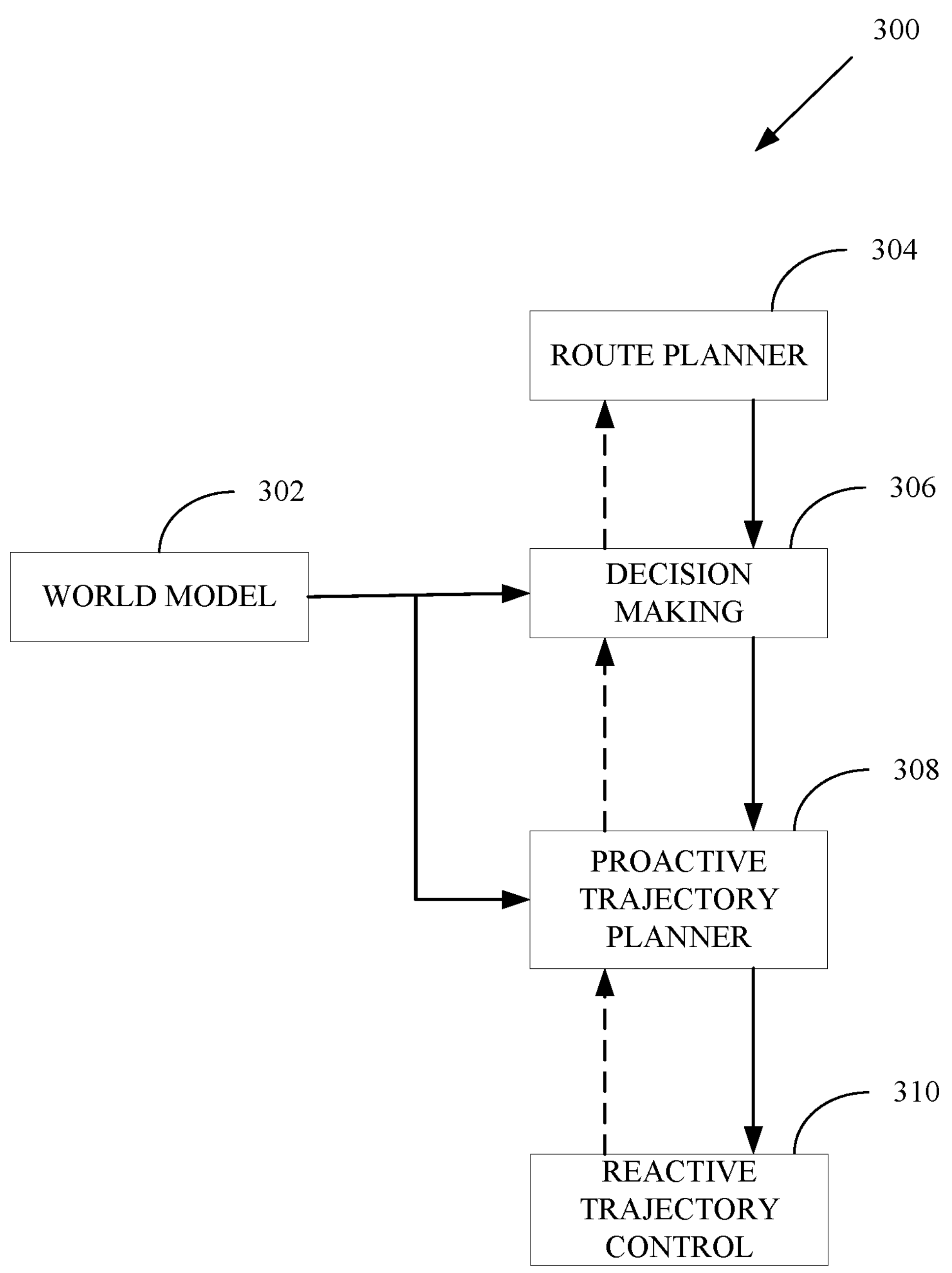
FIG. 3 is a diagram of a system for vehicle control using proactive risk mitigation according to implementations of this disclosure.

FIG. 3 is a diagram of a system 300 for vehicle control using proactive risk mitigation according to implementations of this disclosure. Although described with the vehicle traveling through a vehicle transportation network, such as the vehicle transportation network 208, the teachings herein may be used in any area navigable by a vehicle. The system 300 may represent a software pipeline of a vehicle, such as the vehicle 100 of FIG. 1. The system 300 includes a world model 302, a route planner 304, a decision making module 306, a proactive trajectory planner 308, and a reactive trajectory control 310. Other examples of the system 300 can include more, fewer, or other components. In some examples, the components can be combined; in other examples, a component can be divided into more than one component.

The world model 302 receives sensor data, such as from the sensor 126 of FIG. 1, and determines (e.g., converts to, detects, etc.) objects from the sensor data. That is, the world model 302 determines hazard objects (e.g., road users) from the received sensor data. For example, the world model 302 can convert a point cloud received from a light detection and ranging (LiDAR) sensor (i.e., a sensor of the sensor 126) into an object, such as a hazard object. Sensor data from several sensors can be fused together to identify the objects. Examples of objects include a non-motorized vehicle (e.g., a bicycle), a pedestrian or animal, a motorized vehicle, etc.

The world model 302 can receive sensor information that allows the world model 302 to calculate and maintain additional information for at least some of the detected objects. For example, the world model 302 can maintain a state for at least some of the determined objects. The state for an object can include zero or more of a velocity, a pose, a geometry (such as width, height, and depth), a classification (e.g., bicycle, large truck, pedestrian, road sign, etc.), and a location. As such, the state of an object includes discrete state information (e.g., classification) and continuous state information (e.g., pose and velocity).

The world model 302 fuses sensor information, tracks objects, maintains lists of hypotheses for at least some of the dynamic objects (e.g., an object A might be going straight, turning right, or turning left), creates and maintains predicted trajectories for each hypothesis, and maintains likelihood estimates of each hypothesis (e.g., object A is going straight with probability 90% considering the object pose/velocity and the trajectory poses/velocities). In an example, the world model 302 uses an instance of the trajectory planner to generate the predicted trajectories for each object hypothesis for at least some of the dynamic objects. For example, an instance of the trajectory planner can be used to generate predicted trajectories for vehicles, bicycles, and pedestrians. In another example, an instance of a trajectory planner, such as the trajectory planner described below, can be used to generate predicted trajectories for vehicles and bicycles, and a different method can be used to generate predicted trajectories for pedestrians.

The objects maintained by the world model 302 can include hazard objects, which can include static objects, dynamic objects, or both.

The route planner 304 determines a road-level plan. For example, given a starting location and a destination location, the route planner 304 determines a route from the starting location to the destination location. The route planner 304 can determine the list of roads (i.e., the road-level plan) to be followed by the vehicle to navigate from the starting location to the destination location.

The road-level plan determined by the route planner 304 and the objects (and corresponding state information) maintained by the world model 302 can be used by the decision making module 306 to determine discrete-level decisions along the road-level plan. Examples of decisions included in the discrete-level decisions may include: stop at the next intersection, move forward slowly, accelerate to a certain speed limit, merge into the next lane, etc.

The proactive trajectory planner 308 can receive the discrete-level decisions, the objects (and corresponding state information) maintained by the world model 302, and the predicted trajectories and likelihoods of the external objects from the world model 302. The proactive trajectory planner 308 can use at least some of the received information to determine a detailed-planned trajectory, also referred to herein as a proactive trajectory, for the vehicle.

For example, the proactive trajectory planner 308 determines a next-few-seconds trajectory. As such, and in an example where the next few seconds are the next 6 seconds (i.e., a look-ahead time of 6 seconds), the proactive trajectory planner 308 determines a trajectory and locations for the vehicle in the next 6 seconds. For example, the proactive trajectory planner 308 may determine (e.g., predict, calculate, etc.) the expected locations of the vehicle at several time intervals (e.g., every one-quarter of a second, or some other time intervals). The proactive trajectory planner 308 is described in more detail below.

The reactive trajectory control 310 can handle situations that the vehicle may encounter but may not be handled by the proactive trajectory planner 308. Such situations include situations where the proactive trajectory of the proactive trajectory planner 308 was based on misclassification of objects and/or unanticipated situations that rarely occur. For example, the reactive trajectory control 310 can modify the proactive trajectory in response to determining that a static object to the left of the vehicle is misclassified. The object may have been classified as a large truck; however, a new classification determines that it is a static road barrier wall. In another example, the reactive trajectory control 310 can modify the proactive trajectory in response to a sudden tire blowout of the vehicle. Other examples of unanticipated situations include another vehicle swerving suddenly (e.g., due to late decision to get to highway off-ramp or tire blowout) into the lane of the vehicle and a pedestrian or other object emerging suddenly from behind an occlusion.

In some implementations, a predictive algorithm of the proactive trajectory planner 308 may be configured to produce plans at 10 hz; on the other hand, the reactive trajectory control 310 may be configured to produce plans at 100 hz.

Figure 4:
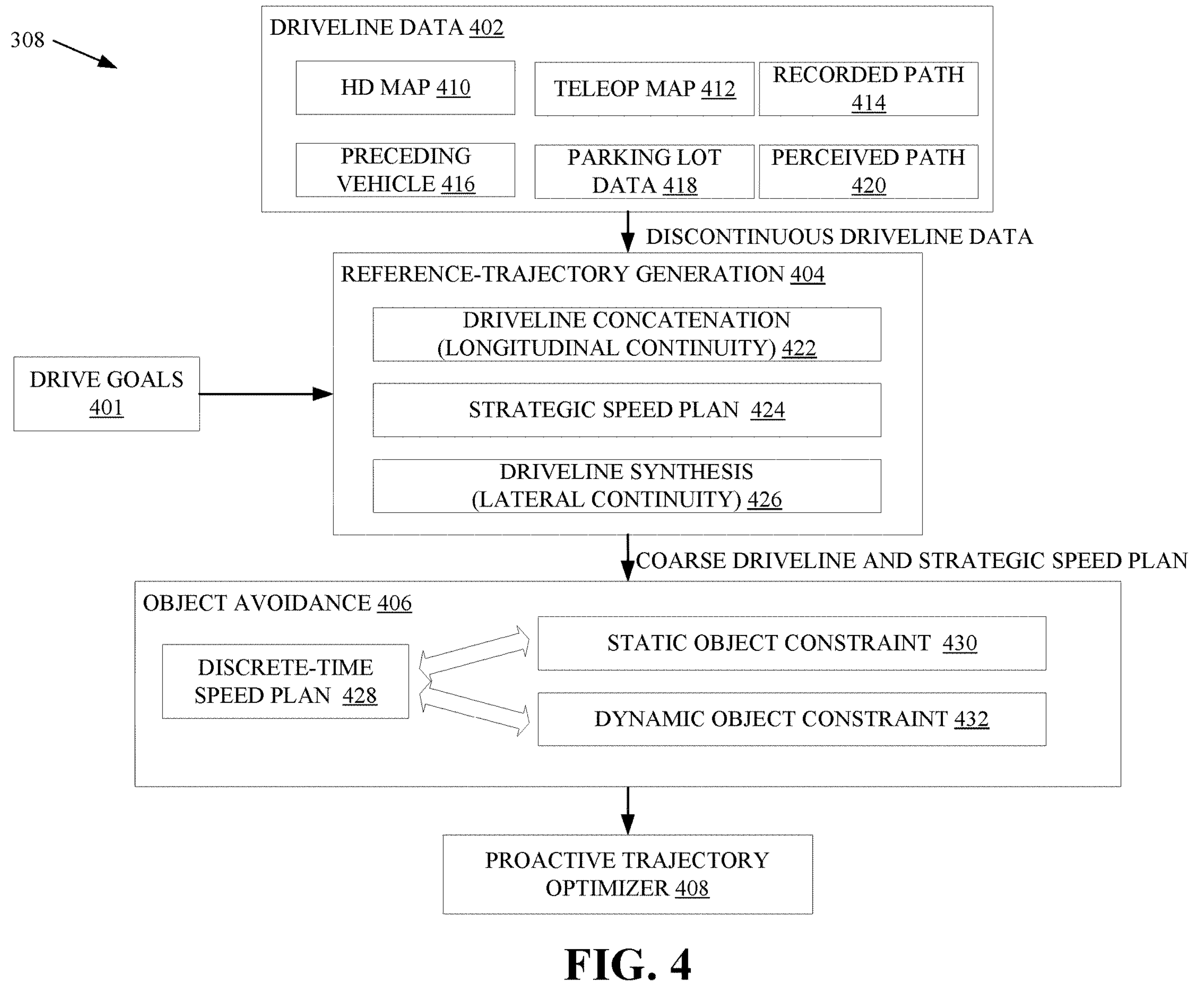
FIG. 4 is a diagram of layers of a proactive trajectory planner according to FIG. 3.

FIG. 4 is a diagram showing one example of how the proactive trajectory planner 308 according to FIG. 3 may be implemented. The proactive trajectory planner 308 can receive drive goals 401. The proactive trajectory planner 308 can receive the drive goals 401 as a series of lane selections and speed limits that connect a first location to a second location. For example, a drive goal of the drive goals 401 can be "starting at location x, travel on a lane having a certain identifier (e.g., lane with an identifier that is equal to A123) while respecting speed limit y". The proactive trajectory planner 308 can be used to generate a trajectory that accomplishes the drive goals 401.

In this example, the proactive trajectory planner 308 includes a driveline data layer 402, a reference-trajectory generation layer 404, an object avoidance layer 406, and a proactive trajectory optimization layer 408. The proactive trajectory planner 308 generates a proactive trajectory. Other examples of the proactive trajectory planner 308 can include more, fewer, or other layers. In some examples, the layers can be combined; in other examples, a layer can be divided into one or more other layers. The layers may be implemented by software or one or more modules including a hardware module (such as, for example, an application-specific integrated circuit, or the like).

The driveline data layer 402 includes the input data that can be used by the proactive trajectory planner 308. The driveline data can be used (e.g., by the reference-trajectory generation layer 404) to determine (i.e., generate, calculate, or select) a coarse driveline from a first location to a second location. The driveline can be thought of as the line in the road over which the longitudinal axis of the vehicle coincides as the vehicle moves along the road. As such, the driveline data is data that can be used to determine the driveline. The driveline is coarse, at this point, and may contain lateral discontinuities such as when directed to transition laterally between adjacent lanes. The driveline at this point is also not yet adjusted for objects encountered by the vehicle, as further described below.

In an example, the driveline data layer 402 can include one or more of High Definition (HD) map data 410, teleoperation map data 412, recorded paths data 414, preceding vehicle data 416, parking lot data 418, and perceived path data 420.

The HD map data 410 may be data from a high-definition (i.e., high-precision) map that can be used by an autonomous vehicle. The HD map data 410 can include accurate information regarding a vehicle transportation network to within a few centimeters. For example, the HD map data 410 can include details regarding road lanes, road dividers, traffic signals, traffic signs, speed limits, and the like. In some implementations, map data may be obtained from a lower quality map than an HD map.

The teleoperation map data 412 can include relatively short driveline data. For example, the teleoperation map data 412 can be driveline data that are 100 meters to 200 meters long. However, the teleoperation map data 412 is not necessarily so limited. The teleoperation map data 412, when present, can be manually generated by a teleoperator in response to, or in anticipation of, exceptional situations that the vehicle is not capable of automatically handling.

The recorded paths data 414 can include data regarding paths previously followed by the vehicle. In an example, an operator (e.g., a driver or a remote operator) of the vehicle may have recorded a path from the street into the garage of a home.

The preceding vehicle data 416 can be data received from one or more vehicles that precede the vehicle along a generally same trajectory as the vehicle. In an example, the vehicle and a preceding vehicle can communicate via a wireless communication link, such as described with respect to FIG. 2. As such, the vehicle can receive trajectory and/or other information from the preceding vehicle via the wireless communication link. The preceding vehicle data 416 can also be perceived (e.g., followed) without an explicit communication link. For example, the vehicle can track the preceding vehicle and can estimate a vehicle driveline of the preceding vehicle based on the tracking results. A preceding vehicle, where present, may also be treated as a dynamic object as described below.

The parking lot data 418 includes data regarding locations of parking lots and/or parking spaces. The parking lot data 418 may be used to predict trajectories of other vehicles. For example, if a parking lot entrance is proximate to another vehicle, one of the predicted trajectories of the other vehicle may be that the other vehicle will enter the parking lot.

In some situations, map (e.g., HD map) information may not be available for portions of the vehicle transportation network. As such, the perceived path data 420 can represent drivelines where there is no previously mapped information. Instead, the vehicle can detect drivelines in real time using fewer, more, or other than lane markings, curbs, and road limits. In an example, road limits can be detected based on transitions from one terrain type (e.g., pavement) to other terrain types (e.g., gravel or grass). Other ways can be used to detect drivelines in real time.

The reference-trajectory generation layer 404 can include a driveline concatenation module 422, a strategic speed plan module 424, and a driveline synthesis module 426. The reference-trajectory generation layer 404 provides the coarse driveline (i.e., a reference driveline) to a discrete-time speed plan module 428.

It is noted that the route planner 304 can generate a lane ID sequence that is used to travel from a first location to a second location, thereby corresponding to (e.g., providing) the drive goals 401. For this reason, the drive goals 401 can be 100's of meters apart, depending on the length of a lane. In the case of the HD map data 410, for example, the reference-trajectory generation layer 404 can use a combination of a location (e.g., GPS location, 3D Cartesian coordinates, etc.) and a lane (e.g., the identifier of the lane) in the sequence of the drive goals 401 to generate a high resolution driveline (e.g., from the HD map data 410) represented as series of poses for the vehicle. Each pose can be at a predetermined distance. For example, the poses can be one to two meters apart. A pose can be defined by variables such as coordinates (x, y, z), roll angle, pitch angle, and/or yaw angle.

As mentioned above, the driveline data can be used to determine (e.g., generate, calculate, etc.) a coarse driveline. The driveline concatenation module 422 splices (e.g., links, fuses, merges, connects, integrates, or otherwise splices) the input data of the driveline data layer 402 to determine the coarse driveline along the longitudinal direction (e.g., along the path of the vehicle). For example, to get from location A (e.g., work) to location D (e.g., home), to determine the coarse driveline, the driveline concatenation module 422 can use input data from the parking lot data 418 to determine a location of an exit from the work location parking lot to exit to the main road, can use data from the HD map data 410 to determine a path from the main road to the home, and can use data from the recorded paths data 414 to navigate into a driveway at home.

The coarse driveline does not include speed information. In some implementations, however, the coarse driveline can include speed limit information that can be used (e.g., extracted) from the HD map data 410. The strategic speed plan module 424 determines specific speed(s) along the different portions of the coarse driveline. For example, the strategic speed plan module 424 can determine that, on a first straight section of the coarse driveline, the speed of the vehicle can be set to the speed limit of that first straight section; and on a subsequent second curved section of the coarse driveline, the speed of the vehicle is to be set to a slower speed.

More specifically, inputs used by the strategic speed plan module 424 may include one or more speed limits, one or more acceleration limits, or both. The speed limits can include one or more of road speed limits, such as posted speed limits, curvature speed limits (and/or road curvature information, such as turning radius, from which a speed limit may be calculated), and seamless autonomous mobility (SAM) data, i.e., data gathered (such as in a cloud-based system) from vehicles that provide information about the road and/or traffic conditions that may be used in the determination of speed. For example, vibration data collected from vehicles along a portion of a road that correlate vibration levels and speeds at different portions of the road may be used to determine an unacceptable level of vibration when a vehicle is traveling above a certain speed. This could provide another speed limit for consideration in determining the strategic speed plan.

In an example, the SAM data can be received by the vehicle from a central server, such as the operations center 260, the server computing device 264, or some other network device. In an example, the SAM data can be data accumulated from other vehicles within a certain time period (e.g., 1 minute, 10 minutes, 20 minutes, etc.) of the vehicle arriving at a location. In some implementations, the vehicle can pull the SAM data itself, or the SAM data can be pushed to the vehicle based on the vehicle reporting its location to a server that provides the SAM data.

The road speed limits, the curvature speed limits, and the SAM data may be combined to provide raw speed limits. For example, for locations along the coarse driveline (e.g., every 5 meters, 10 meters, etc.), the minimum of the speed limits at a location may be used as a raw speed limit at that location. The raw speed limits may be modified by the acceleration limits, such as vehicle acceleration limits (e.g., based on the torque and power of the vehicle) and human comfort limits regarding acceleration, which may be less than the vehicle acceleration limits. For example, the acceleration limits may be combined by finding the minimum of the two maximum curves (comfort, speed). In some implementations, the strategic speed plan may result from solving for the fastest speed profile along the coarse driveline that satisfies the constraints on speed (speed limit at any given location along the driveline) and acceleration (acceleration limit at any given speed).

In this way, the strategic speed plan module 424 may compute a law-abiding (e.g., respecting speed limits and stop lines), comfortable (e.g., physically and emotionally), and physically realizable speed plan (e.g., speed versus distance along the driveline) for the coarse driveline considering the current state (e.g., speed and acceleration) of the vehicle but not considering other road users or static objects.

Once a strategic speed plan (also referred to as a strategic speed profile) is determined by the strategic speed plan module 424, the driveline synthesis module 426 can adjust the coarse driveline laterally. Considering the strategic speed plan and the coarse driveline with lateral discontinuities, the driveline synthesis module 426 determines the start and end locations of the lane change and synthesizes a driveline connecting the two locations.

The driveline synthesis module 426 can synthesize drivelines joining laterally-discontinuous locations in the coarse driveline. For example, assume that the HD map data 410 includes a first section of the coarse driveline that is on a first lane of a road but that a second section of the coarse driveline is on a second lane of the same road. As such there exists a lateral discontinuity in the coarse driveline. The driveline synthesis module 426 first determines a transition distance (or, equivalently start and end locations) over which the vehicle should transition from the first lane to the second lane. That is, the start position is the road position when the vehicle is to be controlled to start moving from the first lane to the second lane. The end position is the road position when the vehicle is to have completed the lane change. The driveline synthesis module 426 then generates new driveline data joining the start position in the first lane to the end position in the second lane.

The transition determined by the driveline synthesis module 426 (e.g., the length of the lane change) can be speed dependent. For example, a shorter transition distance can be required for the vehicle to transition from the first lane to the second lane when the vehicle is moving at a slower speed than when the vehicle is moving at a higher speed. For example, in a heavy traffic situation where the vehicle is traveling at a slower speed (e.g., 15 MPH), 20 yards may be required for the transition; however, if the vehicle is traveling at a higher speed (e.g., 65 MPH), then the transition distance may be 100 yards. Thus, the driveline synthesis module 426 can determine the transition position depending on the speed of the vehicle.

The output of the driveline synthesis module 426 is provided to the object avoidance layer 406. The output of the driveline synthesis module 426 includes the coarse driveline and the strategic speed plan. The object avoidance layer 406 generates a medium-term, discrete-time speed plan and lateral constraints on the coarse driveline. For discrete points in time in the future (or, equivalently, at discrete locations along the path of the vehicle), the discrete-time speed plan module 428 determines (i.e., calculates) a respective desired or target speed, acceleration/deceleration, or both, for the vehicle.

At the object avoidance layer 406, and as further described below, using the coarse driveline, nearby hazard objects (e.g., static, dynamic, or both), and predicted trajectories for any dynamic hazard object, the object avoidance layer 406 determines a drivable area where the vehicle can be safely operated, along with a revised driveline, a discrete-time speed plan, or both. In brief, the coarse driveline is evaluated and/or adjusted for hazard objects, such as those described with respect to the world model 302 of FIG. 3. Given a current speed of the vehicle, the object avoidance layer 406 generates the discrete-time (e.g., real-time) speed plan at the discrete-time speed plan module 428. Using the speed plan, the object avoidance layer 406 can estimate future locations of the vehicle at discrete future time points. The future locations can be evaluated against the locations of the hazard objects (i.e., the objects of the world model) and the constraints they impose on the trajectory of the vehicle at the static object constraint module 430 and the dynamic object constraint module 432, to optimize the proactive trajectory at the proactive trajectory optimization layer 408. The proactive trajectory is determined to provide (e.g., generate) a smooth drive for the vehicle. Determining a smooth proactive trajectory can be an iterative process.

Figure 5:
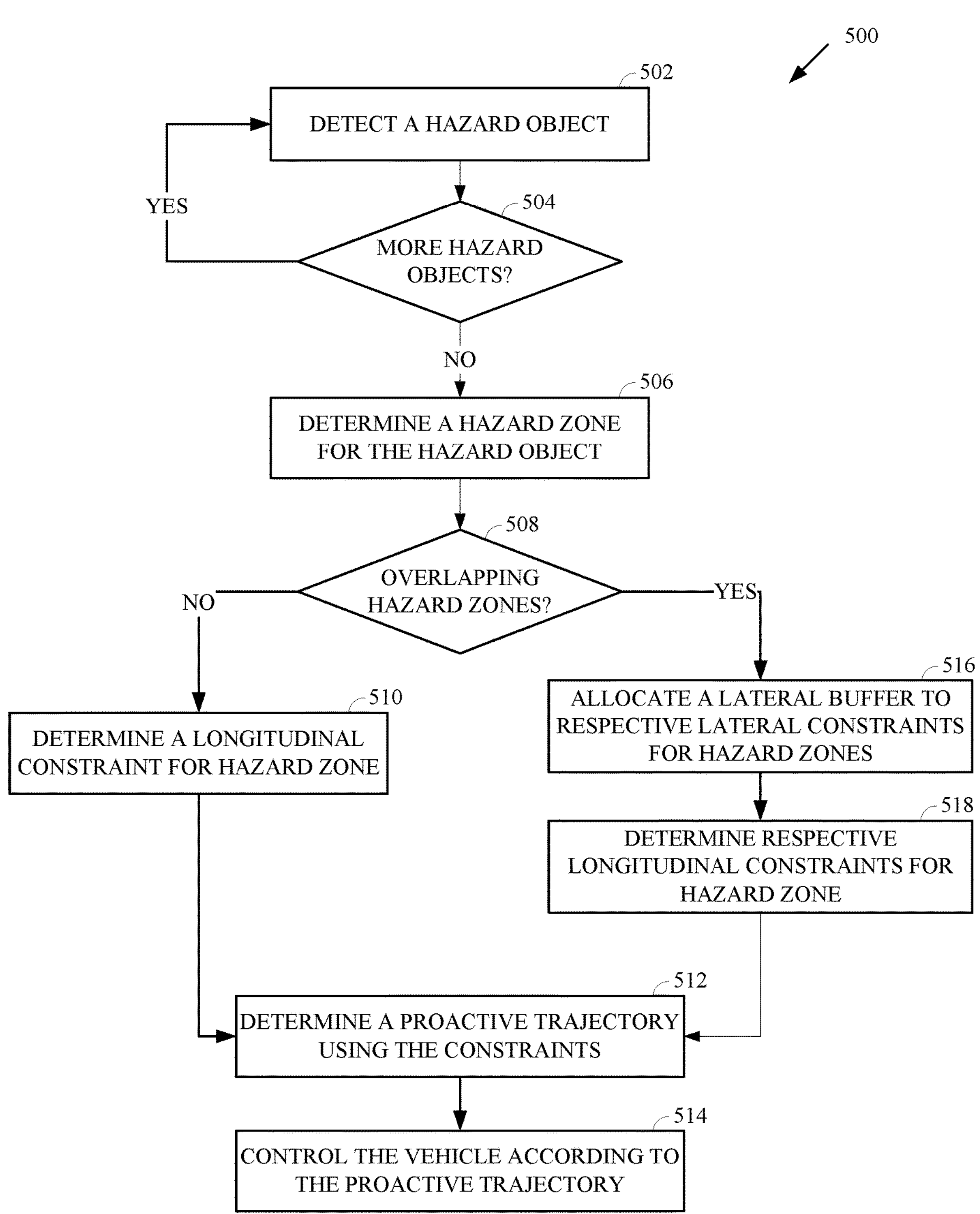
FIG. 5 is a flowchart diagram of a method for proactive risk mitigation according to implementations of this disclosure.

Further details of determining the drivable area and discrete-time speed plan at the object avoidance layer 406 and optimizing the proactive trajectory at the proactive trajectory optimization layer 408 are described with regards to FIG. 5, which is a flowchart diagram of a method 500 for proactive risk mitigation according to implementations of this disclosure. The method 500 can be stored as executable instructions in a memory, such as the memory 122 of FIG. 1. The executable instructions can be executed by a processor, such as the processor 120 of FIG. 1. The method 500 can be executed in whole or in part by hardware components associated with a computer. The method 500 can be executed by the vehicle 100 of FIG. 1, the vehicle 202 shown in FIG. 2, by remote assistance support described previously, or by a combination thereof. For example, the method 500 can be executed in whole or in part in a computing apparatus, including the controller apparatus 262 shown in FIG. 2. In an implementation, some or all aspects of the method 500 can be implemented in a system combining some or all of the features described in this disclosure. For example, the method 500 can be utilized by the object avoidance layer 406, the proactive trajectory optimization layer 408, or both.

Although described herein at times with reference to an autonomous vehicle, the methods and apparatuses described herein may be implemented in any vehicle capable of autonomous or semi-autonomous operation, such as one including an ADAS. Although described with reference to a vehicle transportation network, the method and apparatus described herein may include the vehicle operating in any area navigable by the vehicle.

In brief, the method 500 for proactively mitigating risk to a vehicle traversing a vehicle transportation network can include determining respective hazard zones for detected hazard objects, which hazard zones respectively define a target lateral constraint associated with the hazard object, e.g., based on its state as a static hazard object (also referred to as a static object) or as a dynamic hazard object (also referred to as a dynamic object). A target lateral constraint may be one that allows the vehicle to avoid the hazard object without a speed constraint (e.g., without modifying the current time speed plan). Lateral buffer algorithms may be used where hazard zones are present in the same discretized time and location (e.g., they overlap in the longitudinal direction) to determine a final size of lateral buffers. The allocation may be determined based on a cost function that optimizes for risk posed by the hazard objects, including the target lateral constraints, as described in more detail below. Longitudinal constraints for each hazard zone may be computed based on a respective time of arrival of the vehicle at the hazard zone. The proactive constraints are then processed together to determine a proactive trajectory that is a modification of the previous trajectory. For example, the most restrictive longitudinal (speed) constraint may require the vehicle to follow a road user (e.g., a bicycle or vehicle) ahead of the vehicle, to accelerate, and/or to decelerate according to a longitudinal contingency. The lateral constraints may require the vehicle to move laterally according to a lateral contingency. Further details are described below.

More specifically, at 502, a first hazard object can be detected. When describing hazard objects herein and within the claims, the terms "first", "second", etc., may be used without limitation as to the order in which the objects are detected unless otherwise noted or clear from context. Instead, these terms are used merely to distinguish one object from another object. The first hazard object is ahead of the vehicle in a direction of travel of the vehicle. For example, the direction of travel of the vehicle may be a direction indicated by coarse driveline and the strategic speed plan output from the reference-trajectory generation layer 404, or may be a direction indicated by the proactive trajectory generated by the proactive trajectory planner 308 (e.g., by the proactive trajectory optimization layer 408) during a previous iteration of the method 500. In some implementations, the vehicle is traversing a lane within the vehicle transportation network, where the lane is defined by a left lane boundary and a right lane boundary extending in a longitudinal direction relative to the direction of travel. One or more of the detected hazard objects can be a virtual vehicle, which can be detected as described herein. Detecting a virtual vehicle includes identifying a location for the virtual vehicle and adding the virtual vehicle to a world model.

The objects can be at least some of the external objects (e.g., actual or virtual objects) maintained by the world model 302. For example, the nearby objects can be objects within a predetermined distance from the vehicle, objects within a predicted arrival time of the vehicle, or objects that meet other criteria for identifying the objects. This also referred to herein as a look-ahead time or a look-ahead distance, or both. Hazard objects are detected at 502 until there are no more hazard objects detected in response to the query at 504.

Once the hazard objects are detected, a respective hazard zone for a hazard object is determined at 506. For example, a first hazard zone may be determined for a first hazard object ahead of the vehicle in the direction of travel of the vehicle. A hazard zone for a stationary or static object is first described with reference to FIG. 6, which is a diagram of an example of determining a hazard zone for a static hazard object in accordance with an implementation of this disclosure.

Figure 6:
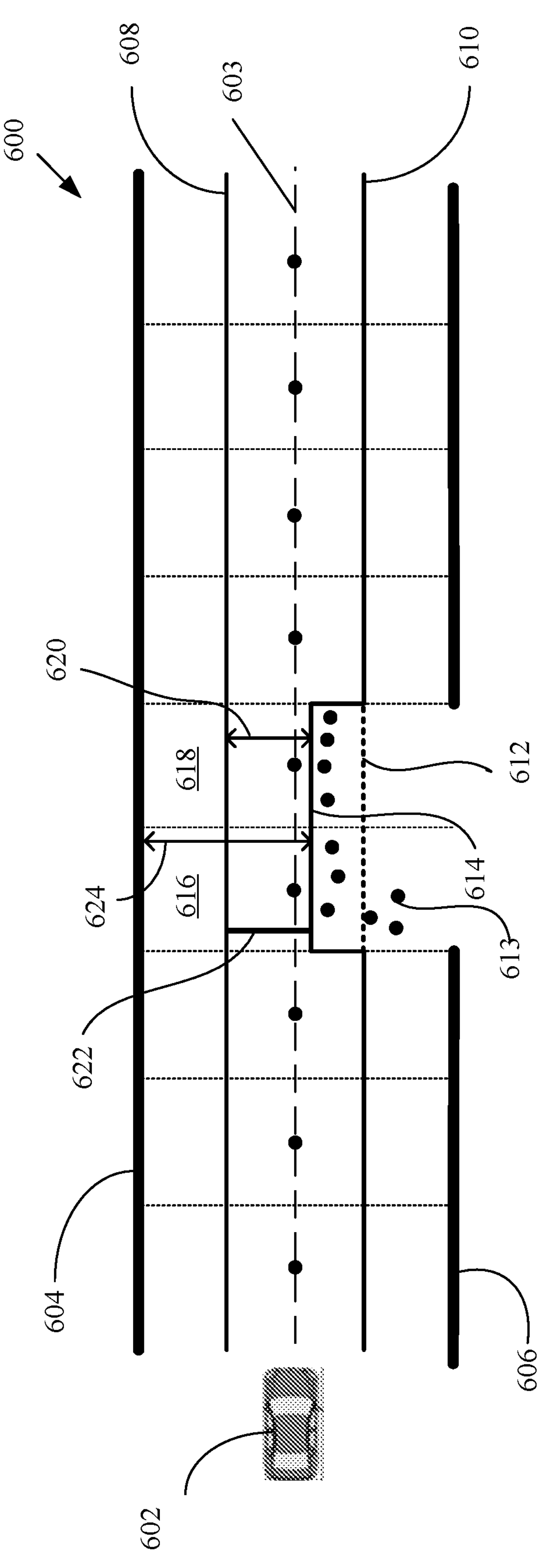
FIG. 6 is a diagram of an example of determining a hazard zone for a static hazard object in accordance with an implementation of this disclosure.

In general, FIG. 6 illustrates a drivable area and a discrete-time speed plan. The drivable area is, for example, the area of a vehicle transportation network where the vehicle may be safely driven. Initially, the drivable area can include areas where the vehicle may travel that correspond to the reference trajectory (e.g., the coarse driveline and strategic speed plan) from the reference-trajectory generation layer 404, that is, areas without consideration of detected objects. For example, the drivable area can be a predefined distance from the vehicle along the coarse driveline (e.g., in the longitudinal direction). The drivable area can be the area where the vehicle can be (e.g., legally and/or physically) driven.

In an example, the drivable area can be extracted from an HD map based on the current location of the vehicle. The drivable area can be bounded by the left and right boundaries of a lane (or a road, or some other region) in which the vehicle is located. A lane does not have to correspond to a marked lane. For example, the default drivable area of a lane may be defined by a default width, such as 8 meters or some other value. In an example, the drivable area can span the centerline of a road. That is, the opposite-direction traffic lane can be included in the drivable area. In an example, the drivable area can be an area bounded (i.e., in the lateral direction) by a median, a shoulder, or both a median and a shoulder. In some implementations, the drivable area can be limited by barriers (e.g., concrete barriers) that may be in the median or elsewhere. Such barriers may be treated as static hazard objects as described below.

Thereafter, the areas where the vehicle cannot be predicted to be safely driven may be removed from (e.g., cut out of) the drivable area to result in an adjusted drivable area later used for determining the proactive trajectory that avoids objects. These areas correspond to a hazard zone for a hazard object. If no static and/or dynamic objects interfere with the current trajectory of the vehicle, then the adjusted drivable area is the same as the drivable area.

Referring to FIG. 6, a coarse driveline 603 is the coarse driveline of a vehicle 602. A default drivable area of the vehicle 602 is defined by a left boundary 604 and a right boundary 606, which can define the maximum width of the drivable area (i.e., drivable area boundaries). However, as it may be preferable to keep the vehicle 602 within its lane, the left lane boundary 608 and the right lane boundary 610 are also considered in the analysis of a hazard zone. In some implementations, a lane boundary may be coincident with a drivable area boundary.

In this example, the right lane boundary 610 includes a portion 612. The portion 612 is shown as a dashed line because, as further described below, this portion of the drivable area is to be adjusted. The drivable area of the vehicle 602 may be divided into bins, as shown. Each bin may have a center point, which can be equally spaced. For example, the center points can be approximately two meters apart, or can be spaced closer or more distant depending on the speed of the vehicle 602. Boundary points 613 corresponding to a detected object are assigned to respective bins, such as bins 616, 618. For example, the boundary points can be derived from data from a LiDAR sensor, a laser pointer, a radar, or any other sensor, such as the sensor 126 of FIG. 1. The boundary points can represent (x, y) coordinates that are occupied or are otherwise off-limits to the AV. As the boundary points 613 of the bins 616, 618 appear to correspond to a large, rectangular object, the object may be classified (for example, by the world model 302 of FIG. 3) as a "truck." Boundary points 613 may correspond to one or more objects.

Boundaries corresponding to (i.e., defined based on) an object can be referred to as hard boundaries. A hard boundary is such that, if the planned trajectory for the vehicle were to cross the hard boundary, a collision with the object is likely. On the other hand, lane and/or road markings can be referred to as soft boundaries and represent lawful or logical boundaries. A soft boundary is such that, if the planned trajectory were to cross the soft boundary that is not also a hard boundary, the motion of the vehicle may be unlawful and/or less socially acceptable, but the vehicle is likely safe from a collision with the object. As shown in FIG. 6, for example, the left boundary 604 (i.e., the left drivable area boundary) defines the left hard boundary and the left lane boundary 608 defines the left soft boundary. The right hard boundary is comprised of the right boundary 606 (i.e., the right drivable area boundary) and the boundary 614; the right soft boundary is defined by the right lane boundary 610 and the boundary 614. As mentioned above, a left lane boundary, such as the left lane boundary 608, may be coincident with a left boundary of the drivable area; hence, the left lane boundary 608 may define a left hard boundary. Similarly, a right lane boundary, such as the right lane boundary 610, may be coincident with a right boundary of the drivable area; hence, the right lane boundary 610, together with the boundary 614, may define a right hard boundary.

The cut-out defined (i.e., bounded) by the bins 616, 618 and the boundary 614 may be referred to as a hazard zone herein. Although not expressly described, there may be an allowance around the measured groups of points such that the hazard zone is expanded beyond those points. Such a clearance area allows for uncertainty in sensor measurements, for example.

The hazard zone includes (e.g., defines) a target lateral constraint that extends over the right lane boundary 610 and into the lane. A target lateral constraint (sometimes referred to more simply as a lateral constraint herein) is a longitudinally-extending limitation to a portion of a vehicle transportation network which a vehicle, such as the vehicle 602, will pass such that, if the vehicle travels laterally outside of the boundaries of the constraint, the vehicle is likely to avoid the hazard object associated with the hazard zone.

For the detected hazard object, here a first hazard object, it is also possible to determine a first longitudinal constraint based on a first time of arrival of the vehicle at the (e.g., first) hazard zone. That is, given a current speed plan of the vehicle (e.g., either the strategic speed plan from the reference-trajectory generation layer 404 or the current discrete-time speed plan from the discrete-time speed plan module 428), the time at which the vehicle will arrive at the hazard zone can be determined. Arriving at the hazard zone may mean arriving at a first longitudinal position in a direction of travel of the vehicle where the hazard zone is identified, whether or not the hazard zone interferes with the current trajectory. For example, and referring to FIG. 6, the time of arrival can be the time of arrival of the vehicle 602 at the point in the roadway represented by the bin 616. The longitudinal constraint may be equal to the time of arrival, which indicates how much time the vehicle has to respond to the object, or may be the time of arrival decreased by a defined amount of time to reflect uncertainties in the sensed information. The lateral constraint and the longitudinal constraint are static object constraints used within the static object constraint module 430.

In some implementations, the lateral constraint, the longitudinal constraint, or both are such that the vehicle does not have to change its nominal trajectory to avoid the hazard zone, and hence the hazard object. In other implementations, the vehicle may modify its nominal trajectory using a lateral contingency, a longitudinal contingency, or both, to avoid the hazard zone using the static object constraint module 430. A lateral contingency may be one or more changes in lateral position from the nominal trajectory. A longitudinal contingency may be one or more changes in speed from the nominal trajectory. These contingencies are described in more detail below with reference to determining the proactive trajectory.

Referring again to FIG. 6, it can be determined whether the vehicle 602 can pass the hazard zone given a distance between the right and left hard boundaries of the bins 616, 618. The distance should be larger than a threshold distance for the vehicle 602 to pass, where the threshold distance can be related to a width of the vehicle 602 (e.g., at least 1.2, 1.5, etc., time the width of the vehicle 602). In an example, a distance 620 between the boundary 614 of the hazard zone (e.g., target lateral constraint) and the left lane boundary 608 may be too narrow for the vehicle 602 to drive (i.e., fit) through. If the left lane boundary 608 were the limit of the drivable area (e.g., because it is a hard boundary—physically, legally, or otherwise), a location 622 corresponding to the bin 616 is a static blockage. That is, the vehicle 602 cannot pass the object(s) represented by the boundary points of the bins 616, 618. Accordingly, the object avoidance layer 406 can adjust the discrete-time speed plan to stop the vehicle before or upon reaching the location 622. That is, a longitudinal contingency is determined that reduces the speed of the vehicle 602 in a comfortable (for passengers) and legal way to stop at the location 622.

In another example, where the drivable area extends across the left lane boundary 608 to the left boundary 604, a gap 624 from the left boundary 604 to the hazard zone boundary 614 is sufficiently wide for the vehicle to avoid the hazard zone, and hence the hazard object. Instead of stopping, a lateral contingency sufficient for the vehicle to pass through the gap 624 may be determined. The vehicle may avoid the hazard object without a speed constraint (e.g., a longitudinal contingency) in such a situation.

In the example 600 of FIG. 6, an object is identified by dots (i.e., boundary points) and/or groups of dots that represent the object, such as through detection by LiDAR as described above with regards to the world model 302. However, other implementations may use image recognition on images captured by one or more cameras mounted on the vehicle, such as the vehicle 100 or 202, or within the vehicle transportation network, such as the transportation network 208.

Although the example 600 of FIG. 6 shows a first hazard object located to the right of the vehicle 602 along its driveline 603, a hazard object may be detected anywhere along the driveline, including being detected entirely within the left lane boundary 608 and the right lane boundary 610, or being detected to the left of the vehicle 602 along its driveline 603 such that the hazard zone extends over the left lane boundary 608 and into the lane.

Although not shown in FIG. 6, one or more additional hazard objects may be detected (e.g., at 502 of FIG. 5) while the vehicle 602 traverses the vehicle transportation network. For example, a second hazard zone for a second hazard object may be determined at 506. The second hazard zone would include a second target lateral constraint determined in a like manner as the first target lateral constraint described with regards to FIG. 6.

FIG. 6 describes a hazard zone associated with a static hazard object detected at 502. A hazard object detected at 502 may instead be a dynamic hazard object. Determining a hazard zone for a dynamic hazard object at 506 can depend on a trajectory of the dynamic hazard object. Accordingly, a trajectory of a hazard object is first described with regards to FIGS. 7 and 8.

Figures 7, 8:
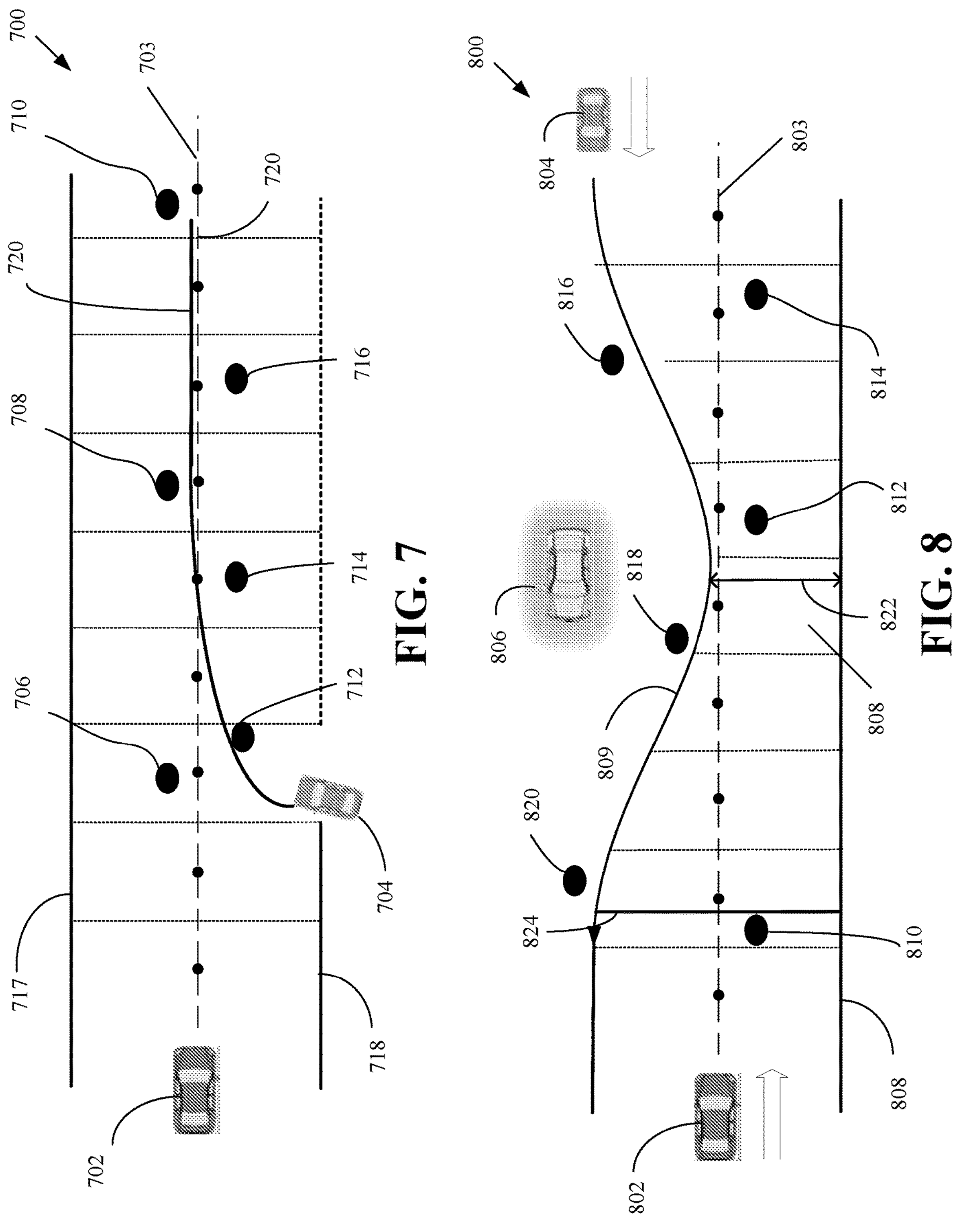
FIG. 7 is a diagram of a single trajectory for a dynamic hazard object.
FIG. 8 is a diagram of a single trajectory for another dynamic hazard object.

In the scenario 700 of FIG. 7, a vehicle 702 is moving along a coarse driveline 703. No static objects are detected. A left boundary 717 and a right boundary 718 define the drivable area. A dynamic hazard object in the form of a vehicle 704 is predicted to move from the right shoulder of the road (or from the lane to the right of the lane that includes the vehicle 702) into the path of the vehicle 702 along a path or trajectory 720. Accordingly, the vehicle 704 is initially associated with a hazard zone that includes a target lateral constraint that extends over the right lane boundary (i.e., the right boundary 718) and into the lane. Subsequently, the vehicle 704 The hazard zone associated with the vehicle 704 changes over time as the vehicle 704 moves along its trajectory as discussed in more detail below.

The dynamic object constraint module 432 can determine (e.g., predict) the locations of the vehicle 702 at different discrete points in time. For example, at time t (e.g., in one second), the vehicle 702 is predicted to be at a location 706; at time t+1 (e.g., in two seconds), the vehicle 702 is predicted to be at a location 708; and at time t+2 (e.g., in three seconds), the vehicle 702 is predicted to be at a location 710. While locations at 3 seconds into the future (i.e., a time window of 3 seconds) are shown with respect to the scenario 700 (and the later scenario 800 described below), more or fewer locations can be determined, predicted, calculated, etc. Other time windows are possible, and the frequency of predicted locations within a window can also vary. In an example, the time window is six seconds, and a location can be determined at every half second.

A second instance of a trajectory planner, such as a proactive trajectory planner 308, may be tracking (e.g., predicting the trajectory of) the vehicle 704. A dynamic object constraint module of the second trajectory planner, such as a dynamic object constraint module 432, can predict future locations of the vehicle 704 (e.g., based on the current heading and speed and the expected behavior of the vehicle 704). For example, at the time t, the vehicle 704 is determined to be at a location 712; at time t+1, the vehicle 704 is determined to be at a location 714; and at time t+2, the vehicle 704 is determined to be at a location 716. In an example, the same time window and frequency of predictions can be the same for all instantiated trajectory planners of the vehicle 702. However, this is not required. The time window and frequency can depend on the type (e.g., bicycle, pedestrian, sports car, sedan, large truck, etc.) of the dynamic object.

The drivable area of the vehicle 702 may be adjusted to avoid the hazard zones that correspond to respective locations of the vehicle 704 in a like manner as described with regards to FIG. 6. In the scenario 700, the vehicles 702, 704 are generally identified at the same locations at the same times. Thus, the right hard boundary of the lane can be set for each of the appropriate bins to, for example, a line corresponding to the coarse driveline 703. Whether the vehicle 702 can pass a hazard zone given a distance between the right and left hard boundaries of the bins may be determined. Whether the vehicle 702 must modify its speed based on a hazard zone may be determined. More generally, a lateral constraint and a longitudinal (i.e., speed) constraint may be determined using the hazard zones along the trajectory 720, which in turn may be used to determine a proactive trajectory for the vehicle 702 as described in more detail below.

In contrast to the scenario 700, the scenario 800 of FIG. 8 illustrates an oncoming dynamic hazard object, in this case a vehicle 804. More specifically, a vehicle 802 is moving eastward along a coarse driveline 803, and the vehicle 804 is moving westward. The vehicle 804 is predicted to follow a trajectory 809 to avoid a static hazard object-namely a parked vehicle 806. The locations of the vehicle 802 along the coarse driveline 803 at times t, t+1, and t+2 are predicted to be, respectively, locations 810, 812, and 814. The locations of the vehicle 804 along the trajectory 809 at times t, t+1, and t+2 are predicted to be, respectively, locations 816, 818, and 820.

The vehicles 802, 804 are predicted to be at generally the same location (i.e., the location of intersection corresponding to the locations 812, 818) at the same time (i.e., at time t+2). Should the vehicle 802 continue along the coarse driveline 803, it is likely to collide with the vehicle 804. Although not expressly shown in FIG. 8, the drivable area of the scenario 800 is adjusted (i.e., cut out) as described above. That is, the drivable area is adjusted to remove those areas that correspond to respective hazard zones of the vehicle 804 over time, such as by setting (in this example, left) boundaries of bins corresponding to (i.e., overlapping) the trajectory 809.

At the location of intersection (i.e., the locations 812, 818), the width of the drivable area between the hazard zone at the point of intersection (i.e., the left hard boundary) and the right boundary can be determined. The width, or distance, 822 in bins 808 resulting from the target lateral constraint of the hazard zone can be used to determine whether there is a sufficient gap for the vehicle 802 to pass through. The response to this query can be used, optionally with a longitudinal (i.e., speed) constraint determined using the hazard zone, to determine a proactive trajectory for the vehicle 802 as described in more detail below, such as to identify a location 824 of a lateral constraint.

The scenarios 700, 800 describe that hazard zones may be located along a trajectory of a dynamic hazard object, but they do not describe how to determine the hazard zones. Determining a hazard zone for a dynamic hazard object is described with regards to FIG. 9.

Figure 9:
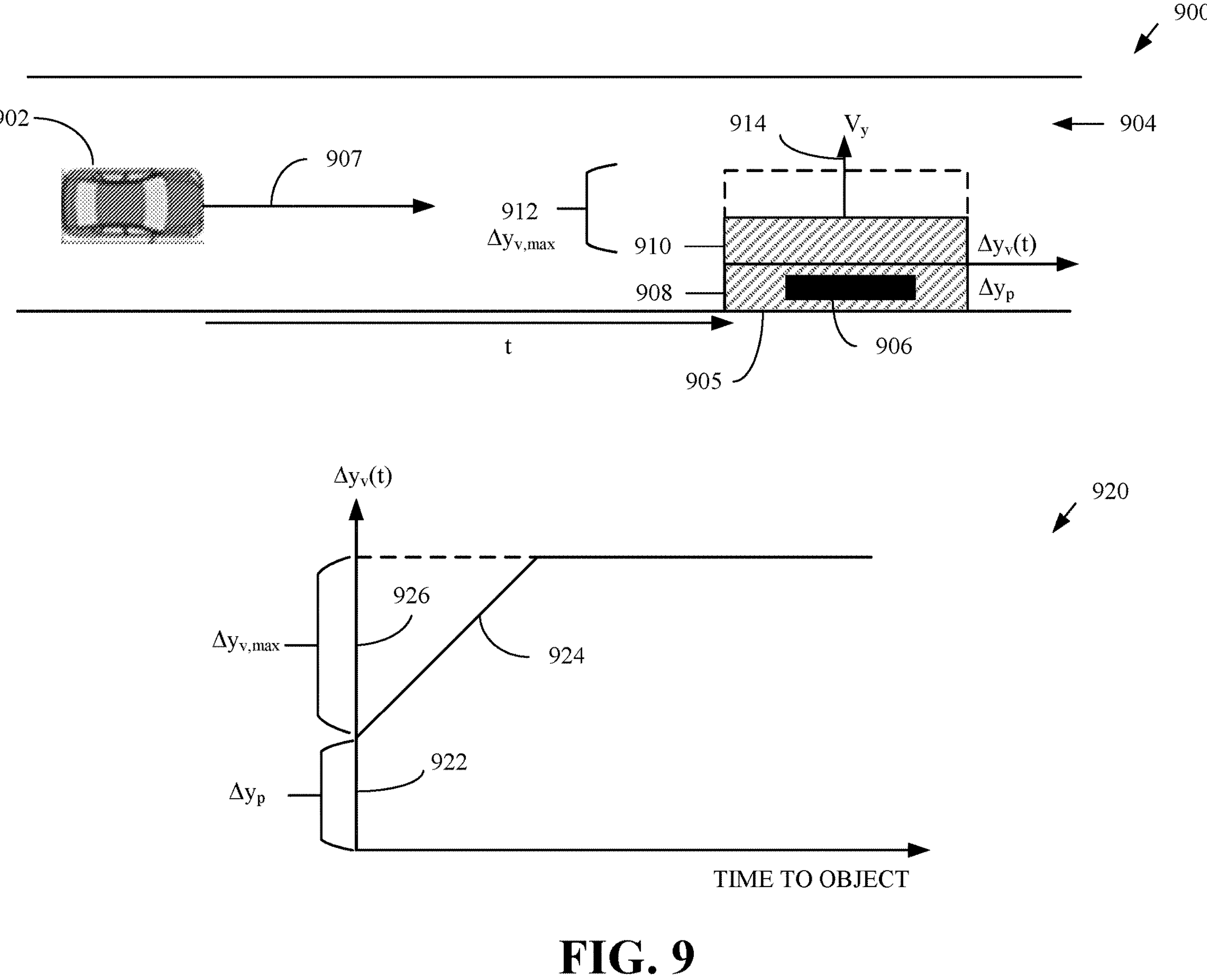
FIG. 9 is a diagram of an example of determining a hazard zone in accordance with an implementation of this disclosure.

The example 900 of FIG. 9 presents a generalized approach to defining a hazard zone. Generally, a hazard zone may be defined by an incursion determined using a maximum intrusion and an incursion (intrusion) velocity. Other definitions are possible. Once a hazard zone is defined, the specific hazard object (or the type of hazard object) can become irrelevant to computing (e.g., determining, selecting, calculating, etc.) a proactive trajectory for the vehicle.

The example 900 illustrates a vehicle 902 that is traveling on a road (e.g., within a lane 904). A hazard object 906 is identified on the side of the lane 904, although the principles apply to hazard objects detected elsewhere. The hazard object 906 may be, for example, a parked vehicle, a pedestrian, or some other object of which at least a portion is capable of lateral movement. Hence, the hazard object 906 may be considered a dynamic hazard object. The vehicle 902 is moving toward the hazard object 906 according to its nominal trajectory 907.

As uncertainty may be associated with the sensor data and/or the perceived world objects, a bounding box 905 that expands the actual/real size of the hazard object 906 can be associated with the hazard object 906. The shape representing the uncertainty may be any shape and is not limited to a rectangular box. A lateral pose uncertainty 908 (denoted $\Delta y_p$) defines an initial determined (e.g., perceived, identified, set, etc.) later size of the object 906. A time t indicates the time of arrival of the vehicle 902 at the hazard zone (e.g., the closer laterally-extending edge of the bounding box 905). The size of the bounding box of uncertainty may be a function of one or more of range uncertainty, angle (i.e., pose, orientation, etc.) uncertainty, or velocity uncertainly results. For example, with respect to range uncertainly (i.e., uncertainty with respect to how far the hazard object 906 is from the vehicle 902) the vehicle 902 (more specifically, a world model 302) can assign a longer bounding box of uncertainty to an object that is perceived to be farther than a closer object. For example, with respect to angle uncertainly (i.e., uncertainty with respect to the orientation/pose of the hazard object 906), can result in assigning different widths to the bounding box of uncertainty.

A maximum lateral incursion 912 (denoted $\Delta y_{v,max}$) identifies the maximum lateral incursion into the lane 904 due to the hazard object 906 possibly moving laterally. The hazard object 1005 possibly moving can mean that the object 906 itself is moving or a part of the object 906 is moving. In an example, the hazard object 906 is classified as a parked vehicle. A door of the parked vehicle can open. As the maximum size of a car door is approximately 1 meter, the maximum lateral incursion 912, can be set to $\Delta y_{v,max}=1$ meter. The maximum lateral incursion of a moving vehicle may be, in some implementations, the distance from one end of the vehicle to the other in the lateral direction and any bounding box, such as the bounding box 905 described with regards to FIG. 9.

Figure 11:
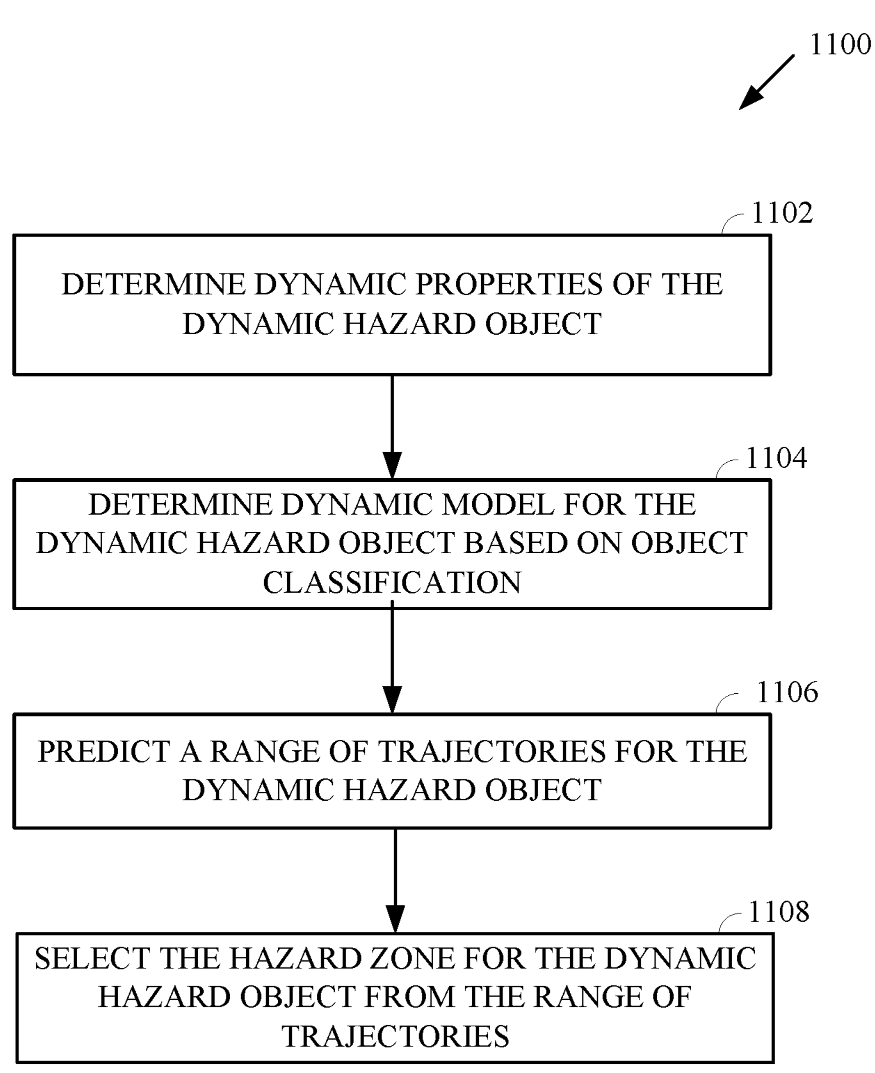
FIG. 11 is a flowchart diagram of a method for proactive risk mitigation where a predicted range of trajectories for a dynamic object is considered.

A velocity 914 (denoted $V_y$) indicates the velocity at which the hazard object 906 enters the lane 904. For example, in the case that the hazard object is identified as a parked vehicle, the velocity 914 can be set to a nominal speed at which a car door may open. In the case that the hazard object 906 is classified as a pedestrian ahead of the vehicle 902 along the trajectory 907, the pedestrian may be crossing the lane 904 at a maximum intrusion of 1 meter per second. As such, the velocity 914 can be set to $V_y=1$ meters/second. In the case of a moving vehicle, the predicted speed of its lateral movement according to its current trajectory may be determined as the velocity 914, as described in more detail below with regards to FIG. 11.

Given the above, a possible incursion 910 (denoted $\Delta y(t)$) can be calculated using formula (1) as $$\Delta y(t) = \Delta y_p + \min(V_y * t, \Delta y_{v,max}) \tag{1}$$

That is, the possible incursion 910 of the object 906 into the lane 904 is given by $\Delta y_p$ (i.e., the current width of the bounding box, as determined at the time that the possible incursion 910 is calculated) plus the minimum of $V_y*t$ (i.e., how much can the object, or a portion thereof, move into the lane 904 between now and the time that the vehicle 902 arrives at the hazard zone, given the speed at which the object is/can move into the lane 904) and $\Delta y_{v,max}$ (i.e., the maximum lateral incursion 912).

The initial incursion $\Delta y_p$ can change over time. For example, as the vehicle 902 approaches the object 906, the sensor uncertainty is reduced and the size of the bounding box of uncertainty can also be reduced.

The possible incursion 910 changes over time as the vehicle 902 approaches the hazard object. As the vehicle 902 approaches the object, the time of arrival of the vehicle 902 at the hazard object 906, t, approaches 0 (i.e., $t\rightarrow 0$); and the hazard zone collapses to (i.e., is reduced to) the pose or the bounding box of uncertainty associated with the hazard object. That is, as the vehicle 902 approaches the hazard object 906, the size of the bounding box is reduced as the uncertainty is reduced. Additionally, the amount (e.g., distance) of lateral movement of the hazard object 906 into the lane 904 is reduced.

Another example may be described where the object 906 is classified as a pedestrian who is moving across the lane 904 at a speed of $V_y=1$ meters/second. Given the current speed of the vehicle 902, it may be determined that the vehicle 902 will arrive at the hazard object 906 in five seconds. As a result, the pedestrian is estimated as capable of traveling up to 5 meters into the lane 904 by the time the vehicle 902 arrives at the pedestrian. The pedestrian can get, essentially or substantially, across the whole of the lane 904. However, as the vehicle 902 gets closer and closer to the hazard object 906 (i.e., the pedestrian), the situation may evolve. For example, the pedestrian may not actually get that far across the lane 904.

A graph 920 of FIG. 9 illustrates how the value of the possible incursion 910 ($\Delta y_v(t)$) may evolves over time. At an initial time, the possible incursion 910 is equal to the lateral pose uncertainty 908 (as indicated by an initial value 922). As the time to arrive at the hazard object shortens, the hazard object can move more into the lane (as indicated by a slope 924) up to the maximum lateral incursion 912 (as indicated by a maximum increase 926).

Referring again to FIG. 5, if the look-ahead distance is completely checked for hazard objects, the method 500 advances to 508. Otherwise, the method 500 returns to 502 to check for additional hazard objects.

The look-ahead distance can vary with the speed of the vehicle. For example, depending on the speed of the vehicle, the look-ahead distance can be varied in order to reduce computation time while still guaranteeing that, if a hazard object will interfere with the current vehicle trajectory, sufficient time is available to either stop or comfortably (e.g., safely) steer the vehicle. For example, if four seconds of look-ahead time are required, the appropriate look-ahead distance would be 48 meters where the vehicle is travelling at 12 meters per second. If the vehicle were travelling at 30 meters per second (e.g., when traveling on a highway), the appropriate look-ahead distance would be 120 meters.

At 508, the method 500 determines whether any hazard zones on opposite sides of the vehicle overlap. Such hazard zones may overlap where they overlap in the longitudinal direction. That is, in a direction of travel of the vehicle, the lengths of the hazard zones in the direction of travel along opposite sides of the vehicle overlap at least in part. This is discussed further below starting with FIG. 15.

Where a hazard zone does not overlap another hazard zone on opposite sides of the vehicle at 508, the object avoidance layer 406 processes the detected objects systematically at 510, starting with any detected static hazard objects. The drivable area is adjusted for the static hazard objects. For example, and referring to FIG. 6, the drivable area of the lane may be adjusted in the area of the bins 616, 618 so that the right hard boundary is the boundary 614. A longitudinal constraint associated with each static hazard object may be determined based on a time of arrival of the vehicle at the hazard zone. For example, and as described above with regards to FIG. 6, the time of arrival of the vehicle 602 at the bin 616 based on the discrete-time speed plan of the current trajectory. In an implementation, the current trajectory may correspond to the coarse driveline 603 of the vehicle 602.

The object avoidance layer 406 can adjust the current discrete-time speed plan for the static hazard objects based on their respective constraints. For example, and referring again to an implementation of FIG. 6, the object avoidance layer 406 can adjust the discrete-time speed plan using the discrete-time speed plan module 428 to stop the vehicle 602 before or upon reaching the location 622 identified by the lateral constraint of the static hazard object. More specifically, the longitudinal constraint of the static hazard object at bins 616, 618 (i.e., a time of arrival based on the current vehicle 602 trajectory), can be used to determine a longitudinal contingency that is a reduction in the speed of the vehicle 602 (e.g., a target deceleration) in a comfortable (e.g., for passengers) and legal way that stops at the location 622.

In another implementation of FIG. 6, the gap 624 from the left boundary 604 to the hazard zone boundary 614 is sufficiently wide for the vehicle 602 to avoid the hazard zone, and hence the static hazard object. The object avoidance layer 406 can adjust the driveline, the current discrete-time speed plan, or both, to allow the vehicle 602 to pass through the gap 624. For example, the longitudinal constraint of the static hazard object can be used to determine a lateral contingency that is a change in the position of the vehicle 602 leftward in a comfortable and legal way to pass the static hazard object through the gap 624. In this example, the longitudinal constraint may identify a change in pose (e.g., direction) of the vehicle 602 at locations leading up to and past the static hazard object that does not require a longitudinal contingency (e.g., a change in the speed of the vehicle 602) to be applied to the current trajectory. This represents an updated driveline. In other implementations, described below, the longitudinal constraint may be used to determine a longitudinal contingency that modifies the speed of the vehicle 602.

Each of the static hazard objects may be considered in turn (such as from the closest to the furthest from the vehicle 602). If a static hazard object does not require a change in the discrete-time speed plan, the current discrete-time speed plan (for example, the original strategic speed profile or a discrete-time speed plan from a previous iteration) is unchanged. In some implementations, more than one gap may result from a static hazard object. In such an implementation, each gap may be considered separately at the object avoidance layer 406, together with other hazard objects to determine alternative drivelines and/or discrete-time speed plans that may be considered at the proactive trajectory optimization layer 408. Herein, unless otherwise clear from context, references to a discrete-time speed plan may refer to a target driveline, one or more target speeds along the driveline, a target acceleration, a target deceleration, or any combination thereof.

Once the discrete-time speed plan is adjusted by the discrete-time speed plan module 428 in consideration of the static hazard objects at 510, any dynamic hazard objects may be considered in turn at 510. The object avoidance layer 406 can adjust the current discrete-time speed plan for the dynamic hazard objects based on their respective constraints. If a dynamic hazard object is not a constraint (e.g., its constraints do not interfere with the current discrete-time speed plan of the vehicle), then it can be ignored by the object avoidance layer 406. Desirably, the dynamic hazard objects are considered in order based on the closest to the furthest future time that a dynamic hazard object and the vehicle being controlled may meet based on the current driveline and discrete time-speed plan. This facilitates an iterative process whereby a change made to address a dynamic hazard object at an earlier location may be considered in whether changes are required to address a dynamic hazard object at a subsequent location along the path of the vehicle being controlled.

For example, and as described with regards to FIGS. 7 and 8, the locations of vehicles 702, 802 at times in the future are respectively predicted. Similarly, the locations of the vehicles 704, 804 at times in the future are respectively predicted. In the scenario 700, there is no static hazard object to modify drivable area. In the scenario 800, there is a static hazard object, i.e., the parked vehicle 806. However, in this scenario 800, it is assumed that the presence of the parked vehicle 806 does not itself result in a change to the drivable area that requires a change in the trajectory of the vehicle 802. Instead, the hazard zone of the parked vehicle 806 is considered as it relates to the predicted trajectory of the dynamic hazard object, i.e., the vehicle 804.

The hazard zones for each of the dynamic hazard objects, i.e., vehicles 704, 804, may be determined over time (e.g., at t, t+1, and t+2) using the maximum lateral incursion of the dynamic hazard object and the velocity at which the dynamic hazard object or a portion thereof is predicted to move laterally within the lane. For example, the hazard zone may include the dynamic hazard and any bounding box, such as the bounding box 905 of FIG. 9, located at a position corresponding to the calculated incursion. The incursion at one or more future points in time of either of the vehicles 704, 804, may be calculated according to formula (1).

Like the static hazard objects described previously, a longitudinal constraint associated with each dynamic hazard object may be determined at 510 based on a time of arrival of the vehicle at the hazard zone. For example, in FIG. 7, the time of arrival generally corresponds to the expected time of arrival of the vehicle 702 at location 706. In FIG. 8, the time of arrival is the expected time of arrival at the intersection between locations 812, 818 along the respective trajectories of the vehicles 802, 804.

For a static hazard object, where the hazard zone is unchanged over time unless additional sensor information reveals different dimensions, or reveals that the static hazard object is not an object at all, but was identified as the result of detection errors, the hazard zone may be determined at 506 once for the entirety of the look-ahead distance or time. In contrast, the hazard zone for a dynamic hazard object can change over the entirety of the look-ahead distance or time. The time of arrival at a dynamic hazard object can depend upon the size and shape of the hazard zone for the dynamic hazard object. Accordingly, and although not expressly described in the examples of FIGS. 7 and 8, determining the hazard zone at 506 may be performed for each point in time where a future location of the dynamic hazard object is predicted. The hazard zone for the dynamic hazard object that includes (e.g., defines) a target lateral constraint may be, again referring to FIGS. 7 and 8 as examples, the hazard zone determined at location 712 in FIG. 7 and the hazard zone determined at location 818 in FIG. 8. In some implementations, the lateral constraint may be determined by combining (e.g., averaging, weighted averaging, etc.) the lateral constraints from adjacent hazard zones.

The lateral constraint and the longitudinal constraint are dynamic object constraints used within the dynamic object constraint module 432. The object avoidance layer 406 can adjust the current discrete-time speed plan for the dynamic hazard objects based on their respective constraints. How the dynamic object constraints are used to adjust the current discrete-time speed plan is more clearly explained with reference to FIG. 10, which is a diagram of trajectory planning for the vehicle being controlled.

As explained previously, a vehicle may ignore a potential hazard until the potential hazard is confirmed as a hazard object that may interfere with the vehicle's path of travel or is confirmed as a false positive (e.g., the potential hazard was sensor error). Alternatively, a vehicle may treat every potential hazard as a hazard object that may interfere with the vehicle's path of travel. In proactive risk mitigation, the reactive capabilities of the vehicle are considered in planning a proactive trajectory that minimizes speed and/or lateral changes in movement responsive to a potential hazard while still allowing for a comfortable and safe reactive response (i.e., a reactive trajectory) in the event a hazard object interferes with the path of the vehicle.

Figure 10:
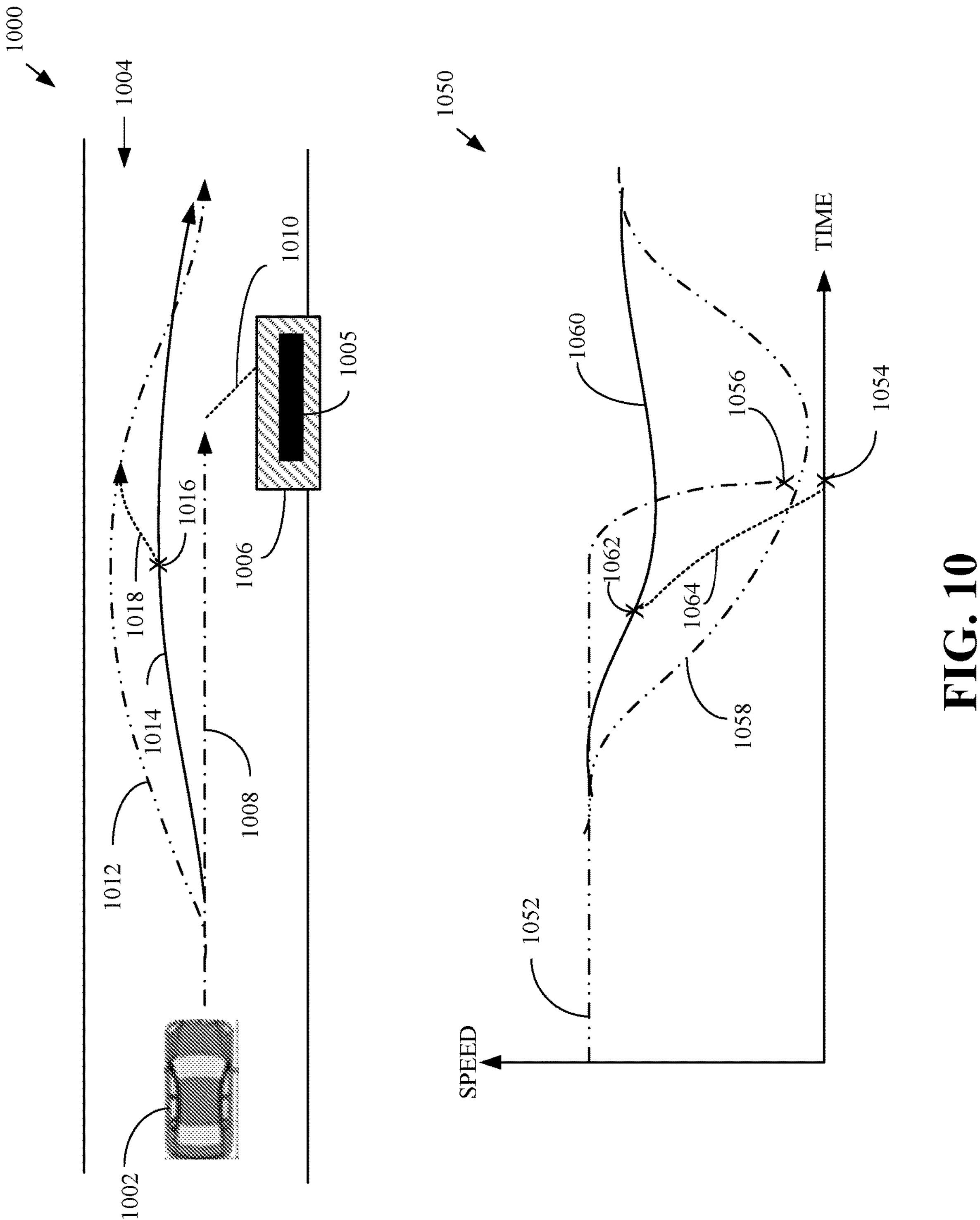
FIG. 10 is a diagram of trajectory planning according to implementations of this disclosure.

In the scenario 1000 of FIG. 10, a vehicle 1002 is in a lane 1004. An object 1005 is on the side of the lane 1004. As described with regards to FIG. 9, a bounding box 1006 that expands the actual/real size of the object 1005 can be associated with the object 1005. While a box (i.e., a bounding box) of uncertainly is described herein, the shape of uncertainty can be any other shape. In this example, the hazard object comprises a vehicle on a side of the road whose door may open.

In the scenario 1000, an initial or nominal trajectory or path 1008 for the vehicle 1002 is determined as described above that heads straight forward. In the absence of contextual information about the object (e.g., that a door might open), the nominal trajectory or path 1008, in many cases, would be a natural method of passing the hazard object 1005. For example, drivers routinely closely pass by other similar constraints such as bushes and barriers.

The nominal trajectory or path 1008 does not take into account potential hazards. In this example, a door 1010 of the object 1005 may open at any point in time. The door 1010 is illustrated as a dashed line to indicate that the door 1010 is not yet open but that it might open. It is also possible that the door 1010 may open at a point in time where the vehicle 1002 is too close to the hazard object 1005. In such a situation, either the vehicle 1002 is too close and cannot be controlled to stop before colliding with the door 1010; or the vehicle 1002 may need to perform a drastic emergency maneuver to avoid the door 1010. The drastic emergency maneuver may be a hard braking maneuver, a sharp turn away from the door 1010, or a combination thereof. Such drastic emergency maneuver(s) may be, at the least, undesirable (even if predicted) by an occupant of the vehicle 1002.

A naive path or trajectory 1012 may be planned for the vehicle 1002 to avoid emergency maneuvers. The naive trajectory 1012 would move the vehicle 1002 significantly laterally to avoid the door 1010 whether the door 1010 opens or not. Controlling the vehicle 1002 according to the naive trajectory 1012 may also be undesirable by an occupant of the vehicle 1002.

Instead of either the nominal trajectory or path 1008 or the naive trajectory 1012, a proactive trajectory 1014 can be planned (e.g., by the object avoidance layer 406 and the proactive trajectory optimization layer 408 of the proactive trajectory planner 308) that includes a lateral contingency in the form of a slight lateral deviation from the nominal trajectory or path 1008 that is not as drastic of a deviation as that of the naive trajectory 1012. Yet the proactive trajectory 1014 can be such that if the door 1010 does open, the vehicle 1002 can be controlled to perform a reasonable emergency maneuver. For example, if the door 1010 opens (or is detected to be open) when the vehicle 1002 reaches a location 1016, then the vehicle 1002 can be controlled to perform a reasonable emergency maneuver to follow a path 1018 (e.g., using the reactive trajectory control 310).

The example 1050 illustrates how a proactive trajectory can incorporate a longitudinal (e.g., speed) contingency in addition to, or instead of, a lateral contingency. The example 1050 assumes that a vehicle may be driving according a nominal trajectory that includes a nominal speed plan 1052. The vehicle may be driving on a turning road where an occluded object 1054 exists. The vehicle can proceed according to the nominal speed plan 1052, thereby disregarding the possibility that the object 1054 is present. If the vehicle were to so proceed, perception of the object 1054 may be too late to stop the vehicle. That is, a speed 1056 where the vehicle reaches the object 1054 is not zero. To account for the possibility that an object may exist, a naive trajectory that includes a naive speed plan 1058 may be determined (e.g., planned, calculated, etc.) for the vehicle. However, the naive trajectory significantly reduces the speed of the vehicle whether the object 1054 exists or does not exist.

A proactive trajectory that incorporates a longitudinal contingency is represented by the proactive speed plan 1060 and is such that the vehicle is capable of stopping if the object 1054 is detected. If the vehicle is controlled according to the proactive trajectory (e.g., the proactive speed plan 1060), the object 1054 may be perceived when the vehicle reaches the location represented by point 1062. An emergency trajectory represented by an emergency speed plan 1064 (e.g., one or more emergency maneuvers) can be performed to bring the speed of the vehicle to zero (or to a following speed) before the vehicle arrives at the location of the object 1054.

Referring back to FIG. 5, at 512 the proactive trajectory is determined using the constraints. Initially, the discrete-time speed plan module 428 of the object avoidance layer 406 can iteratively compute the target speed and acceleration/deceleration for a vehicle based on the constraints imposed by the static object constraint module 430 and the dynamic object constraint module 432. The plan may be calculated for the look-ahead time. In some implementations, the discrete-time speed plan module 428 can set (i.e., select, determine, or otherwise set) a tracking mode for at least some of the static and/or dynamic objects. For example, the tracking mode can be one of "close gap," "maintain gap," "open gap," "brake," or "follow." The available tracking modes can include fewer, more, or other tracking modes. The tracking mode can be used to select sets of tuning parameters used by the discrete-time speed plan module 428. The tuning parameters can include target acceleration, hysteresis parameters, and other tuning parameters.

An example is now provided to illustrate the operation of the discrete-time speed plan module 428. If no longitudinal constraints associated with a hazard object require a change in trajectory, then the discrete-time speed plan module 428 determines that the vehicle can be operated based on the strategic speed plan (as determined by the reference-trajectory generation layer 404). In contrast, if a longitudinal constraint of a hazard object requires a change in trajectory, a longitudinal contingency may be included for the proactive trajectory. For example, where the longitudinal constraint indicates that the tracking mode is to "brake," the discrete-time speed plan module 428 calculates a speed profile to stop the vehicle. That is, a deceleration speed profile is calculated to bring the vehicle to a stop, e.g., using the current speed of the vehicle and the distance to the hazard object.

In an example, any lateral contingency can be determined using maneuverability parameters of the vehicle being controlled. The maneuverability parameters can include a mass of the vehicle, a load of the vehicle, or both. Additional parameters, such as road topology, road conditions, etc., may be used to determine a lateral contingency or a longitudinal contingency. Maneuverability parameters related to an emergency maneuver that the vehicle may have to perform can also be used as constraints in generating of the proactive trajectory.

The proactive trajectory optimization layer 408 performs an optimization operation(s), such as a constrained operation, to determine an optimal proactive trajectory for the vehicle being controlled. Inputs may include the possible time-speed plans, the motion model (e.g., the kinematic motion model) of the vehicle, the coarse driveline and/or the center points of the bins along the coarse driveline, and the adjusted drivable area (e.g., the left and the right boundaries of the adjusted drivable area) to calculate (e.g., determine, generate, etc.) the proactive trajectory for the vehicle. The proactive trajectory planner 308 (e.g., the proactive trajectory optimization layer 408) may generate the proactive trajectory using, for example, a constrained optimization operation. The optimization operation can be based on, or can include, a quadratic penalty function. The optimization operation can be based on, or can include, a logarithmic barrier function. For example, the quadratic penalty function can be used with soft constraints while logarithmic barrier function can be used with hard constraints.

Maneuverability parameters (related to an emergency maneuver that the AV may have to perform if a hazard materialized) can be used as constraints in the generating of the contingency trajectory.

At 514, the method 500 controls the vehicle according to the proactive trajectory. In the event that a (e.g., dynamic) hazard object actually intrudes into the path of the vehicle following the proactive trajectory, a reactive trajectory control module, such as the reactive trajectory control 310 of FIG. 3, can calculate a safe deviation from the proactive trajectory in response to the detection that causes the vehicle to perform the maneuver.

The method 500 controls the vehicle according to the proactive trajectory at 514. The method 500 repeats and continues to do so unless there are changes required to the proactive trajectory.

In the examples of FIGS. 7 and 8, a single path/trajectory for each dynamic hazard object is used to determine the hazard zone for the look-ahead period. That is, a trajectory is predicted based on what is expected by the vehicle. In FIG. 7, conventional behavior indicates that the vehicle 704 would merge into the lane to a trajectory that overlaps the trajectory 720. In FIG. 8, conventional behavior indicates that the vehicle 804 would slow down and move closer into the lane to pass the vehicle 806 before returning to the right edge from which it originally moved. However, a dynamic hazard object may travel along different paths at any given point in the look-ahead period due to human (e.g., driver) error, the appearance of previously undetected objects, etc. That is, multiple trajectories are possible given the same initial pose, position, speed, etc. of the object. Accordingly, it can be desirable to predict a range of trajectories for the dynamic hazard object to use in determining the lateral and longitudinal constraints of the dynamic hazard object. This is described with respect to the method 1100 of FIG. 11.

The method 1100 may be used with some, all, or none of the dynamic hazard objects detected in the method 500 at 502.

At 1102, the dynamic properties of the dynamic hazard objects are determined. As described previously, these properties may include the pose (e.g., heading) and the speed (i.e., velocity) of the dynamic hazard object. However, they may also include other dynamic properties detected while the object is moving such as acceleration or deceleration.

At 1104, a dynamic model of the dynamic hazard object is determined based on a classification of the dynamic hazard object. The classification of the dynamic hazard object can be one of a motorized vehicle, a non-motorized vehicle, or a pedestrian. In some implementations, the classification of the dynamic hazard object comprises a make and a model of a motorized vehicle. To determine the dynamic model, for example, a plurality of dynamic models may be stored in memory, such as in the world model 302, where each of the plurality of dynamic models is associated with a respective classification. Then, the classification may be used to select the dynamic model from the plurality of dynamic models. The method 1100 can also include classifying the dynamic hazard object into one or more available classifications.

The dynamic model may represent at least one of a maximum acceleration, a minimum turning radius, a maximum turning radius, a maximum velocity, or a maximum deceleration of the dynamic hazard object. The dynamic model can be specific to a make and a model of a motorized vehicle when the dynamic hazard object is determined to be the make and model.

At 1106, a range of trajectories for the dynamic hazard object are predicted using the dynamic model and the dynamic properties. For example, the predicted range of trajectories for the first hazard object can include a predicted trajectory and deviations from the predicted trajectory. For example, the predicted trajectory can be the most likely trajectory given the current dynamic properties, while the range is determined by possible changes to the trajectory due to changes in the current dynamic properties based on the dynamic model. The predicted range of trajectories can change over time.

The hazard zone determined at 506 and the associated lateral and longitudinal constraints is associated with a trajectory of the predicted range of trajectories. More particularly, at 1108, hazard zone for the dynamic hazard object may be determined by selecting the hazard zone from the range of trajectories. In some implementations, a trajectory from the range of trajectories is selected based on, for example, the presence of other hazard objects, the conditions in which the dynamic hazard object is traveling (e.g., weather, type of road, etc.), or other conditions that may make one trajectory more likely than another. Then, the hazard zone over time can be determined from the trajectory and selected for use in the method 500. In some implementations, a plurality of hazard zones may be determined, each associated with a respective trajectory of the predicted range of trajectories. Then, the hazard zone may be selected from the plurality of hazard zones. For example, the hazard zone may be whichever hazard zone of the plurality of hazard zones represents a maximum lateral incursion into the direction of travel of the vehicle.

Figure 12:
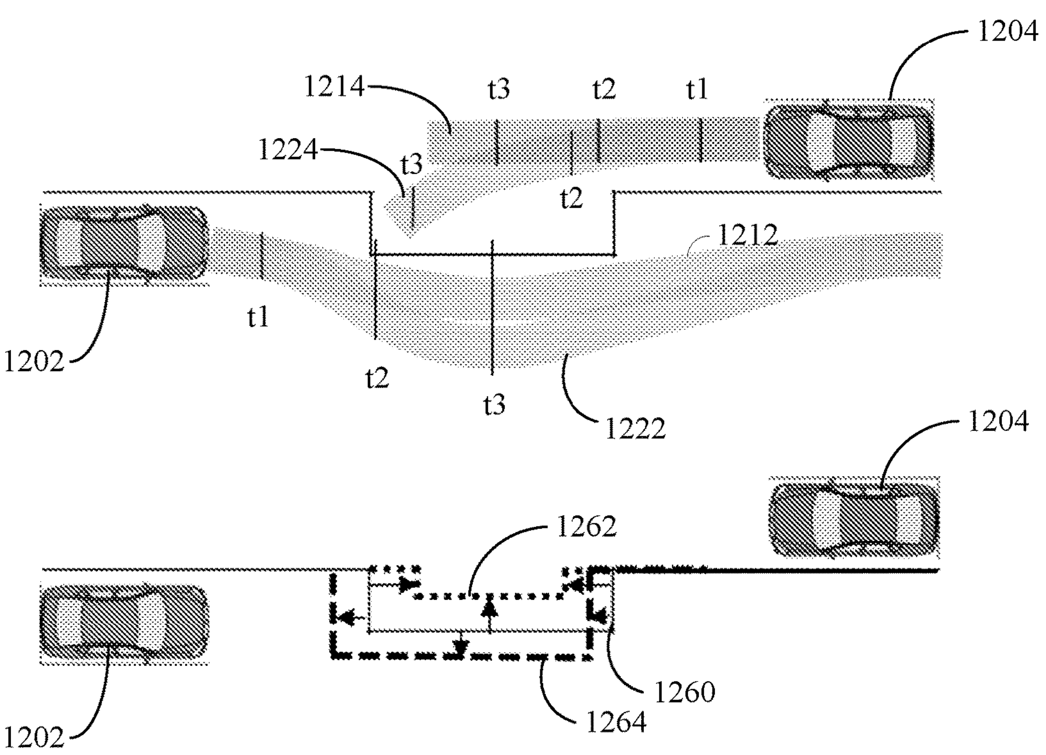
FIG. 12 is a diagram used to explain the method of FIG. 11.
Figure 12:
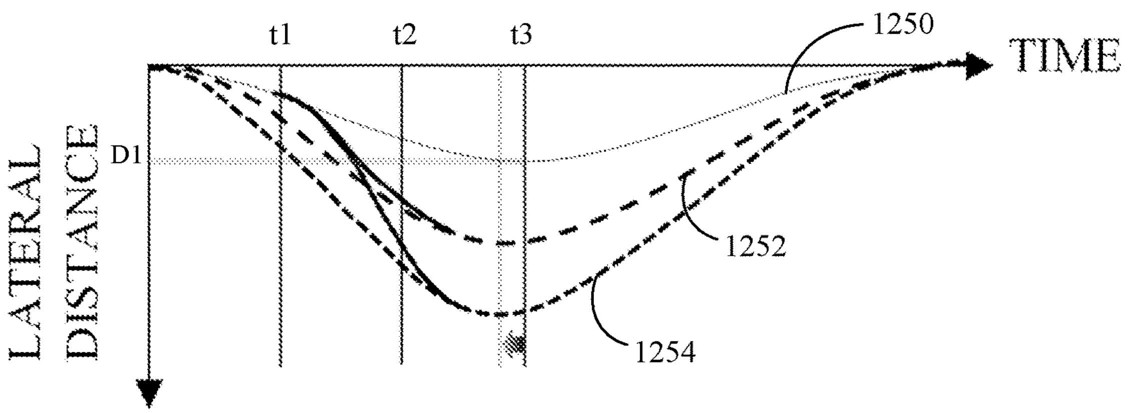

The method 1100 may be demonstrated with reference to FIG. 12. In FIG. 12, the vehicle 1202 to be controlled is traveling along a lane, and the dynamic hazard object is an oncoming vehicle 1204. According to driving convention, the vehicle 1204 would be predicted to travel along trajectory 1214 for the look ahead period. The dynamic model provides that, given the conditions of the vehicle 1204 at t=0, it is possible for the vehicle 1204 to start accelerating and swerving into the lane of the vehicle 1202 after t=t1, resulting in a trajectory 1224. According to formula (1) and the dynamic model of the vehicle 1204, the lateral incursion into the lane at t=t3 is represented by a cut-out (e.g., lateral and longitudinal constraints of the hazard zone). In this implementation, the hard left boundary of the drivable area is represented by the line location at t=0, also referred to as the road divider. The proactive trajectory 1212 for the vehicle 1202 is determined in consideration of the hazard zone so as to perform the minimum proactive lateral maneuver that maintains the reactive capability of the vehicle 1202. That is, the proactive trajectory 1212 is determined to include a lateral contingency so that the vehicle 1202 can perform an emergency maneuver (and follow the reactive trajectory 1222) if the vehicle 1204 starts accelerating and swerving into the lane of the vehicle 1202 after t=t1.

As described above with regards to FIG. 9, the hazard zone (e.g., the longitudinal and lateral constraints) of a dynamic hazard object usually decrease over time as the position of hazard at the point of intersection (here t=t3) becomes more certain. This can be seen in the middle of FIG. 12 where a cut-out 1262 determined at t=t3 using formula (1) is shown that assumes the vehicle 1204 maintains its trajectory 1214 parallel to the lane. However, the hazard zone may increase over time if the vehicle 1204 deviates from its nominal behavior (e.g., the vehicle 1204 accelerates longitudinally and laterally). The cut-out 1264, for example, is determined at t<t3 where the vehicle 1204 follows the trajectory 1224.

Consideration of the different trajectories of the vehicle 1204 can modify the proactive trajectory of the vehicle 1202 over time. For example, as shown at the bottom of FIG. 12, the minimum proactive lateral maneuver that maintains the reactive capability of the vehicle 1202 (e.g., a lateral distance from the road divider) is graphed over time. Curve 1250 represents where the vehicle 1204 follows the trajectory 1214. The cut-out 1260 conforms to a lateral distance of D1. Curve 1254 represents where the vehicle 1204 follows the trajectory 1224. The cut-out 1264 requires a larger value for the minimum proactive lateral maneuver to maintain the reactive capability of the vehicle 1202. Further, the longitudinal intersection point shifts closer (t<t3) as shown by the arrow. The curve 1252 represents a trajectory for the vehicle 1204 that starts accelerating and swerving into the lane after t=t1, but stops accelerating and swerving after t=t2. The longitudinal intersection point shifts similarly to the curve 1254, but the minimum proactive lateral maneuver to maintain the reactive capability of the vehicle 1202 is a smaller value than associated with the curve 1254.

Figure 13A:
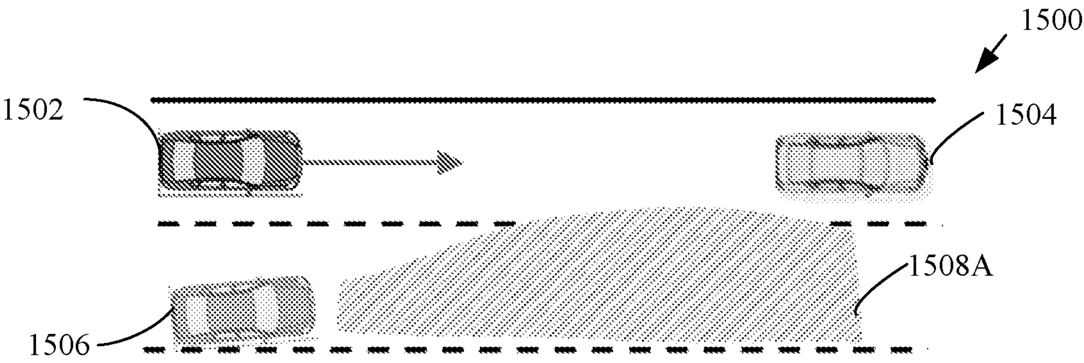
FIGS. 13A and 13B are diagrams showing a predicted range of trajectories for a parallel dynamic hazard object.
Figure 13B:
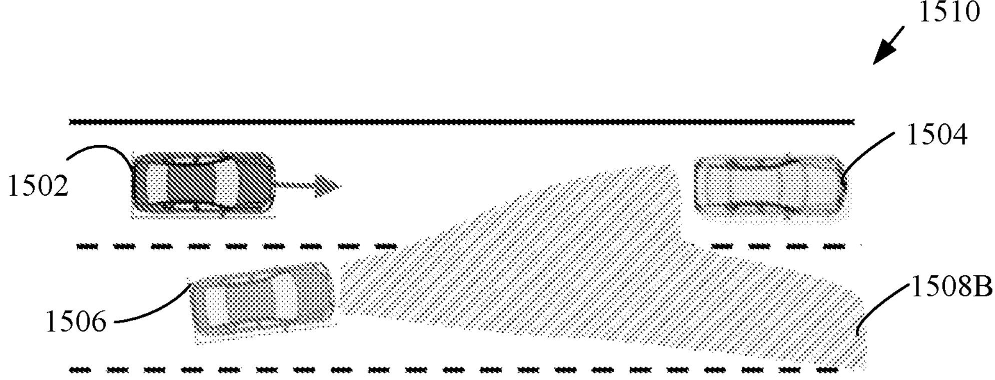

FIGS. 13A and 13B are diagrams showing a predicted range of trajectories for a parallel dynamic hazard object. A parallel dynamic hazard object is an object traveling generally in the same direction as the vehicle being controlled, as opposed to an oncoming dynamic hazard object. These diagrams illustrate how a vehicle may anticipate and prepare for potential lane merges based on the adjacent vehicle's predicted range. In the situation 1500, the vehicle 1502 being controlled is traveling in a lane of a two-lane road. According to the proactive trajectory of FIG. 13A, the vehicle 1502 is implementing a longitudinal contingency of following the vehicle 1504. Based on the pose of the adjacent vehicle 1506, a predicted range of trajectories 1508A may be considered for determining a hazard zone as described with regards to FIG. 12. There is a relatively low chance of a lane merge. In the situation 1510 of FIG. 13B, the pose of the adjacent vehicle 1506 has changed, as has the prediction range of trajectories to prediction range of trajectories 1508B. There is an increased chance of a lane merge, and the proactive trajectory includes a longitudinal contingency that gradually increases deceleration of the vehicle 1502 as the possibility of a lane merge increases.

Figure 14:
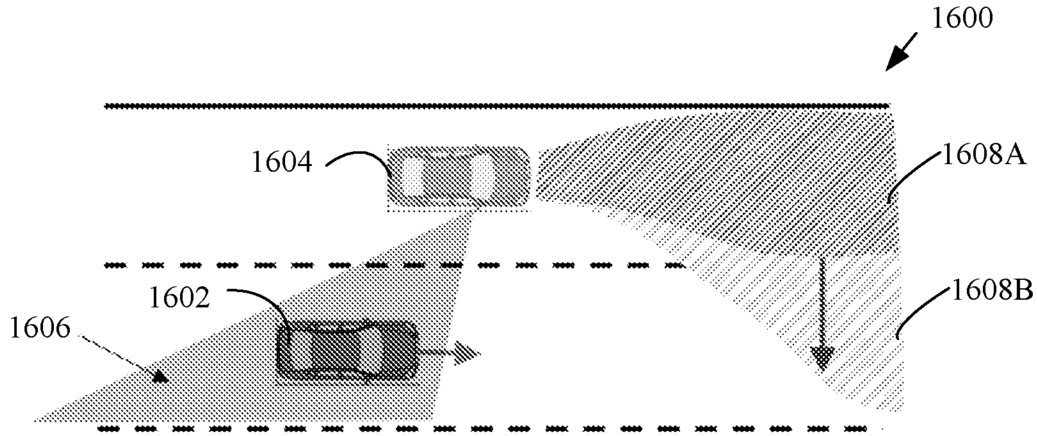
FIG. 14 is another diagram showing a predicted range of trajectories for a parallel dynamic hazard object.

FIG. 14 is another diagram showing a predicted range of trajectories for a parallel dynamic hazard object. This situation 1600 demonstrates that the predicted range of trajectories of a hazard object may be used to consider the visibility of the vehicle 1602 being controlled from other road users (i.e., hazard objects). In this situation 1600, the vehicle 1602 is traveling in the right lane of a two-lane road. The dynamic hazard object is an adjacent vehicle 1604 traveling in the left lane. Given the same pose of the adjacent vehicle 1604, a first range of trajectories 1608A for the adjacent vehicle 1604 may be considered when determining a proactive trajectory for the vehicle 1602, but a second range of trajectories that further includes the trajectories 1608B may be considered when determining a proactive trajectory for the vehicle 1602 when the vehicle 1602 is traveling in the blind spot 1606 of the adjacent vehicle 1604. That is, the range of possible trajectories of the adjacent vehicle 1604 increases as the vehicle 1602 is in the driver's blind spot 1606. The location of a blind spot may be known based on the classification of the adjacent vehicle 1604 described with respect to FIG. 12. Increasing the range of trajectories to consider the visibility from the perspective of the dynamic hazard object acknowledges that the dynamic hazard object may take different actions when they are aware of the presence of the vehicle being controlled as compared to when they are not aware of its presence.

The discussion above expressly addresses hazard objects that sequentially occur in the path of a vehicle being controlled or where one or more hazard objects are predicted to concurrently exist either to the left or the right of the path of the vehicle. Hazard objects, however, may be predicted to concurrently exist on both sides of the vehicle for at least part of the driveline of the vehicle being controlled. That is, hazard zones for hazard objects may overlap in the longitudinal direction. The above techniques may be used in this situation. In many circumstances, however, the above techniques would result in an inability of the vehicle to advance at all. For this reason, and referring back to FIG. 5, the method 500 may also separately consider hazard zones that overlap at 508.

That is, there may be circumstances where a first hazard zone (e.g., for a first hazard object) includes a first target lateral constraint that extends over a left lane boundary and into the lane such that the vehicle may avoid the first hazard object without a speed constraint, and a second hazard zone (e.g., for a second hazard object) that includes a second target lateral constraint that extends over a right lane boundary and into the lane such that the vehicle may avoid the second hazard object without a speed constraint. In some such situations, the analysis previously described would result in the vehicle not being able to pass at all if both hazard zones are cut out of the drivable area. For example, narrow streets (e.g., residential streets), streets with multiple hazard objects arranged in parallel on one or both sides of the vehicle that narrow an otherwise wide street (e.g., city streets), etc. To address these and other situations with overlapping hazard zones, dual-sided buffer allocation may be used.

Namely, if there are hazard zones that overlap at 508, the method 500 allocates a lateral buffer to respective lateral constraints for the hazard zones at 516. In particular, for each discretized time and location where a first hazard zone and a second hazard zone overlap in the longitudinal direction, a lateral buffer to a first allocated lateral constraint for the first hazard object and a second allocated lateral constraint for the second hazard object. Allocating the lateral buffer uses the first target lateral constraint and the second target lateral constraint as input. The allocation maximizes the allocated (e.g., assigned) lateral constraints while maintaining at least a minimum passing gap. Desirably, the allocation minimizes a difference in lateral constraint ratios between the two sides. One technique for allocating the lateral buffer is described with regards to FIGS. 17-23.

Figure 15:
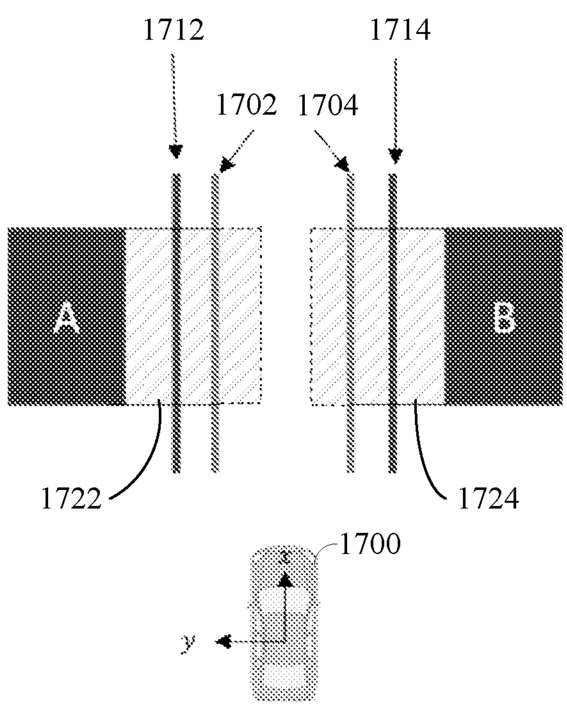
FIGS. 15-20 are diagrams used to explain dual-sided buffer allocation according to implementations of this disclosure.

FIG. 15 shows assumptions made in the allocation at 516. In FIG. 15, a vehicle 1700 is traveling within a lane defined by a left lane boundary 1702 and a right lane boundary 1704. As described initially, the lane boundaries may not be marked boundaries. Instead, they may be virtual boundaries based on a defined width for the lane. The left drivable area boundary 1712 and the right drivable area boundary 1714 correspond generally to the default drivable area defined by the left boundary 604 and the right boundary 606 in the description of FIG. 6. For hazard object A, the hazard zone 1722 determined at 506 has a target lateral constraint. For hazard object B, the hazard zone 1724 determined at 506 also has a target lateral constraint. As can be seen in FIG. 15, there are one or more hazard objects on opposite sides of the vehicle 1700 that overlap in the direction of travel of the vehicle 1700. The target lateral constraint for the hazard zone 1722 of the hazard object A extends in the lane beyond both the left lane boundary 1702 and left drivable area boundary 1712. The target lateral constraint for the hazard zone 1724 of the hazard object B extends into the lane beyond both the right lane boundary 1704 and right drivable area boundary 1714.

Figure 16:
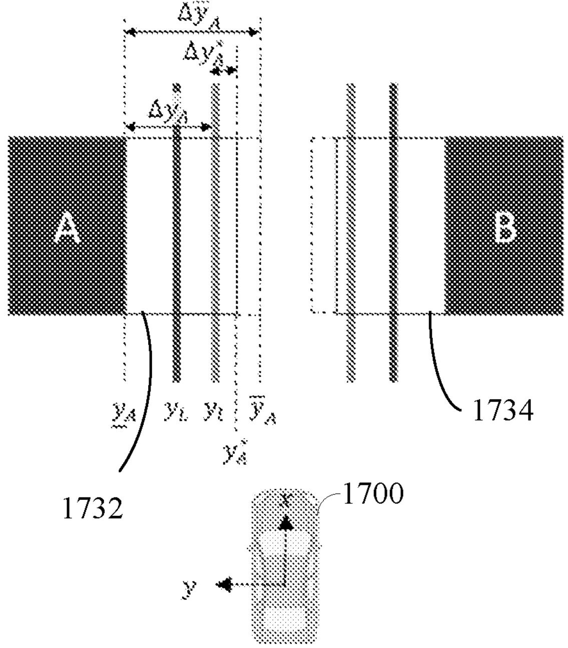

The dual-sided buffer allocation described herein uses this information to allocate a lateral buffer to (e.g., between) a first allocated lateral constraint for the first hazard object A and a second allocated lateral constraint for the second hazard object B. In FIG. 16, the first allocated lateral constraint is associated with an updated first hazard zone 1732, and the second allocated lateral constraint is associated with an updated second hazard zone 1734.

FIG. 16 illustrates variables used in the dual-sided buffer allocation. In FIG. 16, $\underline{y}_A$ is the rightmost boundary of hazard object A, $y_L$ is the left drivable area boundary, $y_l$ is the left lane boundary, $\bar{y}_A$ is the target (e.g., desired, maximum) lateral constraint for the hazard object A, and $$y_A^*$$

is the allocated (e.g., optimal, assigned) lateral constraint for the hazard object A. Although not shown in FIG. 16 for clarity, similar variables are associated with hazard object B. Namely, $\underline{y}_B$ is the leftmost boundary of hazard object B, $y_R$ is the right drivable area boundary, $y_r$ is the right lane boundary, $\bar{y}_B$ is the target (e.g., desired, maximum) lateral constraint for the hazard object B, and $$y_B^*$$

is the allocated (e.g., optimal, assigned) lateral constraint for the hazard object B.

In this example, the above variables are measured on a descending scale from left to right. That is, the lowest value is the rightmost boundary of hazard object B, and the highest value is the leftmost boundary of hazard object A. Other arrangements are possible, such as defining the variables to ascend from left to right. The variables may be defined in feet, meters, etc. Assuming the scale descends from left to right, the following equation (e.g., formula) applies:

$$\Delta\bar{y} = y_l - y_r \tag{2}$$

wherein $\Delta\bar{y}$ is the width of the lane. A variable $\Delta y_{min}$ is a minimum passing gap.

The following differences may be determined:

$$\Delta\bar{y}_A = \underline{y}_A - \bar{y}_A \tag{3}$$

$$\Delta y_A = \underline{y}_A - y_l \tag{4}$$

$$\Delta y_A^* = y_l - y_A^* \tag{5}$$

-continued $$\Delta\bar{y}_B = \bar{y}_B - \underline{y}_B \tag{6}$$

$$\Delta y_B = y_r - \underline{y}_B \tag{7}$$

$$\Delta y_B^* = y_B^* - y_r \tag{8}$$

wherein:

$\Delta\bar{y}_A$ is the difference between the rightmost boundary of the hazard object A and the target left lateral constraint, $\Delta y_A$ is the difference between the rightmost boundary of the hazard object A and the left lane boundary, $$\Delta y_A^*$$

is the difference between the left lane boundary and the allocated left (or first) lateral constraint, $\Delta\bar{y}_B$ is the difference between the leftmost boundary of the hazard object B and the target right lateral constraint, $\Delta y_B$ is the difference between the leftmost boundary of the hazard object B and the right lane boundary, $$\Delta y_B^*$$

is the difference between the right lane boundary and the allocated right lateral constraint.

Figures 17, 18:
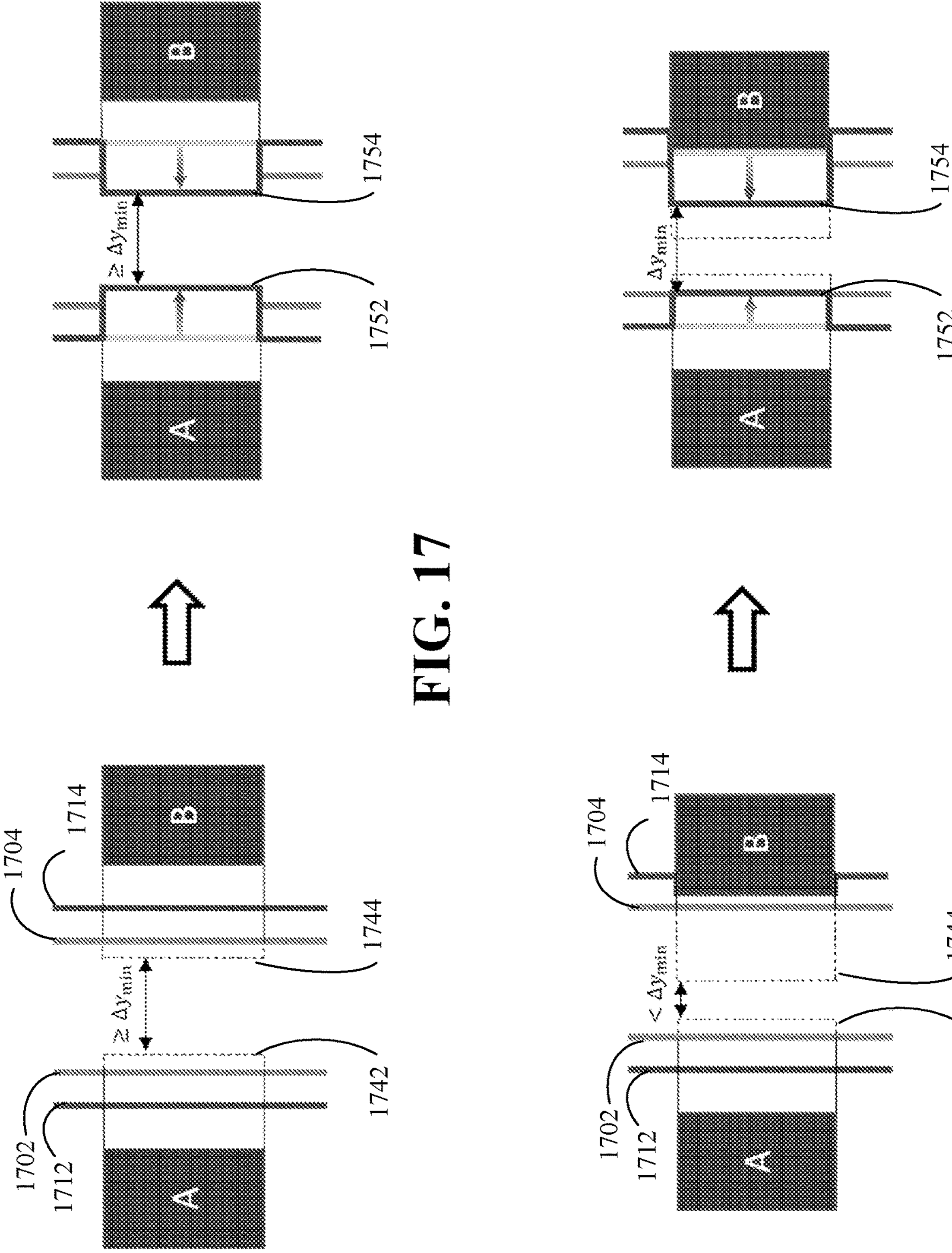

While the left lane boundary 1702 and the left drivable area boundary 1712 and the right lane boundary 1704 and the right drivable area boundary 1714 are the same in FIGS. 17 and 18, this is not necessary, as described above with regards to FIG. 6. They are shown separately to identify more easily variables in FIG. 16 for use in the allocation. The first allocated lateral constraint and the second allocated lateral constraint are shown respectively spaced apart from the first lateral constraint, the left lane boundary 1702, and the left drivable area boundary 1712, and from the right lateral constraint, the right lane boundary 1704, and the right drivable area boundary 1714, for a similar reason. However, the first allocated lateral constraint and the second allocated lateral constraint have a range of possible values. For example, assuming:

$$\underline{y}_A \geq y_L \geq y_l, \tag{9}$$

$$\underline{y}_B \leq y_R \leq y_r, \tag{10}$$

$$\Delta\bar{y}_A > \Delta y_A, \text{ and} \tag{11}$$

$$\Delta\bar{y}_B > \Delta y_B, \text{ then} \tag{12}$$

then the difference between the left lane boundary 1702 and the first allocated lateral constraint $$(\Delta y_A^*)$$

is within the range:

$$0 \leq \Delta y_A^* \leq \Delta\bar{y}_A - \Delta y_A, \tag{13}$$

and the difference between the right lane boundary 1704 and the second allocated lateral constraint $$(\Delta y_B^*)$$

is within the range:

$$0 \leq \Delta y_B^* \leq \Delta\bar{y}_B - \Delta y_B. \tag{14}$$

As mentioned initially, a goal is to maximize allocation of the lateral buffer to each hazard object while maintaining the minimum passing gap $\Delta y_{min}$. This inequality constraint may be represented as:

$$\Delta y_{min} \leq \Delta\bar{y} - (\Delta y_A^* + \Delta y_B^*). \tag{15}$$

Using this constraint, the available lateral buffer may be divided by selecting values for the minimum passing gap Dymin and one of the allocated lateral constraints, and solve for the other allocated lateral constraint. For example, the minimum passing gap may be a width of the vehicle 1700 plus a bounding box. An allocated lateral constraint may be selected based on the status of the hazard object in some implementations. For example, the allocated lateral constraint may be set to be no more than the target lateral constraint where the hazard object is a recently-parked vehicle, may be set to be less than the target lateral constraint where the hazard object is a static vehicle that has been observed over multiple cycles, or may be set to be greater than the target lateral constraint where the hazard object is a dynamic hazard object. Solving for the dual-sided buffer allocation may be an iterative process.

According to another implementation described herein, dividing up (e.g., allocating, assigning, etc.) the available lateral space may be achieved by minimizing the difference between the allocated lateral constraint ratios of the two sides. To simplify the equations, several ratios are first defined as follows:

$$\alpha_0 = \Delta y_A / \Delta\bar{y}_A, \tag{16}$$

$$\beta_0 = \Delta y_B / \Delta\bar{y}_B, \tag{17}$$

$$\alpha^* = \Delta y_A^* / \Delta\bar{y}_A, \text{ and} \tag{18}$$

$$\beta^* = \Delta y_B^* / \Delta\bar{y}_B, \tag{19}$$

$$\text{where: } 0 \leq \alpha_0 < 1 \text{ and} \tag{20}$$

$$0 \leq \beta_0 < 1. \tag{21}$$

Thus, the problem is to maximize the sum of the respective ratios of the difference between the hazard object's innermost boundary and the lane boundary and the difference between the hazard object's innermost boundary and the target lateral constraint, and the respective ratios of the difference between the lane boundary and the allocated lateral hazard and the difference between the hazard object's innermost boundary and the target lateral constraint, while satisfying the inequality constraint of equation (15). More specifically, the problem may be defined as follows:

$$\max_{(\alpha^*,\beta^*)\in S} \alpha_0 + \alpha^* + \beta_0 + \beta^* \tag{22}$$

such that equation (15) is satisfied, where $$S = \left\{(\alpha^*, \beta^*): \underset{\alpha^*,\beta^*}{\operatorname{argmin}}|(\alpha_0 + \alpha^*) - (\beta_0 + \beta^*)|\right\} \tag{23}$$

Solving for the optimal values for $\alpha^*$ and $\beta^*$ provides the allocated first lateral constraint as:

$$y_A^* = y_l - \alpha^* \Delta\bar{y}_A \tag{24}$$

and the allocated second lateral constraint as:

$$y_B^* = y_r + \beta^* \Delta\bar{y}_B. \tag{25}$$

FIGS. 17-20 are diagrams that illustrate the four distinct situations resulting in different optimal solutions for dual-sided buffer allocation. The left side of each figure shows the some of the inputs for the allocation equations (15), (22), and (23), including the first target lateral constraint 1742 and the second target lateral constraint 1744 (shown by the dashed lines). The right side of each figure shows the outputs of the allocation equations (24) and (25) using the resulting solution for $\alpha^*$ and $\beta^*$, namely the allocated first lateral constraint 1752 and the allocated second lateral constraint 1754.

The diagram of FIG. 17 shows a situation where the maximum extent of each of the first target lateral constraint 1742 and the second target lateral constraint 1744 can be satisfied while maintaining the minimum passing gap $\Delta y_{min}$, that is, $\Delta y_{min} \leq \bar{y} - (\Delta\bar{y}_A - \Delta y_A + \Delta\bar{y}_B - \Delta y_B)$. In this situation, the solutions for $\alpha^*$ and $\beta^*$, e.g., from equations (18) and (19) are:

$$\alpha^* = 1 - \Delta y_A / \Delta\bar{y}_A \text{ and} \tag{26}$$

$$\beta^* = 1 - \Delta y_B / \Delta\bar{y}_B. \tag{27}$$

Thus, the drivable area of the lane may be reduced as shown by the arrows such that the allocated first lateral constraint 1752 may be equal to the first target lateral constraint 1742

$$(\text{i.e., } y_A^* = \bar{y}_A)$$

and the allocated second lateral constraint 1754 may be equal to the second target lateral constraint 1744

$$(\text{i.e., } y_B^* = \bar{y}_B).$$

The vehicle 1700 being controlled can easily pass both hazard objects.

Figure 19:
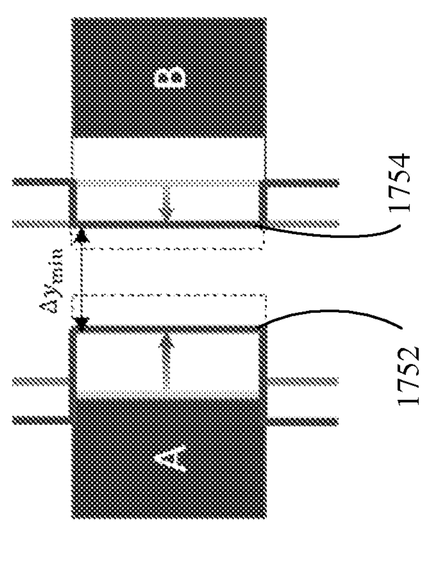
Figure 19:
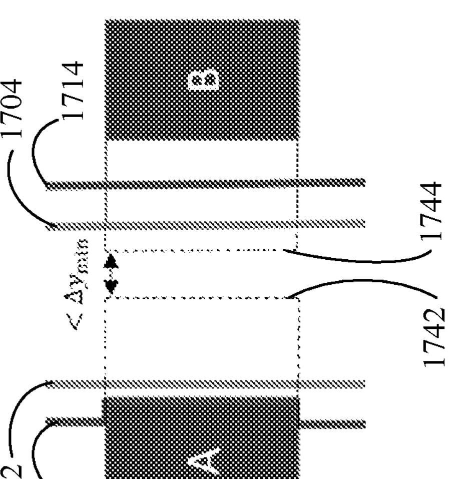
Figure 20:
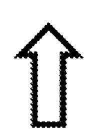
Figure 20:
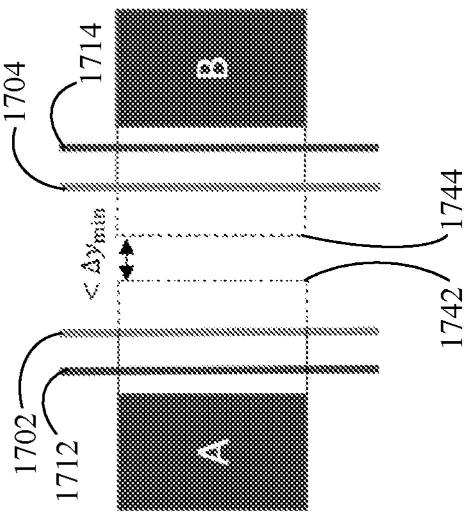

For the remaining three situations shown in FIGS. 18-20, the difference between the first target lateral constraint 1742 and the second target lateral constraint 1744 (i.e., $\bar{y}_A - \bar{y}_B < \Delta y_{min}$). Stated elsewise:

$$\Delta y_{min} > \bar{y} - (\Delta\bar{y}_A - \Delta y_A + \Delta\bar{y}_B - \Delta y_B). \tag{28}$$

In FIG. 18, the hazard zone A is further from the lane than the hazard zone B. In FIG. 19, the hazard zone A is closer to the lane than the hazard zone B. Finally, in FIG. 20, the hazard zone A and the hazard zone B are each closer to the lane than the situation shown in FIG. 17.

In these situations, it is useful to define a new variable $$\eta = \max(1 - \alpha_0, 1 - \beta_0). \tag{29}$$

As explained previously, each of $\alpha_0$ and $\beta_0$ have values that are at least equal to 0 and less than 1. Each represents a ratio of the difference between the hazard object's innermost boundary and the lane boundary (i.e., $\Delta y_A$, $\Delta y_B$) and the difference between the hazard object's innermost boundary and the target lateral constraint (i.e., $\Delta\bar{y}_A$, $\Delta y_B$). Accordingly, the value for $\eta$ has the same range of $0 \leq n < 1$.

In the situation shown in FIG. 18 (e.g., where the right target lateral constraint 1744 extends further into the lane than the left target lateral constraint 1742), combining equations (28) and (29) yields an updated relationship for $\Delta y_{min}$ as follows, where $\alpha_0 > \beta_0$:

$$\bar{y} - \eta(\Delta\bar{y}_A - \Delta\bar{y}_B) < \Delta y_{min}. \tag{30}$$

The solutions for $\alpha^*$ and $\beta^*$, e.g., from equations (18) and (19) are:

$$\alpha^* = 0 \text{ and} \tag{31}$$

$$\beta^* = (\Delta\bar{y} - \Delta y_{min}) / \Delta\bar{y}_B. \tag{32}$$

Thus, the drivable area of the lane may be reduced as shown by the arrows such that less of the lateral buffer is allocated to the allocated first lateral constraint 1752 than allocated to the allocated second lateral constraint 1754. While the vehicle 1700 being controlled can pass both hazard objects (e.g., because the minimum passing gap $\Delta y_{min}$ exists), a longitudinal contingency may be used to slow the vehicle 1700 because the target lateral constraints 1742, 1744 are not satisfied.

The situation in FIG. 19 is similar to the situation shown in FIG. 18, except that the left target lateral constraint 1742 extends further into the lane than the right target lateral constraint 1744. Combining equations (28) and (29) yields an updated relationship for $\Delta y_{min}$ represented by equation (30), where $\alpha_0 < \beta_0$.

The solutions for $\alpha^*$ and $\beta^*$, e.g., from equations (18) and (19) are:

$$\alpha^* = (\Delta\bar{y} - \Delta y_{min}) / \Delta\bar{y}_B \text{ and} \tag{33}$$

-continued $$\beta^* = 0. \quad (34)$$

Thus, the drivable area of the lane may be reduced as shown by the arrows such that less of the lateral buffer is allocated to the allocated second lateral constraint 1754 than allocated to the allocated first lateral constraint 1752. While the vehicle 1700 being controlled can pass both hazard objects (e.g., because the minimum passing gap $\Delta y_{min}$ exists), a longitudinal contingency may be used to slow the vehicle 1700 because the target lateral constraints 1742, 1744 are not satisfied.

In FIG. 20, $\Delta y_{min}$ is represented by a different inequality equation than equation (30), as follows:

$$\bar{y} - \eta(\Delta\bar{y}_A - \Delta\bar{y}_B) \geq \Delta y_{min}. \quad (35)$$

Parity may be achieved between the two ratios as follows such that $\alpha_0+\alpha^*=\beta_0+\beta^*$. Thus, the solution for $\beta^*$ is:

$$\beta^* = \alpha_0 + \alpha^* - \beta_0. \quad (36)$$

To solve for $\alpha^*$, equation (36) is substituted into the inequality constraint of equation (15):

$$\Delta y_{min} = \Delta\bar{y} - \alpha^*\Delta\bar{y}_A - \beta^*\Delta\bar{y}_B \quad (37)$$

$$\Delta y_{min} = \Delta\bar{y} - \alpha^*\Delta\bar{y}_A - (\alpha_0 + \alpha^* - \beta_0)\Delta\bar{y}_B \quad (38)$$

$$\Delta y_{min} = \Delta\bar{y} - \alpha^*(\Delta\bar{y}_A + \Delta\bar{y}_B) - (\alpha_0 - \beta_0)\Delta\bar{y}_B \quad (39)$$

$$\alpha^*(\Delta\bar{y}_A + \Delta\bar{y}_B) = \Delta\bar{y} - \Delta y_{min} - (\alpha_0 - \beta_0)\Delta\bar{y}_B \quad (40)$$

$$\alpha^* = (\Delta\bar{y} - \Delta y_{min} - (\alpha_0 - \beta_0)\Delta\bar{y}_B)/(\Delta\bar{y}_A + \Delta\bar{y}_B) \quad (41)$$

According to equations (36) and (41), the drivable area of the lane may be reduced as shown by the arrows such that equal portions of the lateral buffer are allocated to the allocated second lateral constraint 1754 and the allocated first lateral constraint 1752. While the vehicle 1700 being controlled can pass both hazard objects (e.g., because the minimum passing gap $\Delta y_{min}$ exists), a longitudinal contingency may be used to slow the vehicle 1700 because the target lateral constraints 1742, 1744 are not satisfied.

That is, and again referring to the method 500 if FIG. 5, after the lateral buffer is allocated at 516, respective longitudinal constraints may be determined at 518 in a like manner as described with regards to 510. Thereafter, the allocated lateral constraints and respective longitudinal constraints may be used in the process of determining the proactive trajectory at 512 as previously described.

Figure 21:
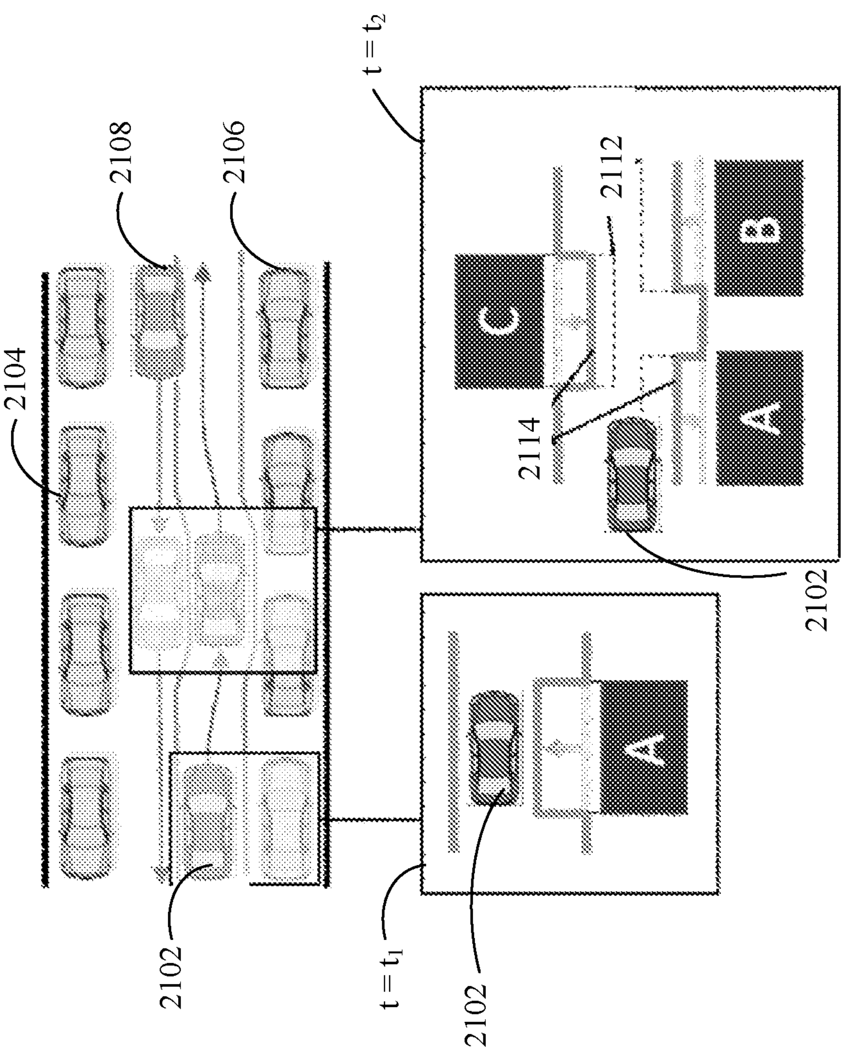
FIG. 21 is a diagram of an example of applying dual-sided buffer allocation according to implementations of this disclosure.

FIG. 21 is a diagram of an example of applying dual-sided buffer allocation according to implementations of this disclosure. In this example, the vehicle 2102 under control is traveling a lane with hazard objects in the form of parked vehicles 2104 on the left side of the lane and parked vehicles 2106 on the right side of the lane. A hazard object in the form of an oncoming vehicle 2108 is also present. The parked vehicles 2104 do not affect the trajectory of the vehicle 2102. At time $t_1$, the lateral constraint imposed by a parked vehicle of the parked vehicles 2106 is such that the passing gap is at least equal to $\Delta y_{min}$. For example, the lateral constraint may be determined to prevent the vehicle 2102 from contact with a car door if opened. The vehicle 2102 can advance without a longitudinal contingency. In contrast, at time $t_2$, the oncoming vehicle 2108 and the vehicle 2102 cross paths. The target lateral constraints 2112 for the hazard objects, where A and B represent two of the parked vehicles 2106 and C represents the oncoming vehicle 2108, may be used as input into the dual-sided buffer allocation to determine the allocated lateral constraints 2114. The proactive trajectory of the vehicle 2102 includes a lateral contingency that moves the vehicle 2102 closer to the parked vehicles 2106, because the materializing hazard (i.e., the oncoming vehicle 2108) may be prioritized over the less likely or non-materializing hazard (i.e., the parked car door). In FIG. 21, the passing gap is at least equal to $\Delta y_{min}$, but a longitudinal contingency (i.e., a reduction in speed) is desirable because the target lateral constraints 2112 are not satisfied (e.g., there is insufficient lateral buffer).

Figure 22:
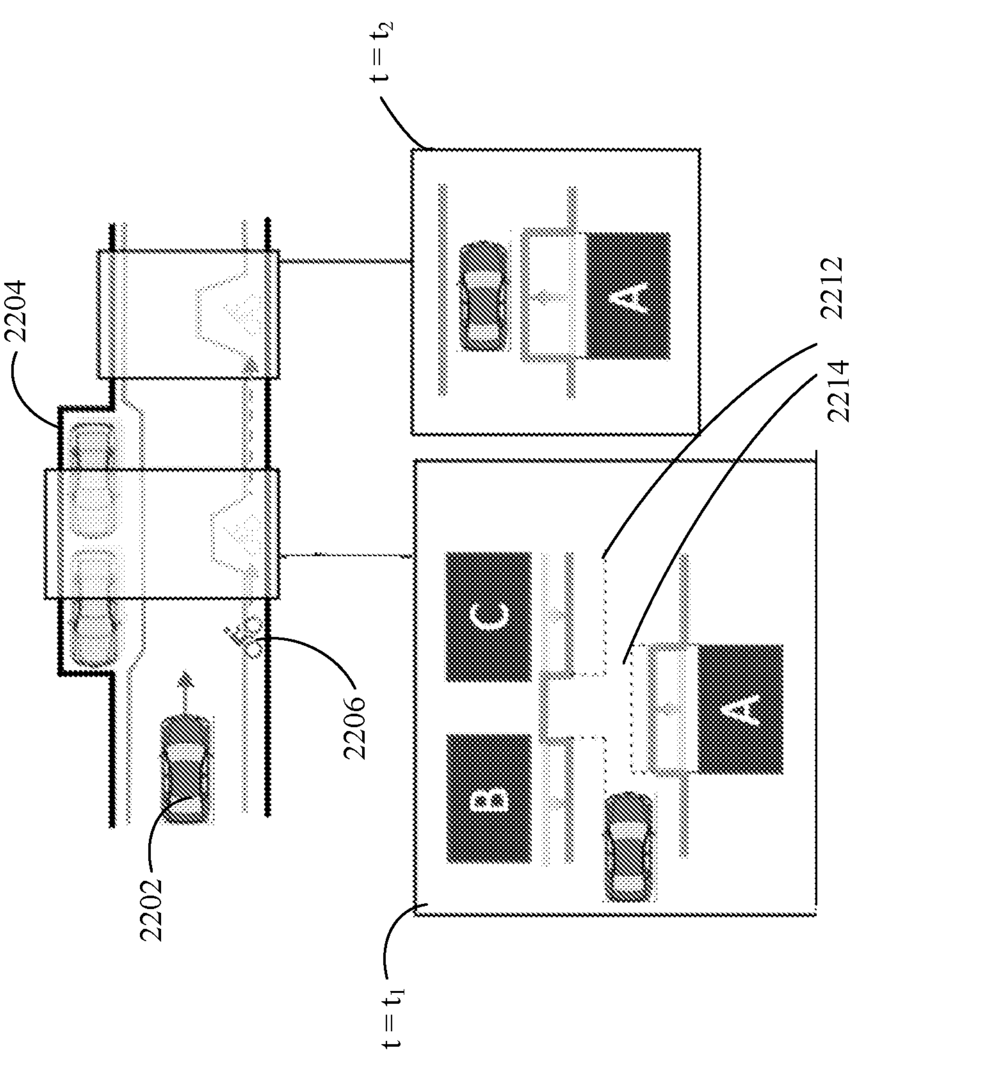
FIG. 22 is a diagram of another example of applying dual-sided buffer allocation according to implementations of this disclosure.

FIG. 22 is a diagram of another example of applying dual-sided buffer allocation according to implementations of this disclosure. The vehicle 2202 under control is traveling a lane with hazard objects in the form of parked vehicles 2204 on the left side of the lane. A parallel dynamic hazard object (e.g., one that is traveling in the same direction as the vehicle 2202) in the form of a cyclist 2206 is also present. At time $t_1$, lateral constraints are imposed by the parked vehicles 2204 and by the cyclist 2206. For example, the target lateral constraints 2212 for the parked vehicles 2204 may be determined to prevent the vehicle 2202 from contact with a car door if opened. The target lateral constraint 2214 for the cyclist 2206 may be determined as described previously with regards to dynamic hazard objects. The target lateral constraints 2212, where B and C represent the parked vehicles 2204, and the target lateral constraint 2214, where A represents the cyclist 2206, may be used as input into the dual-sided buffer allocation to determine the allocated lateral constraints, shown in the solid lines. The proactive trajectory of the vehicle 2202 may include a lateral contingency that moves the vehicle 2202 closer to the parked vehicles 2204, again because the materializing hazard (i.e., the cyclist 2206) may be prioritized over the less likely or non-materializing hazard (i.e., the parked car door). A longitudinal contingency is also desirable because the target lateral constraints 2212, 2214 are not satisfied (e.g., there is insufficient lateral buffer). In this example, however, the classification of the dynamic hazard object (i.e., a bicycle) may be used to include a longitudinal contingency that follows the cyclist 2206, instead of reducing its speed to slowly pass the cyclist 2206 through the passing gap, which is at least equal to $\Delta y_{min}$. Thereafter, at time $t_2$, the target lateral constraint 2214 can be cut out of the drivable area and the passing gap remains at least equal to $\Delta y_{min}$. Accordingly, the vehicle 2202 can follow a proactive trajectory that includes a lateral contingency that moves further away from the cyclist 2206 and a longitudinal contingency that accelerates the vehicle 2202 to pass the cyclist 2206.

Figure 23:
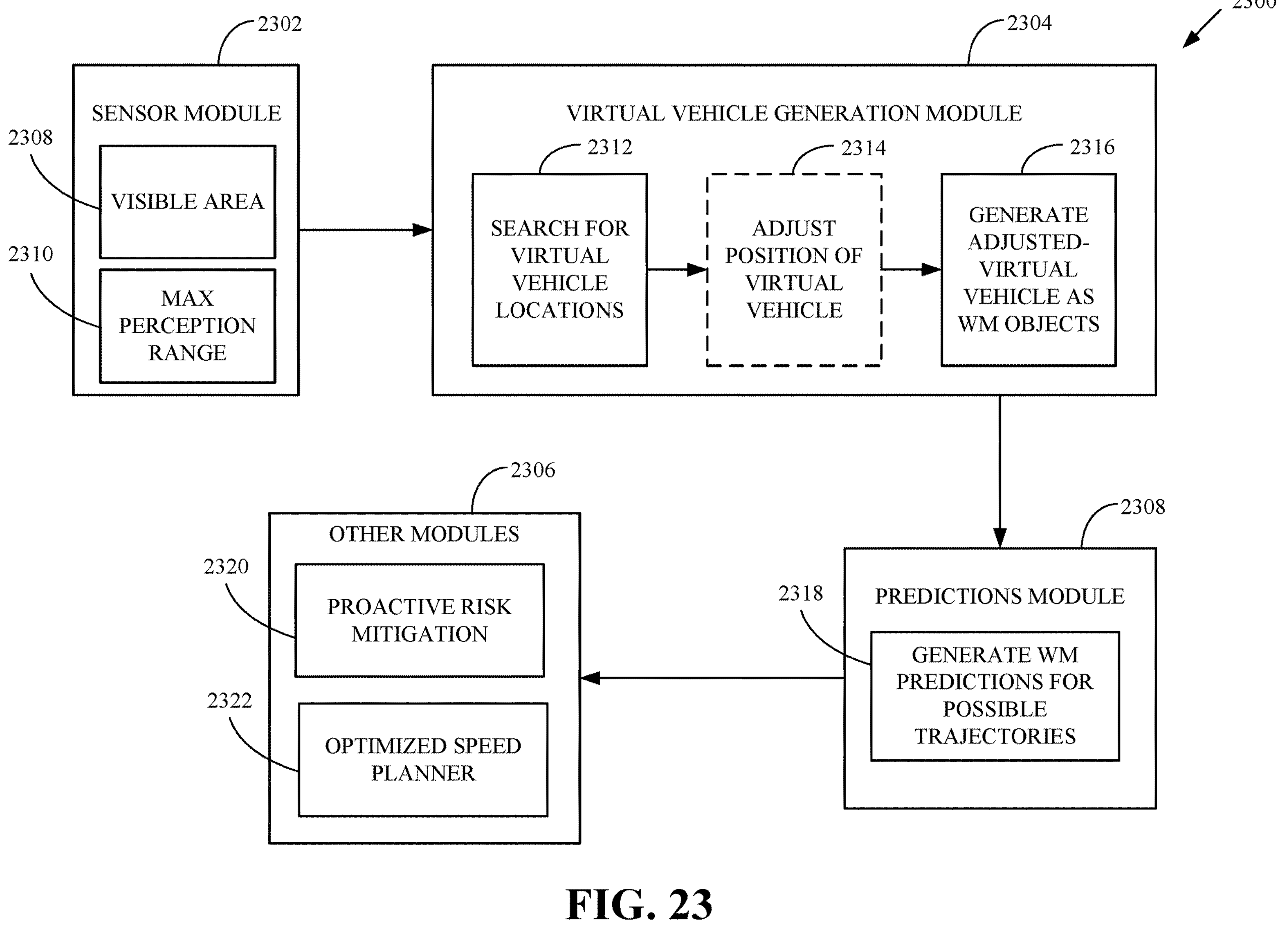
FIG. 23 is block diagram of a system for using virtual vehicles.

FIG. 23 is block diagram of a system 2300 for using virtual vehicles. The system 2300 includes a sensor module 2302, a virtual vehicle generation module 2304, a predictions module 2308, and one or more other modules 2308 that can use the generated virtual vehicles. Each of the modules of the system 2300 can be stored as executable instructions in a memory, such as the memory 122 of FIG. 1. The executable instructions can be executed by a processor, such as the processor 120 of FIG. 1. At least some of the executable instructions can be executed in whole or in part by hardware components associated with a computer. The system 2300 can be included in the vehicle 100 of FIG. 1, the vehicle 202 shown in FIG. 2, by remote assistance support described previously, or by a combination thereof.

The sensor module 2302 may include or perform instructions for identifying a visible area, at 2308, and identifying a maximum perception range, at 2310. The virtual vehicle generation module 2304 may include or perform instructions for, at 2312, searching for virtual vehicle locations along the path of the vehicle, (optionally) adjusting positions one or more of the virtual vehicle locations, at 2314, and generating adjusted-virtual vehicles as world-model objects, at 2316. The positions of the one or more of the virtual vehicle locations may be adjusted, such as due to perception, tracking, and/or prediction delays. Generating the adjusted-virtual vehicles as world-model objects includes that representative objects of the virtual vehicles are added to the world model 302 of FIG. 3. Metadata can be associated with the virtual vehicles indicating that they are virtual as opposed to being actual (e.g., sensed) vehicle. The metadata can be used to set lateral and/or speed constraints for virtual vehicles that are at least slightly different than those of actual perceived vehicles.

As the virtual vehicles are added to the world model 302, any processing described above with respect to objects of the world model 302 can be performed on the virtual vehicles. As such, a prediction module 2308, which can be the world model 302, can generate predictions (e.g., hypotheses) for the virtual vehicles, at 2318. In an example, the predictions associated virtual vehicles can only be those that impede (e.g., cross) the path of the vehicle. Additionally, any other modules 2306 can also use the virtual vehicles. The other modules 2306 can include a proactive risk mitigation module 2320 and an optimized speed planner 2322, which can be, include, or implement the object avoidance layer 406, the proactive trajectory optimization layer 408, or combination thereof.

Figure 24:
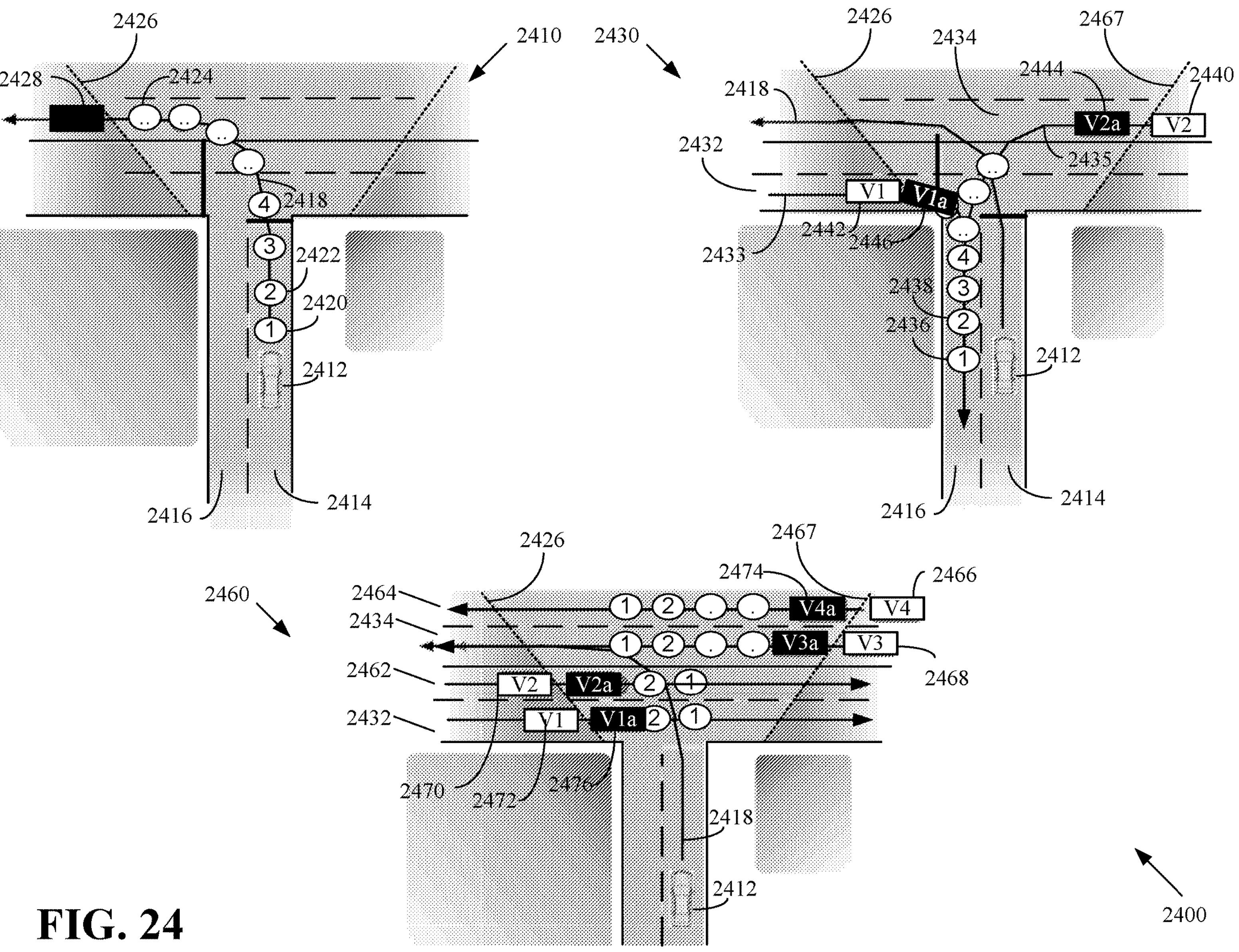
FIG. 24 illustrates examples of identifying virtual vehicle locations.

FIG. 24 illustrates examples 2400 of identifying virtual vehicle locations. Different types of virtual vehicles can be searched for, including a leading virtual vehicle, a virtual oncoming vehicle, and a virtual crossing vehicle. The types of virtual vehicles to be searched (e.g., identified) can depend on road geometry (e.g., road structure), which can be obtained from map data, such as the HD map data 410 of FIG. 4.

A scene 2410 illustrates identifying a virtual vehicle that is a lead vehicle. The scene 2410 include a vehicle 2412 that is traversing a road that includes a first lane 2414 and an oncoming lane 2416. The vehicle 2412 is traveling along a planned trajectory 2418. As such, the vehicle 2412 is planned to turn left at an intersection (not marked). A search for a lead virtual vehicle can start along discrete identified locations of the trajectory of the vehicle 2412. Thus, the search starts at locations 2420, 2422, and so on until a last location that is observable by sensors of the vehicle 2412 along the trajectory 2418. A left boundary 2426 delineates (e.g., indicates) the area observable (e.g., visible) by sensors of the vehicle 2412 along the trajectory 2418 of the vehicle 2412. As such, a location 2424 is the last location that is observable by the sensors of the vehicle 2412.

A leading virtual vehicle 2428 can be assumed to exist at the location immediately outside the of visible area. In an example, the location of the leading virtual vehicle 2428 can be the next identified (e.g., calculated) discrete location of the vehicle 2412 after the location 2424. The leading virtual vehicle 2428 can be assumed to be static. That is, a worst case scenario (i.e., that the leading virtual vehicle 2428 is standing still) can be assumed with respect to the leading virtual vehicle 2428. The location of the leading virtual vehicle 2428 need not be adjusted. The location of the leading virtual vehicle 2428 (immediately outside of the observable area) may be considered to be the most conservative estimation of its location.

A scene 2430 illustrates identifying virtual vehicles that are oncoming vehicles. In the scene 2430, the vehicle 2412 is still traveling along the planned trajectory 2418. The system 2300 of FIG. 23 can identify, based on the map data, that vehicles could be coming onto the oncoming lane 2416 from a West-East lane 2432 and an East-West lane 2434. The system 2300 can search backwards along the oncoming lane 2416 along discrete locations of potential paths of oncoming vehicles. The system 2300 may identify a first potential trajectory 2433 and a second potential trajectory 2435.

The system 2300 can start searching backwards from the locations 2436 and 2438 until a right most boundary 2467 is identified as the left-most location along the East-West lane 2434 that can be observed. The system 2300 can identify a location for a first oncoming virtual vehicle 2440 just outside of the observable area. Similarly, the system 2300 can start searching backwards from locations 2436 and 2438 until the left boundary 2426 is identified as the right-most location along the West-East lane 2432 that can be observed. The system 2300 can identify a location for a second oncoming virtual vehicle 2442 just outside of the observable area.

The locations of the identified oncoming vehicles may be adjusted to account for processing delays. Processing delays may be associated with perception, tracking, and/or prediction delays. Much as a human may require some time (e.g., a split second) to process a vehicle that just immediately pops up in their view), an automated system may also require time to process new sensed data. To illustrate, and as described above, sensor (e.g., LiDar) data may be converted into a point cloud, the point cloud is further processed to identify (e.g., classify) the object (such as into a car, a truck, a wall, and so on), and then further processing time is required with respect to the object (for example to identify a speed or pose of the object, a predicted trajectory for the object, etc.). By the time such processing is performed, the location of the world object, as initially observed, may change. As such, a small delay may be incurred before an object (e.g., an actual detected object) is incorporated into the world model. As such, the adjustments to the locations of identified oncoming virtual vehicles can be based on a nominal (e.g., empirically derived) processing time.

As such, the locations of the oncoming virtual vehicles may be pushed a bit further down their possible paths to account for the processing delays. Thus, the system 2300 operates under the assumption that there could be an oncoming vehicle just outside the visible range, but that the predicted virtual vehicle is slightly ahead to account for the possible delays. Accordingly, a first adjusted oncoming virtual vehicle 2444 and a second adjusted oncoming virtual vehicle 2446, corresponding respectively to the first oncoming virtual vehicle 2440 and the second oncoming virtual vehicle 2442, are added to the world model.

A scene 2460 illustrates identifying virtual vehicles that are crossing vehicles. In the scene 2460, the vehicle 2412 is still traveling along the planned trajectory 2418. The system 2300 of FIG. 23 can identify, based on the map data, that vehicles could be crossing lanes, such as at an intersection or a T-intersection. In the scene 2460, two West-East lanes (i.e., the West-East lane 2432 and a lane 2462) and two East-West lanes (i.e., the East-West lane 2434 and a lane 2464) are identified. The system 2300 can search for locations of crossing virtual vehicles beginning from each of the crossing lanes. That is, the search can be begin from points directly ahead of the vehicle 2412 along each of the crossing lanes. A crossing vehicle is one whose path may cross the path of the vehicle 2412. Thus, a crossing virtual vehicle anticipates the possibility that a crossing vehicle might unexpectedly materialize (e.g., become observable).

As such, the system 2300 can identify respective locations for crossing virtual vehicles 2466, 2468, 2470, and 2472, as shown. As described above, the locations of the crossing virtual vehicles 2466, 2468, 2470, and 2472 can be just outside of the observable area (i.e., outside of the left boundary 2426 and outside of the right most boundary 2467). As also, described above, in an example, the locations of the crossing virtual vehicles 2466, 2468, 2470, and 2472 can be adjusted to account for processing delays. As such, and to illustrate, the crossing virtual vehicles 2466 and 2472 can be adjusted to locations of adjusted crossing virtual vehicles 2474 and 2476, respectively.

To reiterate, a virtual vehicle may be instantiated (e.g., identified to be) within an occluded area at a virtual vehicle location; and an adjusted virtual vehicle may be fed into a sensor fusion module further "down the road" at an adjusted virtual vehicle location to account for processing delays (e.g., perception, tracking, and/or prediction delays).

Figure 25A:
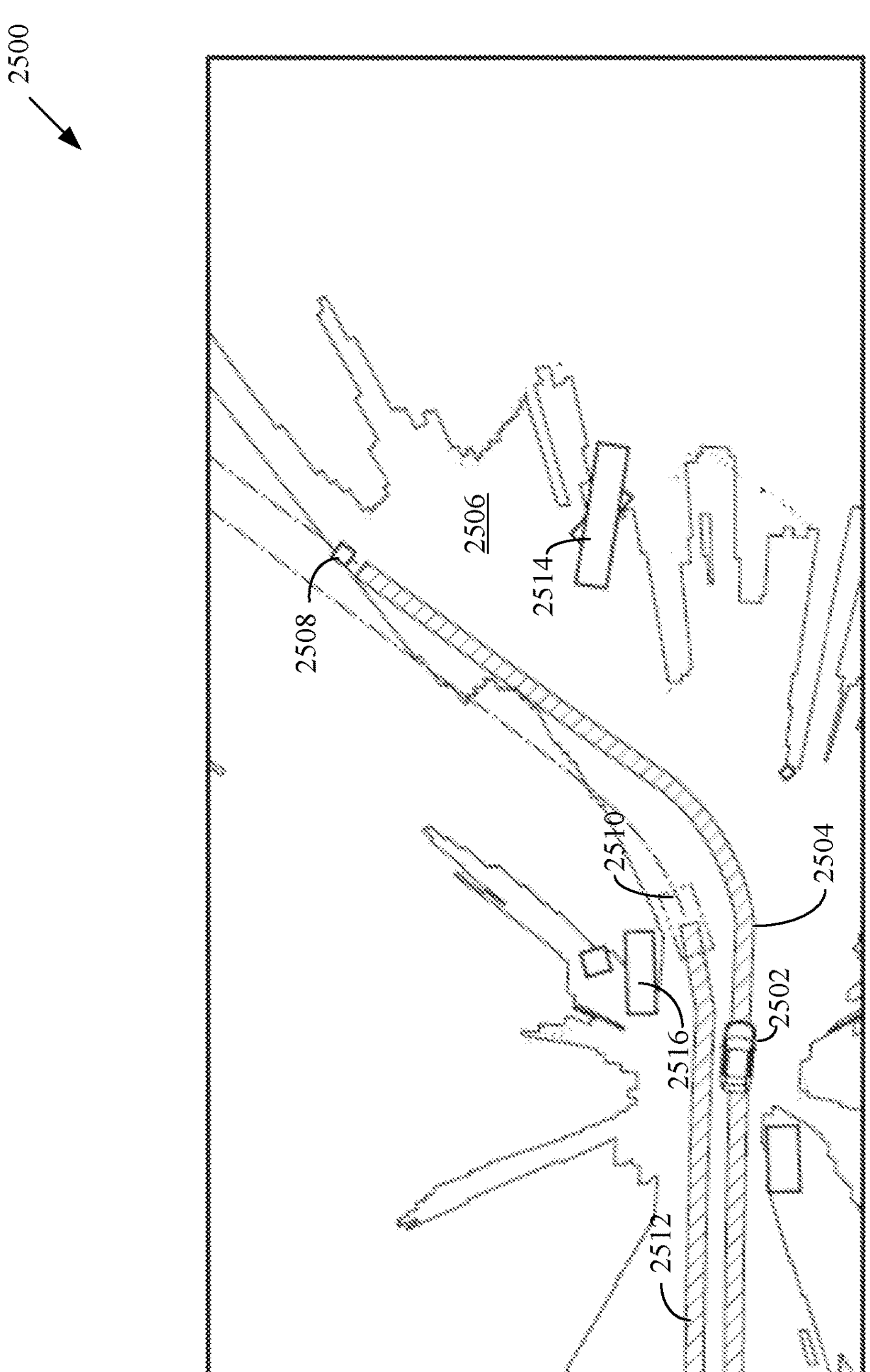
FIG. 25A is a visualization of a world model of a vehicle.

FIG. 25A is a visualization 2500 of a world model of a vehicle 2502. The vehicle 2502 is traveling along a planned trajectory 2504, which can be the planned trajectory 2418 of FIG. 24. The visualization 2500 illustrates an extent 2506 of an area observable by (e.g., visible to) sensors of the vehicle 2502. The world model of the vehicle 2502 includes a virtual leading vehicle 2508, which can be the leading virtual vehicle 2428 of FIG. 24; and an adjusted oncoming virtual vehicle 2510, which can be the second adjusted oncoming virtual vehicle 2446 of FIG. 24. A predicted trajectory 2512 indicates the predicted trajectory of the adjusted oncoming virtual vehicle 2510. The visualization 2500 also illustrates that other actual, detected objects (such as object 2514, 2516) are included in the world model of the vehicle 2502. The planned trajectory 2504 is planned taking into consideration at least the virtual leading vehicle 2508 and the oncoming virtual vehicle 2510.

Figure 25B:
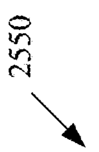
FIG. 25B is another visualization of a world model of a vehicle.
Figure 25B:
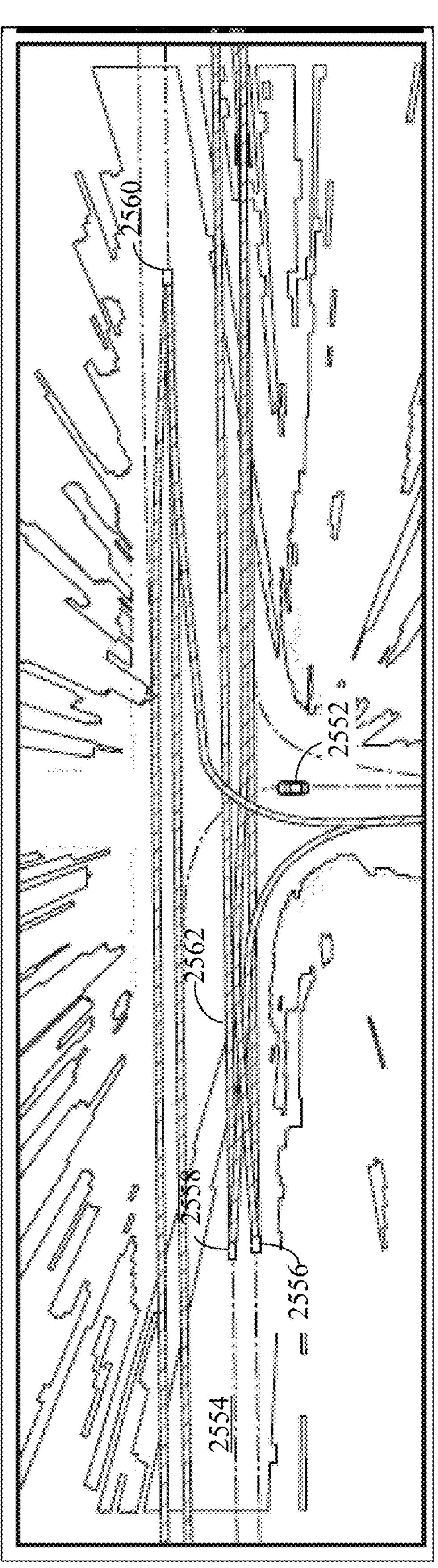

FIG. 25B is another visualization 2550 of a world model of a vehicle 2552. The visualization 2550 illustrates an extent 2554 of an area observable by (e.g., visible to) sensors of the vehicle 2552. The road geometry corresponding to the visualization 2550 is such that there are two West-East crossing lanes and one East-West crossing lane (which are not specifically marked in FIG. 25B). As such, the system 2300 of FIG. 23 has generated the respective adjusted crossing virtual vehicles 2556, 2558, and 2560. The visualization 2550 also illustrates that other actual, detected objects (such as an object 2562) are also included in the world model of the vehicle 2552.

Figure 26:
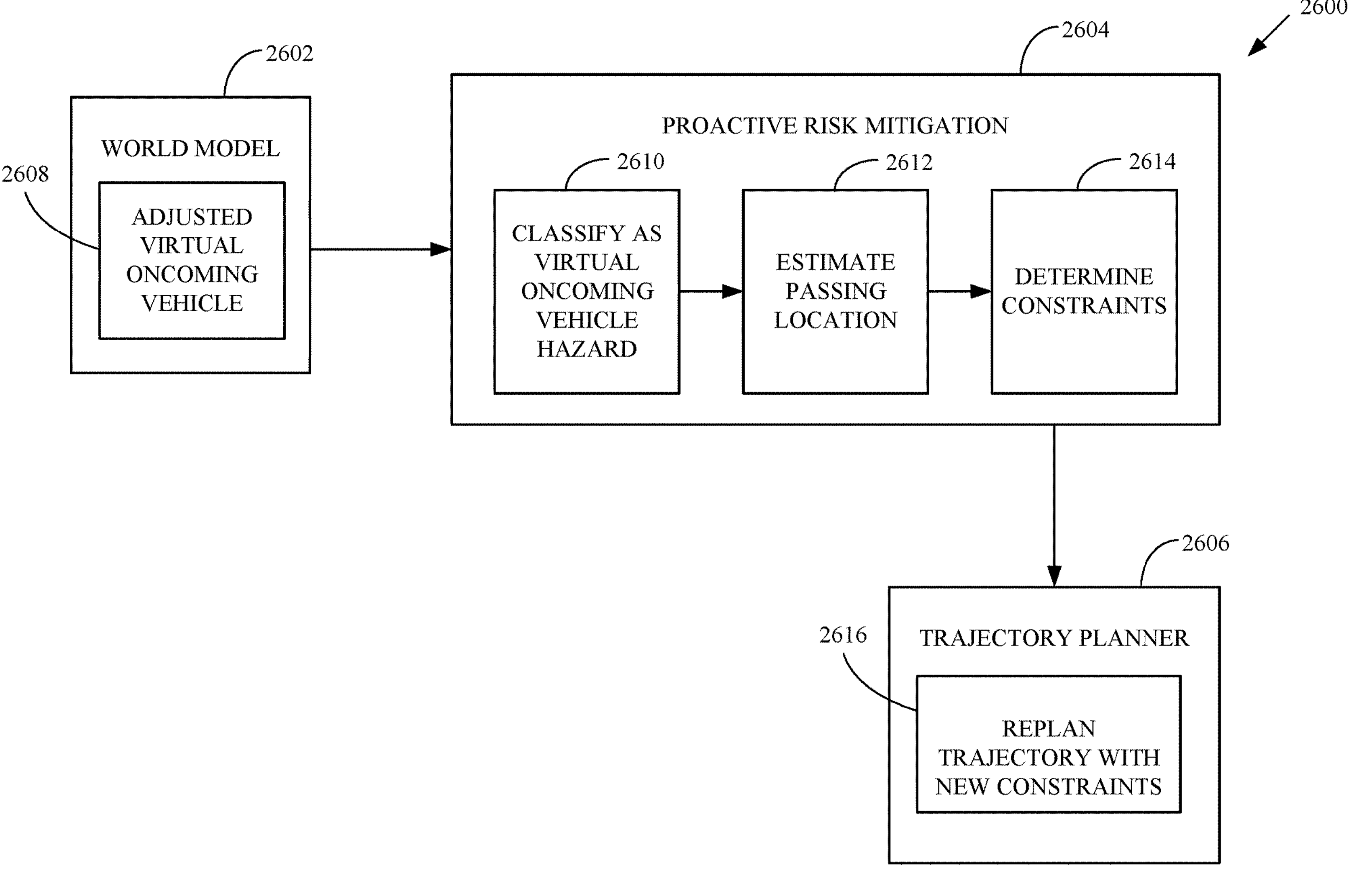
FIG. 26 is block diagram of a system for using virtual oncoming vehicle hazards.

FIG. 26 is block diagram of a system 2600 for using virtual oncoming vehicle hazards. The system 2600 can optimize path planning around narrow corners. The system 2600 can create a virtual vehicle if an occlusion is identified in an oncoming lane and/or based on a maximum perception range. The system 2600 can be used to estimate passing locations, as described above, with respect to oncoming virtual vehicles. As described above, a trajectory of a vehicle may be replanned with new constraints in response to oncoming (in this case, virtual) vehicles. As described herein, oncoming vehicle hazards are detected vehicles that are traveling in oncoming lanes. A predicted trajectory of an oncoming vehicle can be used to modify minimum risk maneuver zone. Lateral and/or speed constraints can be calculated to minimize risk when passing an oncoming vehicle.

The system 2600 includes a world model module 2602, which can be the world model 302 of FIG. 3, a proactive risk mitigation module 2604, and a trajectory planner 2606, which perform functions as described above. Each of the modules of the system 2600 can be stored as executable instructions in a memory, such as the memory 122 of FIG. 1. The executable instructions can be executed by a processor, such as the processor 120 of FIG. 1. At least some of the executable instructions can be executed in whole or in part by hardware components associated with a computer. The system 2600 can be included in the vehicle 100 of FIG. 1, the vehicle 202 shown in FIG. 2, by remote assistance support described previously, or by a combination thereof.

As described above, an adjusted virtual oncoming vehicle can be added at 2608 to the world model of (e.g., maintained by or for the vehicle). At 2610, the adjusted oncoming virtual vehicle can be classified (e.g., identified) as a hazard. At 2612, a passing location is estimated for the vehicle. The passing location can be estimated based on predictions of the trajectories of the adjusted oncoming virtual vehicle. At, 2614, constraints are determined. The constraints can include lateral constraints, speed constraints, or both, as described above. At 2616, a new trajectory for the vehicle is planned based on the constraints.

Figure 27:
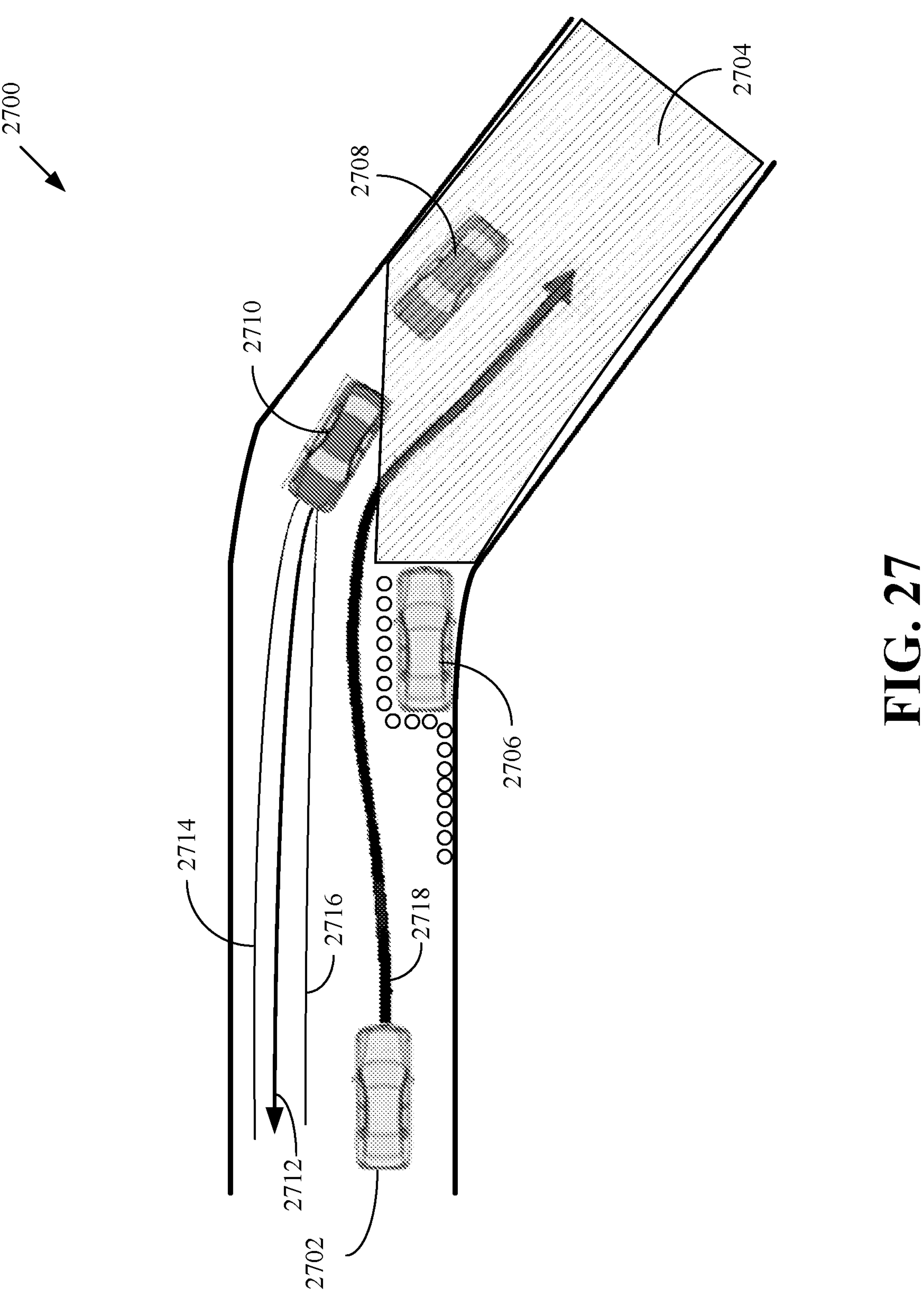
FIG. 27 illustrates a scene of using oncoming virtual vehicles as hazard objects.

FIG. 27 illustrates a scene 2700 of using oncoming virtual vehicles as hazard objects. The scene 2700 includes a vehicle 2702. The scene 2700 illustrates improvements to path planning in autonomous driving around narrow corners such that the path planning may be more "human-like." The scene 2700 is used to describe mitigating against vehicles unexpectedly appearing, such as around tight corners or turns.

The vehicle 2702 is traversing a road that includes an incoming lane (not specifically marked in FIG. 27). The scene 2700 illustrates an occlusion 2704 that is caused by an obstruction (e.g., a stalled vehicle 2706). The obstruction limits the visible area to the sensors of the vehicle 2702. Thus, and as described with respect to the scene 2430 of FIG. 24, a location for an oncoming virtual vehicle 2708 is identified. Additionally, an adjusted oncoming virtual vehicle 2710 is added to a world model of the vehicle 2702. A location for the adjusted oncoming virtual vehicle 2710 is identified and associated with the adjusted oncoming virtual vehicle 2710 as described with respect to FIG. 24.

A predicted path 2712 of the adjusted oncoming virtual vehicle 2710 is identified. In an example, path prediction variances may also be identified. The variances include a left variance 2716 and a right variance 2714 at each predicted location in future timestamps. The variances can be used to account for varying movement behaviors of the adjusted oncoming virtual vehicle 2710 since exactly predicting trajectories of other road users (e.g., human drivers) can be difficult. The predicted trajectory variances can be used to capture uncertainties in the predicted path 2712. The variances (i.e., deviations from a predicted path 2712) can increase with the lane curvature. The variances can be used to increase the lateral and the speed constraints around (tight) corners.

In response to the predicted path 2712 (and variances), a trajectory 2718 is identified for the vehicle 2702. The vehicle 2702 is controlled the traverse the trajectory 2718 in such a way that vehicle 2702 is slowed down and remains slightly to the right (e.g., away from the predicted path 2712 plus the left variance 2716). If the gap is too narrow for the vehicle 2702 to pass through, the vehicle 2702 can be slowed down further; but is not completely stopped.

The vehicle 2702 may be controlled to complete only a part of the risk mitigation plan (i.e., the trajectory 2718) because the adjusted oncoming virtual vehicle 2710 recedes as the vehicle 2702 moves forward and any occluded areas gradually become visible. The trajectory 2718 can be considered to be or similar to the proactive trajectory 1212 of FIG. 12. As such, the trajectory 2718 is determined in consideration of the hazard zone so as to perform the minimum proactive lateral maneuver that maintains the reactive capability of the vehicle 2702. That is, the trajectory 2718 is determined to include a lateral contingency and/or a speed contingency so that the vehicle 2702 can perform an emergency maneuver if an oncoming vehicle materializes. The lateral contingency and/or the speed contingency may be a fraction (e.g., 80%) of the lateral contingency and the speed contingency used with respect to an observed oncoming vehicle.

Absent the mitigation strategy described herein wherein oncoming virtual vehicles are considered, the trajectory planner of the vehicle 2702 may cause the vehicle 2702 to make a wider turn. However, since a virtual vehicle is present and a prediction therefore is taken into account, the trajectory of the vehicle 2702 is adjusted so that the vehicle 2702 keeps to the right and/or slows down as a good human driver would.

Figure 28:
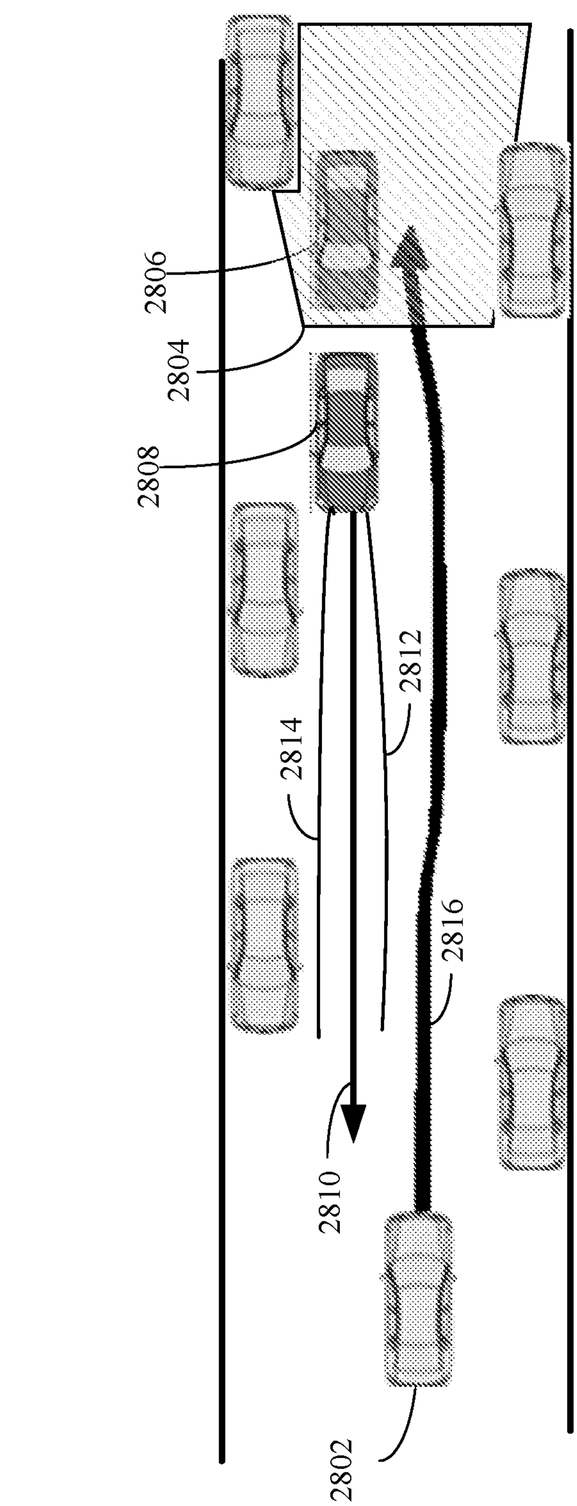
FIG. 28 illustrates a scene of using oncoming virtual vehicles as hazard objects.

FIG. 28 illustrates a scene 2800 of using oncoming virtual vehicles as hazard objects. The scene 2800 includes a vehicle 2802. The scene 2800 illustrates improvements to path planning in autonomous in the case of limited sensor perception and tracking range such that the path planning may be more "human-like."

The vehicle 2802 is traversing a road that includes an incoming lane (not specifically marked in FIG. 28). The scene 2800 illustrates that the sensors of the vehicle 2802 cannot perceive beyond or within an area 2804. For example, visibility may be poor due to weather conditions or limitations in the sensors themselves (for example, the sensors may not have a limited range, such as 200 meters). Thus, and as described with respect to the scene 2430 of FIG. 24, a location for an oncoming virtual vehicle 2806 is identified. Additionally, an adjusted oncoming virtual vehicle 2808 is added to a world model of the vehicle 2802. A location for the adjusted oncoming virtual vehicle 2808 is identified and associated with the adjusted oncoming virtual vehicle 2808 as described with respect to FIG. 24.

A predicted path 2810 of the adjusted oncoming virtual vehicle 2808 is identified. In an example, path prediction variances may also be identified. The variances may include a left variance 2812 and a right variance 2814 at each predicted location in future timestamps, which may be used as described above with respect to FIG. 27.

In response to the predicted path 2810 (and variances), a trajectory 2816 is identified for the vehicle 2802. The vehicle 2802 is controlled the traverse at least a portion of the trajectory 2816 in such a way that vehicle 2802 is slowed down and remains slightly to the right (e.g., away from the predicted path 2810 plus the left variance 2812). If the gap is too narrow for the vehicle 2802 to pass through, the vehicle 2802 can be slowed down further; but is not completely stopped.

The vehicle 2802 is controlled to complete only a part of the risk mitigation plan (i.e., the trajectory 2816) because the adjusted oncoming virtual vehicle 2808 recedes as the vehicle 2802 moves forward and any occluded areas gradually become visible. The trajectory 2816 can be considered to be or similar to the proactive trajectory 1212 of FIG. 12. As such, the trajectory 2718 is determined in consideration of the hazard zone so as to perform the minimum proactive lateral maneuver that maintains the reactive capability of the vehicle 2802. That is, the trajectory 2816 is determined to include a lateral contingency and/or a speed contingency so that the vehicle 2802 can perform an emergency maneuver if an oncoming vehicle materializes. The lateral contingency and/or the speed contingency may be a fraction (e.g., 80%) of the lateral contingency and the speed contingency used with respect to an observed oncoming vehicle.

Figure 29A:
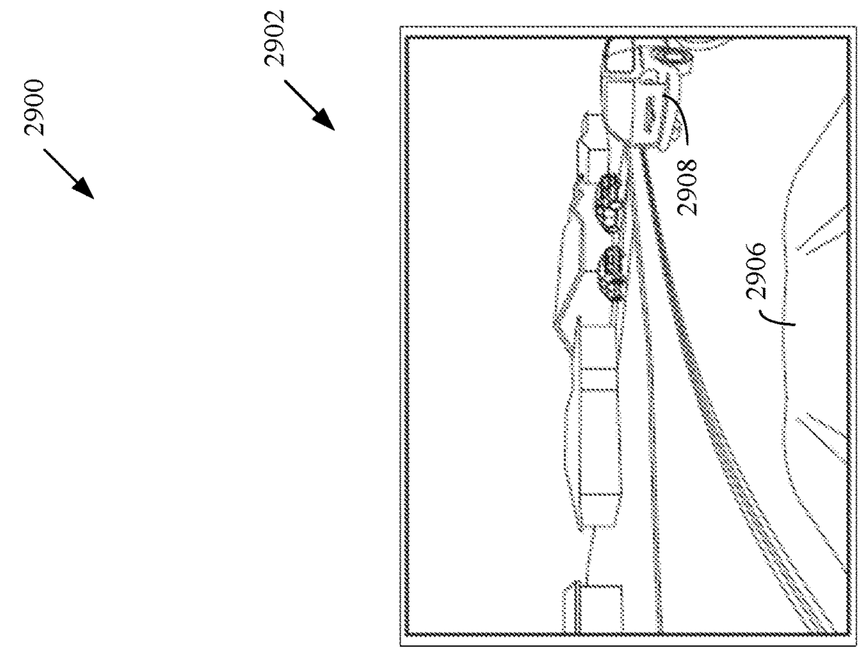
FIG. 29A is an example illustrating using oncoming virtual vehicles around tight corners with occlusions.
Figure 29A:
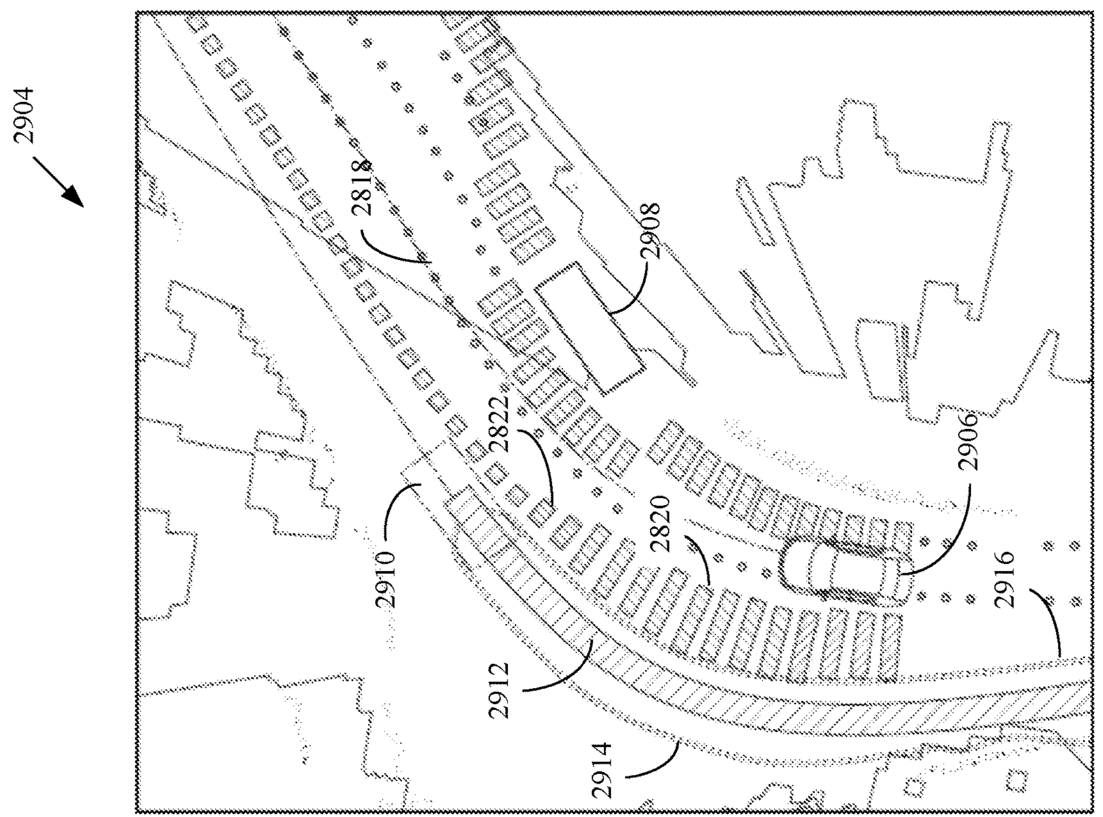

FIG. 29A is an example 2900 illustrating using oncoming virtual vehicles around tight corners with occlusions. A view 2902 illustrates a view captured by a front facing camera of a vehicle 2906; and a visualization 2904 is a visualization of a world model maintained by the vehicle 2906 corresponding to the view 2902. The example 2900 illustrates a scene that is similar to that described with respect to FIG. 27. The world model includes an actual, observed object 2908. Since the sensors of the vehicle 2906 cannot perceive around a curve (not specifically marked), an adjusted oncoming virtual vehicle 2910 has been added to the world model with a predicted trajectory 2912 and variances 2914 and 2916.

Accordingly, the system 2300 of FIG. 23 or the system 2600 of FIG. 26 calculated an adjusted trajectory 2818 for the vehicle 2906 taking into consideration the observed object 2908 and the adjusted oncoming virtual vehicle 2910. Bars filled with a first pattern (such as a bar 2820) illustrate that lateral constraints (and extents therefor) have been applied to the adjusted trajectory 2818 at the indicated locations; and bars filled with a second pattern (such as a bar 2822) illustrate that lateral and speed constraints (and extents therefor) have been applied to the adjusted trajectory 2818 at the indicated locations. The constraints increase as the predicted trajectory variances of the predicted trajectory 2912 increase.

Figure 29B:
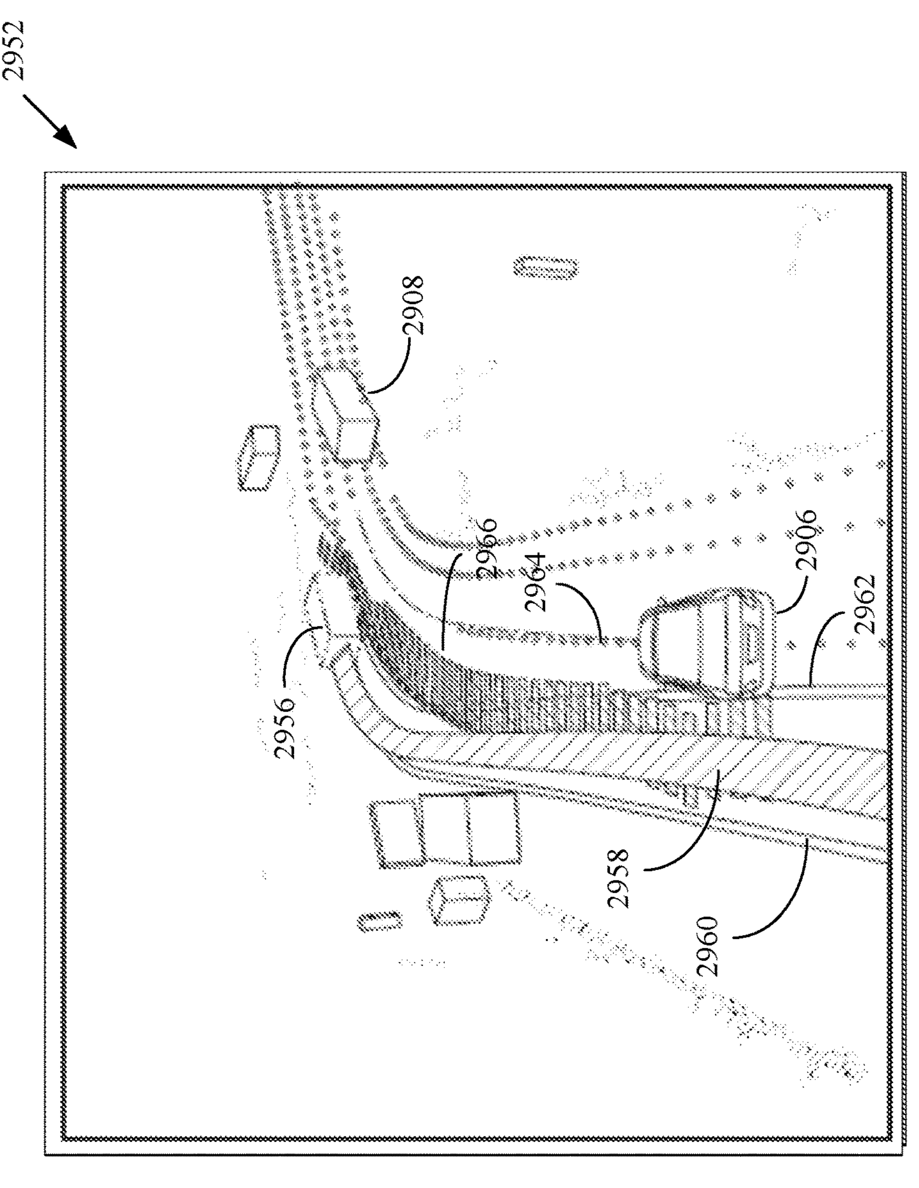
FIG. 29B is an example illustrating the same situation of FIG. 29A but is captured earlier in time.
Figure 29B:

FIG. 29B is an example illustrating the same situation of FIG. 29A but is captured earlier in time. A visualization 2952 is a visualization of the world model maintained by the vehicle 2906. The world model includes the actual, observed object 2908. Since the sensors of the vehicle 2906 cannot perceive around the curve (not specifically marked), an adjusted oncoming virtual vehicle 2956 has been added to the world model with a predicted trajectory 2958 and variances 2960 and 2962. It is noted that the location, trajectory, and variances identified with respect to (e.g., calculated or determined for) the adjusted oncoming virtual vehicle 2956 are likely different from those described with respect to the adjusted oncoming virtual vehicle 2910 of FIG. 29A since different occluded areas may be identified at different locations of the vehicle 2906.

Accordingly, the system 2300 of FIG. 23 or the system 2600 of FIG. 26 calculated an adjusted trajectory 2964 for the vehicle 2906 taking into consideration the observed object 2908 and the adjusted oncoming virtual vehicle 2956. Bars filled with the first pattern (such as a bar 2966) illustrate that lateral constraints (and extents therefor) have been applied to the adjusted trajectory 2964 at the indicated locations. In this situation, no speed constraints were added to the adjusted trajectory 2964.

Figure 30:
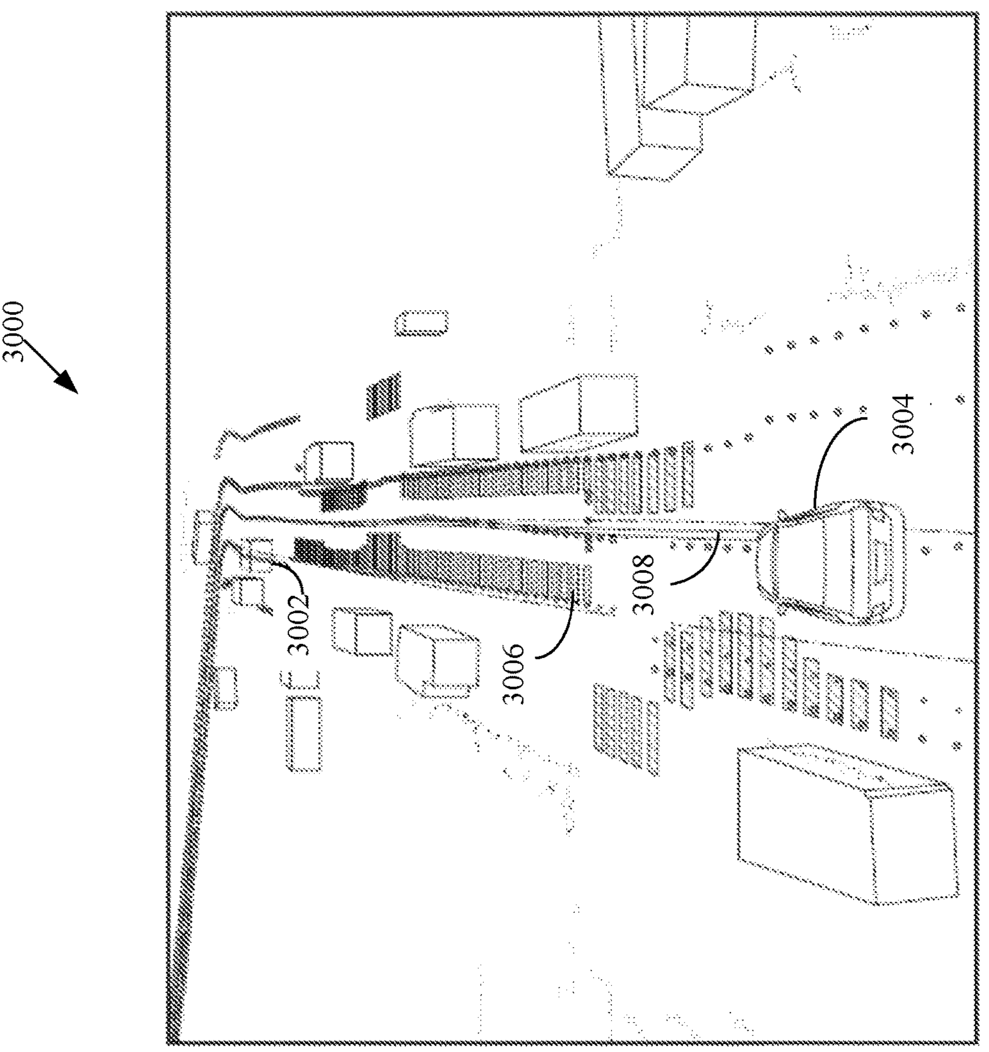
FIG. 30 illustrates a scene for creating virtual vehicles based on a maximum perception and tracking range.

FIG. 30 illustrates a scene 3000 for creating virtual vehicles based on a maximum perception and tracking range. The scene 3000 illustrates that an adjusted virtual oncoming vehicle 3002 is created at the maximum a perception and tracking range of sensors of a vehicle 3004. Bars filled with the second pattern (such as a bar 3006) illustrate that the adjusted trajectory 3008 calculated for the vehicle 3004 includes lateral and speed constraints such that the vehicle 3004 is controlled to stay to the right and decelerate.

FIG. 31 illustrates a scenario 3100 of using oncoming virtual vehicles. The scenario 3100 illustrates a first scene 3102 corresponding to a first time step and a first location of a vehicle 3104 with respect to a curve; and a second scene 3106 corresponding to a second time step and a second location of the vehicle 3104 with respect to a curve.

In the first scene 3102, as the sensors cannot perceive around the curve, an adjusted oncoming virtual vehicle 3108 is added to the world model of vehicle 3104 and an adjusted trajectory is planned accordingly. The adjusted oncoming virtual vehicle 3108 is classified as a hazard caused by the occlusion around the curve (corner). The adjusted trajectory includes speed and lateral constraints, as illustrated by a bar 3110, such that the vehicle 3104 is controlled to stay on the right and decelerate.

In the second scene 3106, a real (i.e., perceived) oncoming vehicle hazard 3112 is detected and overtakes the adjusted oncoming virtual vehicle 3108 and a new trajectory including new constraints (as illustrated by a bar 3114) is calculated. The new lateral and speed constraints increase, as compared to those of the first scene 3102, causing the vehicle 3104 to be controlled to move farther to the right and slow down even more. It is noted that since at least part of the proactive risk mitigation maneuver has already been done as part of the first scene 3102, the transition to the more stringent constraints is smoother (e.g., less drastic) and more comfortable for occupants of the vehicle 3104.

Figure 32:
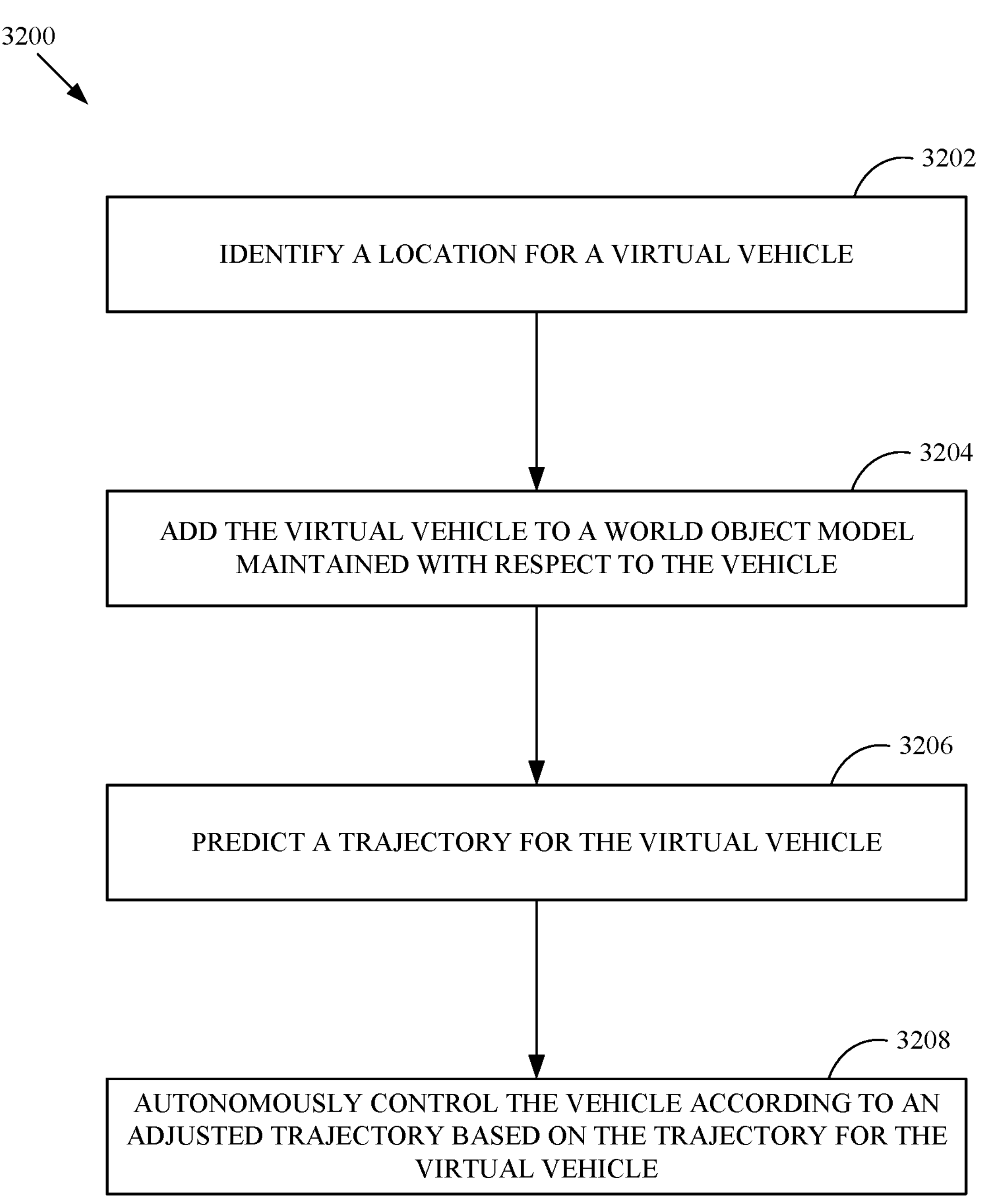
FIG. 32 is a flowchart diagram of a method for proactive risk mitigation using virtual vehicles.

FIG. 32 is a flowchart diagram of a method 3200 for proactive risk mitigation using virtual vehicles. The method 3200 can be executed in whole or in part by hardware components associated with a computer. The method 3200 can be executed by a vehicle, such as the vehicle 100 of FIG. 1, the vehicle 202 shown in FIG. 2, by remote assistance support described previously, or by a combination thereof. For example, the method 3200 can be executed in whole or in part in a computing apparatus, including the controller apparatus 262 shown in FIG. 2. In an implementation, some or all aspects of the method 3200 can be implemented in a system combining some or all of the features described in this disclosure. For example, the method 3200 can be utilized by the object avoidance layer 406, the proactive trajectory optimization layer 408, one or more modules of the system 2300, one or more modules of the system 2600, or combinations thereof.

At 3202, a location for a virtual vehicle is identified. The location can be identified based on a lane in map data, a trajectory of an vehicle, and a perceptible area by sensors of the vehicle. The virtual vehicle is a hypothetical vehicle that is not observed by sensors of the vehicle. That is, the virtual vehicle is unobservable by sensors of the vehicle. The location of the virtual vehicle can be identified as described above, such as for example, with respect to one or more of FIGS. 24-31.

In an example, the vehicle can be traveling on the lane and the virtual vehicle can be a leading virtual vehicle. The location of the virtual vehicle can be set to a location immediately outside of the perceptible area along the trajectory of the vehicle. In an example, the location of the virtual vehicle can be configured to be static in the world model. That is, for example, no trajectory may be predicted with respect to the leading virtual vehicle.

In an example, the lane can be an oncoming lane and the virtual vehicle can be classified as an oncoming virtual vehicle. As such, and as described above, identifying the location for the virtual vehicle can include starting at a location along the oncoming lane corresponding to a current location of the vehicle, searching backwards along a determined trajectory of the oncoming virtual vehicle until a location that is not visible to the sensors of the vehicle is identified. The location for the oncoming virtual vehicle can be set based on the location that is not visible to the sensors of the vehicle. In an example, the location for the oncoming virtual vehicle can be set to an adjusted location that is along the determined trajectory of the oncoming virtual vehicle and is within the perceptible area. The adjusted location can be based on processing delays of sensor data received by the sensors of the vehicle or some other nominal delay value. In an example, the search may not be performed based on a predicted trajectory of the virtual vehicle. Rather, the search can be performed based on discrete locations along the lane.

In an example, the lane can be a crossing lane and the virtual vehicle can be classified as a crossing virtual vehicle. As such, and as described above, identifying the location for the virtual vehicle can include starting at a location immediately ahead of the vehicle along the crossing lane corresponding, searching backwards along a determined trajectory of the crossing virtual vehicle until a location that is not visible to the sensors of the vehicle is identified. The location for the crossing virtual vehicle can be set based on the location that is not visible to the sensors of the vehicle. The adjusted location can be based on processing delays of sensor data received by the sensors of the vehicle. In an example, the search may not be performed based on a predicted trajectory of the virtual vehicle. Rather, the search can be performed based on discrete locations along the lane.

At 3204, the virtual vehicle is added to a world object model maintained with respect to the vehicle. At 3206, a trajectory is predicted for the virtual vehicle. At 3208, the vehicle is controlled according to an adjusted trajectory that is based on the trajectory for the virtual vehicle. As described above, the adjusted trajectory can include a lateral constraint, a speed constraint, or both. The adjusted trajectory may also be referred as a proactive trajectory, as described herein. As such, controlling the vehicle according to the adjusted trajectory can mean or include transmitting signals to control the vehicle according to the proactive.

Herein, the terminology "passenger", "driver", or "operator" may be used interchangeably. Also, the terminology "brake" or "decelerate" may be used interchangeably. As used herein, the terminology "processor", "computer", or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special-purpose processor or circuitry that may include specialized hardware for carrying out any of the methods, algorithms, aspects, or combinations thereof, as described herein. In some implementations, portions of the instructions may be distributed across multiple processors on a single device, or on multiple devices, which may communicate directly or across a network, such as a local area network, a wide area network, the Internet, or a combination thereof.

As used herein, the terminology "example," "embodiment," "implementation," "aspect," "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:

identifying a location for a virtual vehicle, wherein the location is identified based on a lane in map data, a trajectory of a vehicle, and a perceptible area by sensors of the vehicle, wherein the virtual vehicle is a hypothetical vehicle that is not observed by sensors of the vehicle, and wherein identifying the location for the virtual vehicle comprises:

searching backwards, starting at a location along the lane corresponding to a current location of the vehicle, along a predicted trajectory of the virtual vehicle until a location outside the perceptible area of the sensors is identified;

setting a location of the virtual vehicle, as a determined trajectory, along the predicted trajectory that is not visible to the sensors; and adjusting the location of the virtual vehicle to an adjusted location, that is along the determined trajectory, at a time of instantiating the virtual vehicle to account for a processing delay associated with the sensors of the vehicle so that the virtual vehicle is within the perceptible area, wherein the processing delay comprises perception delays, tracking delays, and prediction delays in converting sensor data into classified objects, and wherein the adjusted location is positioned further along a predicted path of the virtual vehicle in accordance with the processing delay;

including the virtual vehicle at the adjusted location to a world object model maintained with respect to the vehicle;

predicting a trajectory for the virtual vehicle; and autonomously controlling the vehicle according to an adjusted trajectory that is based on the determined trajectory for the virtual vehicle, wherein the adjusted trajectory includes at least one of a lateral constraint or a speed constraint.

2. The method of claim 1, wherein the lane is a same lane on which the vehicle is traveling, the virtual vehicle is a leading virtual vehicle that would be ahead of the vehicle on the trajectory of the vehicle, and wherein the searching backwards comprises searching along the trajectory of the vehicle until a location outside the perceptible area is identified.

3. The method of claim 2, wherein the leading virtual vehicle is instantiated as a static virtual vehicle.

4. The method of claim 1, wherein the lane is an oncoming lane, the virtual vehicle is an oncoming virtual vehicle, and wherein the predicted trajectory is a trajectory that would bring the oncoming virtual vehicle toward the vehicle within lane geometry obtained from the map data.

5. The method of claim 4, wherein after identifying the location outside the perceptible area, the oncoming virtual vehicle is located at an adjusted location that accounts for predicted movement of the oncoming virtual vehicle during the processing delay.

6. The method of claim 5, wherein the processing delay comprises delays specific to sensor fusion algorithms used to integrate data from multiple sensor types.

7. The method of claim 1, wherein the lane is a crossing lane, the virtual vehicle is a crossing virtual vehicle, and wherein the predicted trajectory would cause the crossing virtual vehicle to intersect the trajectory of the vehicle.

8. The method of claim 7, wherein after identifying the location outside the perceptible area, the crossing virtual vehicle is located at an adjusted location that accounts for predicted movement of the crossing virtual vehicle during the processing delay.

9. A vehicle, comprising:

one or more memories; and one or more processors, the one or more processors configured to execute instructions stored in the one or more memories to:

identify a location for a virtual vehicle, wherein the location is identified based on a lane in map data, a trajectory of a vehicle, and a perceptible area by sensors of the vehicle, wherein the virtual vehicle is a hypothetical vehicle that is not observed by sensors of the vehicle, and wherein, to identify the location for the virtual vehicle, the one or more processors configured to execute instructions stored in the one or more memories to:

search backwards, starting at a location along the lane corresponding to a current location of the vehicle, along a predicted trajectory of the virtual vehicle until a location outside the perceptible area of the sensors is identified;

set a location of the virtual vehicle, as a determined trajectory, along the predicted trajectory that is not visible to the sensors; and adjust the location of the virtual vehicle to an adjusted location, that is along the determined trajectory, at a time of instantiating the virtual vehicle to account for a processing delay associated with the sensors of the vehicle so that the virtual vehicle is within the perceptible area, wherein the processing delay comprises perception delays, tracking delays, and prediction delays in converting sensor data into classified objects, and wherein the adjusted location is positioned further along a predicted path of the virtual vehicle in accordance with the processing delay;

include the virtual vehicle at the adjusted location to a world object model maintained with respect to the vehicle;

predict a trajectory for the virtual vehicle; and autonomously control the vehicle according to an adjusted trajectory that is based on the determined trajectory for the virtual vehicle, wherein the adjusted trajectory includes at least one of a lateral constraint or a speed constraint.

10. The vehicle of claim 9, wherein the lane is a same lane on which the vehicle is traveling, the virtual vehicle is a leading virtual vehicle that would be ahead of the vehicle on the trajectory of the vehicle, and wherein, to search backwards, the one or more processors configured to execute instructions stored in the one or more memories to search along the trajectory of the vehicle until a location outside the perceptible area is identified.

11. The vehicle of claim 10, wherein the leading virtual vehicle is instantiated as a static virtual vehicle.

12. The vehicle of claim 9, wherein the lane is an oncoming lane, the virtual vehicle is an oncoming virtual vehicle, and wherein the predicted trajectory is a trajectory that would bring the oncoming virtual vehicle toward the vehicle within lane geometry obtained from the map data.

13. The vehicle of claim 12, wherein after identifying the location outside the perceptible area, the oncoming virtual vehicle is located at an adjusted location that accounts for predicted movement of the oncoming virtual vehicle, via the determined trajectory, during the processing delay.

14. The vehicle of claim 13, wherein the processing delay comprises delays specific to sensor fusion algorithms used to integrate data from multiple sensor types.

15. The vehicle of claim 9, wherein the lane is a crossing lane, the virtual vehicle is a crossing virtual vehicle, and wherein the predicted trajectory would cause the crossing virtual vehicle to intersect the trajectory of the vehicle.

16. The vehicle of claim 15, wherein after identifying the location outside the perceptible area, the crossing virtual vehicle is located at an adjusted location that accounts for predicted movement of the crossing virtual vehicle during the processing delay.

17. One or more non-transitory computer-readable media including instructions that, when executed by one or more processors, perform operations comprising:

identifying a location for a virtual vehicle, wherein the location is identified based on a lane in map data, a trajectory of a vehicle, and a perceptible area by sensors of the vehicle, wherein the virtual vehicle is a hypothetical vehicle that is not observed by sensors of the vehicle, and wherein identifying the location for the virtual vehicle comprises:

searching backwards, starting at a location along the lane corresponding to a current location of the vehicle, along a predicted trajectory of the virtual vehicle until a location outside the perceptible area of the sensors is identified;

setting a location of the virtual vehicle, as a determined trajectory, along the predicted trajectory that is not visible to the sensors; and adjusting the location of the virtual vehicle to an adjusted location, that is along the determined trajectory, at a time of instantiating the virtual vehicle to account for a processing delay associated with the sensors of the vehicle so that the virtual vehicle is within the perceptible area, wherein the processing delay comprises perception delays, tracking delays, and prediction delays in converting sensor data into classified objects, and wherein the adjusted location is positioned further along a predicted path of the virtual vehicle in accordance with the processing delay;

including the virtual vehicle at the adjusted location to a world object model maintained with respect to the vehicle;

predicting a trajectory for the virtual vehicle; and autonomously controlling the vehicle according to an adjusted trajectory that is based on the determined trajectory for the virtual vehicle, wherein the adjusted trajectory includes at least one of a lateral constraint or a speed constraint.

18. The one or more non-transitory computer-readable media of claim 17, wherein the lane is a same lane on which the vehicle is traveling, the virtual vehicle is a leading virtual vehicle that would be ahead of the vehicle on the trajectory of the vehicle, and wherein the searching backwards comprises searching along the trajectory of the vehicle until a location outside the perceptible area is identified.

19. The one or more non-transitory computer-readable media of claim 18, wherein the leading virtual vehicle is instantiated as a static virtual vehicle.

20. The one or more non-transitory computer-readable media of claim 17, wherein the lane is an oncoming lane, the virtual vehicle is an oncoming virtual vehicle, and wherein the predicted trajectory is a trajectory that would bring the oncoming virtual vehicle toward the vehicle within lane geometry obtained from the map data.

* * * * *